United States Patent [19]

Miyagawa et al.

[11] Patent Number: 5,452,284
[45] Date of Patent: Sep. 19, 1995

[54] OPTICAL RECORDING/REPRODUCING MEDIUM AND APPARATUS USING LAND AND GROOVE ENCODED INFORMATION SIGNALS AND IDENTIFICATION SIGNALS INCLUDING POSITION INFORMATION

[75] Inventors: Naoyasu Miyagawa, Suita; Yasuhiro Gotoh, Kadoma, both of Japan

[73] Assignee: Matsushita Electric Industrial Co., Ltd., Osaka, Japan

[21] Appl. No.: 120,216

[22] Filed: Sep. 13, 1993

[30] Foreign Application Priority Data

Sep. 14, 1992 [JP] Japan ................... 4-244388
Dec. 2, 1992 [JP] Japan ................... 4-322971
Apr. 15, 1993 [JP] Japan ................... 5-088418

[51] Int. Cl.⁶ .................................... G11B 7/00
[52] U.S. Cl. .......................... 369/124; 369/275.3; 369/275.4; 369/278; 369/44.26
[58] Field of Search ............. 369/13, 109, 124, 275.1, 369/275.3, 275.4, 278, 44.26

[56] References Cited

U.S. PATENT DOCUMENTS

| | | | |
|---|---|---|---|
| 4,049,013 | 6/1978 | Hill et al. ............... | 365/234 |
| 5,126,989 | 6/1992 | Tinet ...................... | 369/109 |
| 5,199,022 | 3/1993 | Suzuki et al. ........... | 369/275.1 |
| 5,268,887 | 12/1993 | Honguh et al. ......... | 369/275.3 |
| 5,270,998 | 12/1993 | Uchiumi ................. | 369/275.3 |
| 5,303,225 | 4/1994 | Satoh et al. ............ | 369/275.3 |

FOREIGN PATENT DOCUMENTS 50-68413  6/1975  Japan .
63-57859  11/1988  Japan .
3-168927  7/1991  Japan .

OTHER PUBLICATIONS

Murayama et al., "Optical Disk Technique", *Radio Gijutsusha*, Third Edition, pp. 163–164, Feb. 10, 1989.

*Primary Examiner*—Georgia Y. Epps
*Assistant Examiner*—Kim-Kwok Chu
*Attorney, Agent, or Firm*—Spencer, Frank & Schneider

[57] ABSTRACT

Both concave and convex portions formed spirally or concentrically on an optical information recording medium are used as recording tracks, in which identification signals including position information on the optical information recording medium and so on are recorded in advance, and information signals are recorded by use of the change of a local optical constant or a physical shape caused by radiating a light beam. The identification signals are disposed in recording tracks of the concave portions, and shifted before and behind in the track direction so as not to be adjacent to each other in the radial direction.

33 Claims, 42 Drawing Sheets

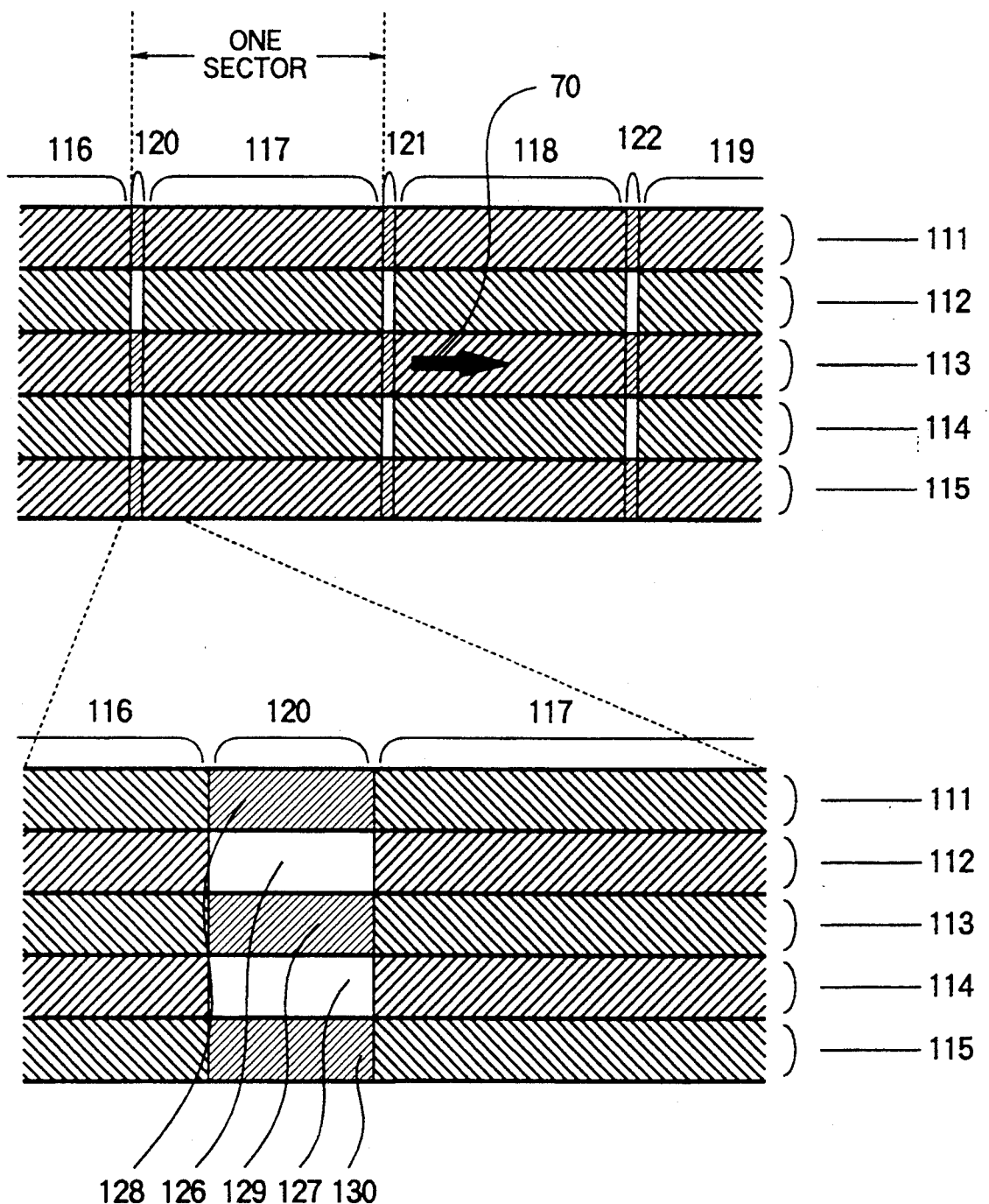

|   | 1 | 2 | 3 | 4 | 5 | 6 | 7 | 8 | 9 |
|---|---|---|---|---|---|---|---|---|---|
| 1 | 1 | 0 | 0 | 0 | 0 | 0 | 0 | 1 | 0 |
| 2 | 1 | 0 | 0 | 0 | 0 | 0 | 1 | 0 | 0 |
| 3 | 1 | 0 | 0 | 0 | 0 | 1 | 0 | 0 | 0 |
| 4 | 1 | 0 | 0 | 0 | 1 | 0 | 0 | 0 | 0 |
| 5 | 0 | 1 | 0 | 0 | 1 | 0 | 0 | 0 | 0 |
| 6 | 0 | 1 | 0 | 0 | 0 | 1 | 0 | 0 | 0 |
| 7 | 0 | 1 | 0 | 0 | 0 | 0 | 1 | 0 | 0 |
| 8 | 0 | 1 | 0 | 0 | 0 | 0 | 0 | 1 | 0 |
| 9 | 0 | 0 | 1 | 0 | 0 | 0 | 0 | 1 | 0 |
| 10 | 0 | 0 | 1 | 0 | 0 | 0 | 1 | 0 | 0 |
| 11 | 0 | 0 | 0 | 1 | 0 | 0 | 1 | 0 | 0 |
| 12 | 0 | 0 | 0 | 1 | 0 | 0 | 0 | 1 | 0 |
| 13 | 0 | 0 | 0 | 1 | 0 | 0 | 0 | 0 | 1 |
| 14 | 0 | 0 | 1 | 0 | 0 | 0 | 0 | 0 | 1 |
| 15 | 0 | 1 | 0 | 0 | 0 | 0 | 0 | 0 | 1 |
| 16 | 1 | 0 | 0 | 0 | 0 | 0 | 0 | 0 | 1 |
| 1 | 1 | 0 | 0 | 0 | 0 | 0 | 0 | 1 | 0 |

FIG. 11A

|   | 1 | 2 | 3 | 4 | 5 | 6 | 7 | 8 | 9 |
|---|---|---|---|---|---|---|---|---|---|
|   | 1 | 0 | 0 | 0 | 0 | 0 | 1 | 1 | 0 |
|   | 1 | 0 | 0 | 0 | 0 | 1 | 1 | 0 | 0 |
|   | 1 | 0 | 0 | 0 | 1 | 1 | 0 | 0 | 0 |
|   | 1 | 1 | 0 | 0 | 1 | 0 | 0 | 0 | 0 |
|   | 0 | 1 | 0 | 0 | 1 | 1 | 0 | 0 | 0 |
|   | 0 | 1 | 0 | 0 | 0 | 1 | 1 | 0 | 0 |
|   | 0 | 1 | 0 | 0 | 0 | 0 | 1 | 1 | 0 |
|   | 0 | 1 | 1 | 0 | 0 | 0 | 0 | 1 | 0 |
|   | 0 | 0 | 1 | 0 | 0 | 0 | 1 | 1 | 0 |
|   | 0 | 0 | 1 | 1 | 0 | 0 | 1 | 0 | 0 |
|   | 0 | 0 | 0 | 1 | 0 | 0 | 1 | 1 | 0 |
|   | 0 | 0 | 0 | 1 | 0 | 0 | 0 | 1 | 1 |
|   | 0 | 0 | 1 | 1 | 0 | 0 | 0 | 0 | 1 |
|   | 0 | 1 | 1 | 0 | 0 | 0 | 0 | 0 | 1 |
|   | 1 | 1 | 0 | 0 | 0 | 0 | 0 | 0 | 1 |
|   | 1 | 0 | 0 | 0 | 0 | 0 | 0 | 1 | 1 |

|    | 1 | 2 | 3 | 4 | 5 | 6 | 7 | 8 | 9 |
|----|---|---|---|---|---|---|---|---|---|
| 1  | 1 | 0 | 0 | 0 | 1 | 0 | 0 | 0 | 0 |
| 2  | 1 | 0 | 0 | 0 | 0 | 1 | 0 | 0 | 0 |
| 3  | 1 | 0 | 0 | 0 | 0 | 0 | 1 | 0 | 0 |
| 4  | 1 | 0 | 0 | 0 | 0 | 0 | 0 | 1 | 0 |
| 5  | 1 | 0 | 0 | 0 | 0 | 0 | 0 | 0 | 1 |
| 6  | 0 | 1 | 0 | 0 | 0 | 0 | 0 | 0 | 1 |
| 7  | 0 | 1 | 0 | 0 | 0 | 0 | 0 | 1 | 0 |
| 8  | 0 | 0 | 1 | 0 | 0 | 0 | 0 | 1 | 0 |
| 9  | 0 | 0 | 1 | 0 | 0 | 0 | 0 | 0 | 1 |
| 10 | 0 | 0 | 0 | 1 | 0 | 0 | 0 | 0 | 1 |
| 11 | 0 | 0 | 0 | 1 | 0 | 0 | 0 | 1 | 0 |
| 12 | 0 | 0 | 0 | 1 | 0 | 0 | 1 | 0 | 0 |
| 13 | 0 | 0 | 1 | 0 | 0 | 0 | 1 | 0 | 0 |
| 14 | 0 | 1 | 0 | 0 | 0 | 0 | 1 | 0 | 0 |
| 15 | 0 | 1 | 0 | 0 | 1 | 0 | 0 | 0 | 0 |
| 16 | 0 | 1 | 0 | 0 | 1 | 0 | 0 | 0 | 0 |
| 1  | 1 | 0 | 0 | 0 | 1 | 0 | 0 | 0 | 0 |

FIG. 12B

|    | 1 | 2 | 3 | 4 | 5 | 6 | 7 | 8 | 9 |
|----|---|---|---|---|---|---|---|---|---|
| 1  | 1 | 0 | 0 | 0 | 1 | 0 | 0 | 0 | 0 |
| 2  | 1 | 0 | 0 | 0 | 0 | 1 | 0 | 0 | 0 |
| 3  | 1 | 0 | 0 | 0 | 0 | 0 | 1 | 0 | 0 |
| 4  | 1 | 0 | 0 | 0 | 0 | 0 | 0 | 1 | 0 |
| 5  | 1 | 0 | 0 | 0 | 0 | 0 | 0 | 0 | 1 |
| 6  | 0 | 1 | 0 | 0 | 0 | 0 | 0 | 0 | 1 |
| 7  | 0 | 0 | 1 | 0 | 0 | 0 | 0 | 0 | 1 |
| 8  | 0 | 0 | 0 | 1 | 0 | 0 | 0 | 0 | 1 |
| 9  | 0 | 0 | 0 | 0 | 1 | 0 | 0 | 0 | 1 |
| 10 | 0 | 0 | 0 | 0 | 1 | 0 | 0 | 1 | 0 |
| 11 | 0 | 0 | 0 | 1 | 0 | 0 | 0 | 1 | 0 |
| 12 | 0 | 0 | 1 | 0 | 0 | 0 | 0 | 1 | 0 |
| 13 | 0 | 1 | 0 | 0 | 0 | 0 | 0 | 1 | 0 |
| 14 | 0 | 1 | 0 | 0 | 0 | 0 | 1 | 0 | 0 |
| 15 | 0 | 1 | 0 | 0 | 1 | 0 | 0 | 0 | 0 |
| 16 | 0 | 1 | 0 | 0 | 1 | 0 | 0 | 0 | 0 |
| 1  | 1 | 0 | 0 | 0 | 1 | 0 | 0 | 0 | 0 |

FIG. 12C

|    | 1 | 2 | 3 | 4 | 5 | 6 | 7 | 8 | 9 |
|----|---|---|---|---|---|---|---|---|---|
| 1  | 1 | 0 | 0 | 0 | 1 | 0 | 0 | 0 | 0 |
| 2  | 1 | 0 | 0 | 0 | 0 | 1 | 0 | 0 | 0 |
| 3  | 1 | 0 | 0 | 0 | 0 | 0 | 1 | 0 | 0 |
| 4  | 1 | 0 | 0 | 0 | 0 | 0 | 0 | 1 | 0 |
| 5  | 1 | 0 | 0 | 0 | 0 | 0 | 0 | 0 | 1 |
| 6  | 0 | 1 | 0 | 0 | 0 | 0 | 0 | 0 | 1 |
| 7  | 0 | 0 | 1 | 0 | 0 | 0 | 0 | 0 | 1 |
| 8  | 0 | 0 | 0 | 1 | 0 | 0 | 0 | 0 | 1 |
| 9  | 0 | 0 | 0 | 1 | 0 | 0 | 0 | 1 | 0 |
| 10 | 0 | 0 | 0 | 1 | 0 | 0 | 1 | 0 | 0 |
| 11 | 0 | 0 | 1 | 0 | 0 | 0 | 1 | 0 | 0 |
| 12 | 0 | 0 | 1 | 0 | 0 | 0 | 0 | 1 | 0 |
| 13 | 0 | 1 | 0 | 0 | 0 | 0 | 0 | 1 | 0 |
| 14 | 0 | 1 | 0 | 0 | 0 | 0 | 1 | 0 | 0 |
| 15 | 0 | 1 | 0 | 0 | 1 | 0 | 0 | 0 | 0 |
| 16 | 0 | 1 | 0 | 0 | 1 | 0 | 0 | 0 | 0 |
| 1  | 1 | 0 | 0 | 0 | 1 | 0 | 0 | 0 | 0 |

FIG. 12D

|    | 1 | 2 | 3 | 4 | 5 | 6 | 7 | 8 | 9 |
|----|---|---|---|---|---|---|---|---|---|
| 1  | 1 | 0 | 0 | 0 | 0 | 0 | 0 | 1 | 0 |
| 2  | 1 | 0 | 0 | 0 | 0 | 0 | 1 | 0 | 0 |
| 3  | 1 | 0 | 0 | 0 | 0 | 1 | 0 | 0 | 0 |
| 4  | 1 | 0 | 0 | 0 | 1 | 0 | 0 | 0 | 0 |
| 5  | 0 | 1 | 0 | 0 | 1 | 0 | 0 | 0 | 0 |
| 6  | 0 | 1 | 0 | 0 | 0 | 1 | 0 | 0 | 0 |
| 7  | 0 | 1 | 0 | 0 | 0 | 0 | 1 | 0 | 0 |
| 8  | 0 | 1 | 0 | 0 | 0 | 0 | 0 | 1 | 0 |
| 9  | 0 | 0 | 1 | 0 | 0 | 0 | 0 | 1 | 0 |
| 10 | 0 | 0 | 1 | 0 | 0 | 0 | 1 | 0 | 0 |
| 11 | 0 | 0 | 0 | 1 | 0 | 0 | 1 | 0 | 0 |
| 12 | 0 | 0 | 0 | 1 | 0 | 0 | 0 | 1 | 0 |
| 13 | 0 | 0 | 0 | 1 | 0 | 0 | 0 | 0 | 1 |
| 14 | 0 | 0 | 1 | 0 | 0 | 0 | 0 | 0 | 1 |
| 15 | 0 | 1 | 0 | 0 | 0 | 0 | 0 | 0 | 1 |
| 16 | 1 | 0 | 0 | 0 | 0 | 0 | 0 | 0 | 1 |
| 1  | 1 | 0 | 0 | 0 | 0 | 0 | 0 | 1 | 0 |

FIG. 33A
CODE ON 510 : 1  0  1  0  0  0  0  1  0  0  1
CODE ON 511 : 1  0  1  0  0  0  1  1  0  0  1
FIG. 33B
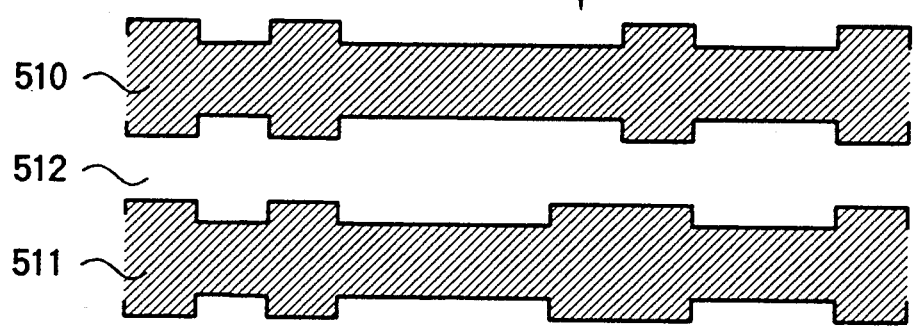
510
512
511
FIG. 33C
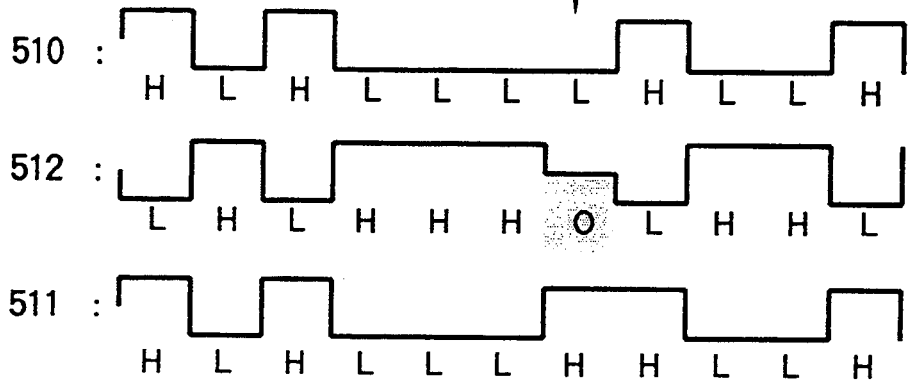
510 :  H L H L L L L H L L H
512 :  L H L H H H O L H H L
511 :  H L H L L L H H L L H
FIG. 33D
PATTERN 1  1  0  1  0  0  0  0  1  0  0  1
PATTERN 2  1  0  1  0  0  0  1  1  0  0  1

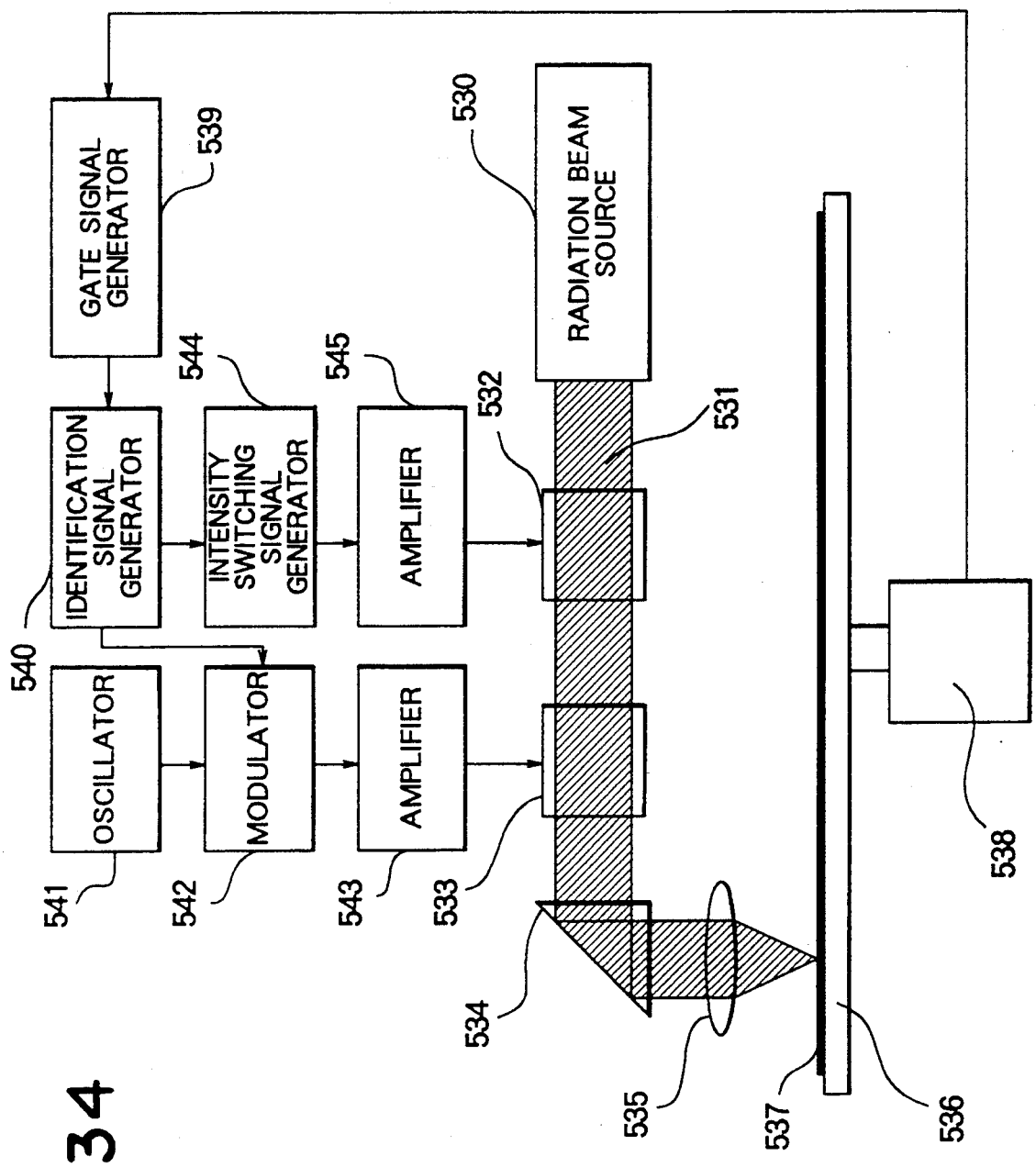

OPTICAL RECORDING/REPRODUCING MEDIUM AND APPARATUS USING LAND AND GROOVE ENCODED INFORMATION SIGNALS AND IDENTIFICATION SIGNALS INCLUDING POSITION INFORMATION

BACKGROUND OF THE INVENTION

1. Field of the Invention

The present invention relates to an optical information recording medium in which two types areas, that is, areas in guide grooves formed on the optical information recording medium in advance and areas between guide grooves, are used as information recording tracks, and an optical information recording/reproducing apparatus for recording information signals in the optical information recording medium.

2. Description of the Related Art

In recent years, the development of optical information recording media capable of recording/reproducing information signals such as video or audio signals goes on increasing. Optical disk is one of the optical information recording media. In a recordable optical disk, guide grooves are formed in an optical disk substrate to thereby form tracks. Laser light is converged to flat portions of concave or convex portions among the tracks to thereby perform recording/reproducing of information signals. In a general optical disk which is available currently, either concave portions or convex portions are generally used for recording information signals but the other concave or convex portions are used as guard bands for separating adjacent tracks.

FIG. 39 is an enlarged perspective view of such a conventional optical disk. In the drawing, the reference numeral 201 designates a recording layer which is, for example, formed from a phase change material. The reference numeral 202 designates recording pits; and 203, a beam spot of laser light. The reference numeral 204 designates concave portions formed from guide grooves; and 205, convex portions between guide grooves. The width of each of the concave portions 204 is set to be larger than the width of each of the convex portions 205. The reference numeral 206 designates pre-pits which form identification signals expressing position information on the disk. In the drawing, a transparent disk substrate which transmits incident light is not shown.

A conventional optical information recording/reproducing apparatus using this type optical disk will be described below with reference to the drawings.

FIG. 40 is a block diagram of the conventional optical information recording/reproducing apparatus. In the drawing, the reference numeral 207 designates an optical disk; and 208, a recording track which is constituted by a concave portion 204 in this case. The reference numeral 210 designates a semiconductor laser; 211, a collimator lens for collimating laser light emitted from the semiconductor laser 210; 212, a half mirror arranged on a light bundle; and 213, an objective lens for converging collimated light passing the half mirror 212 onto a recording surface of the optical disk 207. The reference numeral 214 designates a photo detector for receiving light passing through the objective lens 213 and the half mirror 212 and reflected from the optical disk 207. The photo detector 214 is divided into two parts in parallel with the track direction of the disk in order to obtain a tracking error signal. That is, the photo detector 214 is constituted by two light-receiving portions 214a and 214b. The reference numeral 215 designates an actuator for supporting the objective lens 213. These parts are mounted on a head base not shown to form an optical head 216. The reference numeral 217 designates a differential amplifier which receives detection signals outputted from the light-receiving portions 214a and 214b; and 218, a low pass filter (LPF) which receives a differential signal outputted from the differential amplifier 217. The reference numeral 219 designates a tracking control circuit which receives the output signal of the LPF 218 and a control signal L1 from a first system controller 232 and gives a tracking control signal to a driving circuit 220 and a traverse control circuit 226. The reference numeral 220 designates a driving circuit for giving a driving current to the actuator 215. The reference numeral 221 designates an addition amplifier which receives detection signals outputted from the light-receiving portions 214a and 214b and generates a summation signal; 222, a high pass filter (HPF) which receives the summation signal from the addition amplifier 221 and delivers high-frequency components of the summation signal to a waveform shaping circuit 223; 223, a first waveform shaping circuit which receives high-frequency components of the summation signal from the HPF 222 and delivers a digital signal to a reproduction signal processing circuit 224 and a first address reproducing circuit 225; and 224, a reproduction signal processing circuit which delivers an information signal such as an audio signal to an output terminal 233. The reference numeral 225 designates a first address reproducing circuit which receives the digital signal from the first waveform shaping circuit 223 and delivers an address signal to a first system controller 232. The reference numeral 226 designates a traverse control circuit which gives a driving current to a traverse motor 227 on the basis of a control signal L2 given from the first system controller 232; and 227, a traverse motor for moving the optical head 216 in the direction of the radius of the optical disk 207. The reference numeral 228 designates a spindle motor for rotating the optical disk 207. The reference numeral 229 designates a recording signal processing circuit which receives an information signal such as an audio signal from an external input terminal 230 and delivers a recording signal to a laser driving circuit 231; and 231, a laser driving circuit which receives a control signal L3 from the first system controller 232 and the recording signal from the recording signal processing circuit 230 and gives a driving current to the semiconductor laser 210. The reference numeral 232 designates a first system controller which delivers control signals L1 to L3 to the tracking control circuit 219, the traverse control circuit 226 and the recording signal processing circuit 229 and receives the address signal from the first address reproducing circuit 225.

The operation of the conventional optical information recording/reproducing apparatus configured as described above will be described below with reference to the drawing.

A laser beam radiated from the semiconductor laser 210 is collimated by the collimator lens 211 and converged onto the optical disk 207 by the objective lens 213 via the beam splitter 212. The light beam reflected from the optical disk 207 carries information of recording track 208 by diffraction and is led onto the photo detector 214 by the beam splitter 212 via the objective lens 213. The light-receiving portions 214a and 214b convert the changes of the light quantity distribution of the incident light beam into electric signals and deliver the electric signals to the differential amplifier 217 and the addition amplifier 221. The differential amplifier 217 subjects the respective input currents to I-V conversion, calculates difference between voltage values and delivers the difference signal as a push-pull signal. The LPF 218 extracts low-frequency components from the push-pull signal and delivers the low-frequency components as a tracking error signal to the tracking control circuit 219. The tracking control circuit 219 gives a tracking control signal to the driving circuit 220 in accordance with the level of the input tracking error signal, so that the driving circuit 220 supplies a driving current to the actuator 215 in accordance with the tracking control signal to thereby control the position of the objective lens 213 in the recording track-crossing direction. As a result, the beam spot performs scanning on the convex portion 205 correctly. On the other hand, the position of the objective lens 213 is controlled in the direction perpendicular to the disk surface by a focussing control circuit not shown in order to focus the beam spot onto the disk correctly.

On the other hand, the addition amplifier 221 subjects the output currents of the light-receiving portions 214a and 214b to I-V conversion, adds voltage values and delivers the resulting signal as a summation signal to the HPF 222. The HPF 222 cuts off unnecessary low-frequency components from the summation signal, makes the reproducing signal as a main information signal and the address signal pass in analog waveform and delivers the signals to the first waveform shaping circuit 223. The first waveform shaping circuit 223 performs data slicing of the analog waveform main information signal and address signal by a predetermined threshold to form a pulse waveform and delivers the pulse waveform to the reproducing signal processing circuit 224 and the first address reproducing circuit 225. The reproduction signal processing circuit 224 decodes the input digital main information signal, applies processes such as error correction to the decoded signal and delivers the resulting signal as an audio signal or the like to the output terminal 233. The first address reproducing circuit 225 decodes the input digital address signal and delivers the decoded signal, as information of position on the disk, to the system controller 232. That is, as a result of scanning of the beam Spot 203 on recording pits 202, a reproducing signal is given to the reproduction signal processing circuit 223, and as a result of scanning on pre-pits 206, an address signal is given to the first address reproducing circuit 225. The first system controller 232 judges on the basis of the address signal whether the light beam is currently fit to the desired address.

The traverse control circuit 226 gives a driving current to the traverse motor 227 in accordance with the control signal L2 given from the first system controller 232 at the time of transferring of the optical head to thereby move the optical head 216 to the target track. At this time, the tracking control circuit 219 temporarily interrupts tracking servo on the basis of the control signal L1 given from the first system controller 232. Further, at the time of ordinary reproduction, the traverse motor 227 is driven in accordance with low-frequency components of the tracking error signal given from the tracking control circuit 219 to thereby move the optical head 216 slowly in the direction of the radius of the disk with the advance of reproduction.

The recording signal processing circuit 229 adds an error code or the like to an audio signal or the like inputted from the external input terminal 230 at the time of recording and delivers the resulting signal as a coded recording signal to the laser driving circuit 231. When the first system controller 232 sets the laser driving circuit 231 to a recording mode through the control signal L3, the laser driving circuit 231 modulates a driving current to be applied to the semiconductor laser 210 in accordance with the recording signal. As a result, the intensity of the beam spot radiated onto the optical disk 207 changes according to the recording signal, so that recording pits 202 are formed. On the other hand, at the time of reproduction, the laser driving circuit 231 is set to a reproducing mode through the control signal L3, so that a driving current is controlled to emit light from the semiconductor laser 210 at constant light intensity. As a result, recording pits or pre-pits on recording tracks can be detected.

While the respective operations as described above are carried out, the spindle motor 228 rotates the optical disk 207 at a constant angular velocity.

Conventionally, in order to increase the recording capacity of the optical disk 207, the width of the convex portion 205 is narrowed so that the distance between tracks is reduced. When the distance between tracks is reduced, however, the diffraction angle of reflected light due to the concave portion 203 becomes large. Accordingly, there arises a problem in that the tracking error signal for making the beam spot 203 follow a track with high accuracy is lowered. Further, because there is a limit to the attempt to reduce the distance between tracks only by narrowing the width of the convex portion 205, the width of the concave portion 204 must be narrowed. As a result, the size of the recording pits 202 is reduced, so that there arises a problem in that the amplitude of the reproducing signal is lowered.

On the other hand, there is a technique of recording information signals both in concave portions 204 and in convex portions 205 to thereby increase track density, as described in JP-B-63-57859.

FIG. 41 is an enlarged perspective view of such an optical disk. In the drawing, the reference numeral 201 designates a recording layer; 202, recording pits; and 203, a beam spot of laser light. Like numerals in each of FIGS. 39 and 41 refer like parts. The reference numeral 240 designates concave portions formed as guide grooves; and 241, convex portions between guide grooves. As shown in the drawing, the width of each of the concave portions 240 is set to be substantially equal to the width of each of the convex portions 241. The reference numeral 242 designates pre-pits which are formed both in the concave portions 240 and in the convex portions 241 and placed in the respective heads of sectors in the two types of recording tracks so as to serve as identification signals expressing information of position on the optical disk.

In the optical disk, the recording pits 202 are formed both in the concave portions 240 and in the convex portions 241 as shown in the drawing. The guide groove pitch of the operational disk in FIG. 41 is equal to that of the optical disk in FIG. 39, but the distance between recording pit trains is reduced to ½. As a result, the recording capacity of the optical disk is increased to two times. Hereinafter, the concave portions 240 and the convex portions 241 in this type optical disk are generically called "recording tracks" in the meaning that recording pits 202 are formed.

The recording/reproducing operation of the optical information recording/reproducing apparatus for recording information signals in this type optical disk is carried out substantially in the same manner as the conventional optical information recording/reproducing apparatus shown in FIG. 40. However, as described in JP-B-63-57859, it is necessary that the polarity of the tracking error signal when the beam spot 202 performs scanning on the convex portion 241 is inverted to the polarity of the tracking error signal when the beam spot 202 performs scanning on the concave portion 240. This can be realized by inserting an on/off controllable inversion amplifier in between the LPF 218 and the tracking control circuit 219 in FIG. 40.

SUMMARY OF THE INVENTION

In the optical information recording medium and the optical information recording/reproducing apparatus shown in FIGS. 40 and S41, however, identification signals such as pre-pits must be formed in the two types of recording tracks in order to obtain positional information in arbitrary position on the concave and convex recording tracks. There arises a problem in that the manufacturing process is complicated compared with the conventional optical disk shown in FIG. 39.

An object of the present invention is to solve the above-mentioned problems, that is, to provide an optical information recording medium in which positional information can be obtained in two types recording tracks without formation of identification signals such as an address signal, etc. both in concave recording tracks and in convex recording tracks.

In order to attain the above object, according to a first aspect of the present invention, an optical information recording medium in which both concave and convex portions spirally or concentrically formed on the optical information recording medium are used as recording tracks, identification signals including position information and so on on the optical information recording medium are recorded in advance, and information signals are recorded by use of a change of a local optical constant or a physical shape caused by irradiation with a light beam, has a configuration wherein identification signals are disposed in recording tracks of the concave portions, and shifted before and behind in the track direction so as not to be adjacent to each other in the radial direction.

An optical information recording/reproducing apparatus according to the present invention comprises the above-mentioned optical information recording medium according to the first aspect of the present invention, an optical system for radiating a light beam generated from a light source onto a recording track of the optical information recording medium, a shift means for shifting the light beam relatively in the recording track direction, a light detecting means for detecting reflected light of the light beam from the optical information recording medium, and outputting a light detection signal, and an identification signal reading means for extracting an identification signal from the light detection signal outputted from the light detecting means, wherein the identification signal reading means reproduces the identification signal from the light detection signal amplitude-modulated with the identification signal when the light beam is scanning on a recording track of a concave portion and the identification signal reading means reproduces the identification signal from the light detection signal amplitude-modulated with the identification signal of a recording track of a concave portion adjacent thereto when the light beam is scanning on a recording track of a convex portion.

In the above configuration, even in the case where a light beam performs scanning on a convex recording track having no identification signal arranged therein, a part of the light beam is modulated with identification signals of concave recording tracks adjacent to the convex recording track. Accordingly, the photo detecting means detects the modulated light beam and converts the modulated light beam into a photo detection signal, so that the identification signal reading means performs two-valuing of the photo detection signal by a suitable amplification factor and a suitable slicing level to thereby make it possible to reproduce identification signals even in convex recording tracks.

Further, there are provided a recording means for recording an information signal on a recording track, and a recording control means for controlling the recording means to prevent an information signal from being recorded in an area which is adjacent to an identification signal in the track-crossing direction and which is on a convex recording track. Accordingly, an information signal is prevented from mixing in a photo detection signal when an identification signal is read. Accordingly, accuracy in reading the identification signal is improved.

According to a second aspect of the present invention, an optical information recording medium in which both concave and convex portions spirally or concentrically formed on the optical information recording medium are used as recording tracks, identification signal areas in which identification signals including position information and so on on the optical information recording medium are recorded in advance are provided, and information signals are recorded by use of a change of a local optical constant or a physical shape caused by irradiation with a light beam, has a configuration wherein the identification signals are constituted by at least a first identification signal and a second identification signal divided in area, and are disposed in recording tracks of the concave portions, the first identification signal disposed in the recording track of the $(2n-1)$th (n is a positive integer) concave portion and the first identification signal disposed in the recording track of the $(2n)$th concave portion are the same and recorded in parallel, and the second identification signal disposed in the recording track of the $(2n)$th concave portion and the second identification signal disposed in the track recording of the $(2n+1)$th concave portion are the same and recorded in parallel.

Another optical information recording/reproducing apparatus according to the present invention comprises the optical information recording medium according to the second aspect of the present invention, an optical system for radiating a light beam generated from a light source onto a recording track of the optical information recording medium, a shift means for shifting the light beam relatively in the recording track direction, a light detecting means for detecting reflected light of the light beam from the optical information recording medium, and outputting a light detection signal, and an identification signal reading means for extracting an identification signal from the light detection signal outputted from the light detecting means, has a configuration wherein the identification signal reading means reads the identification signal from the light detection signal amplitude-modulated with the first identification signal when the light beam is scanning on the recording track of the (2n−1)th concave portion, the identification signal reading means reads the identification signal from the light detection signal amplitude-modulated with the second identification signal when the light beam is scanning on the recording track of the (2n)th concave portion, the identification signal reading means reads the identification signal from the light detection signal amplitude-modulated with the first identification signals on the recording tracks of both the concave portions adjacent thereto when the light beam is scanning on the recording track of the convex portion between the (2n−1)th concave portion and the (2n)th concave portion, and the identification signal reading means reads the identification signal from the light detection signal amplitude-modulated with the second identification signals on the recording tracks of both the concave portions adjacent thereto when the light beam is scanning on the recording track of the convex portion between the (2n)th concave portion and the (2n+1)th concave portion.

In the above configuration, even in the case where a light beam performs scanning on a convex recording track having no identification signal arranged therein, a part of the light beam is modulated with identification signals of concave recording tracks adjacent to the convex recording track. Furthermore, in the case where the light beam performs scanning on a convex recording track arranged between the (2n−1)th concave recording track and the (2n)th concave recording track, the light beam is modulated with the first sub-identification signals of the same pattern formed in the adjacent concave recording tracks. Accordingly, the degree of amplitude modulation of the photo detection signal can be increased, so that accuracy in reading the identification signal is improved. Also in the case where the light beam performs scanning on a convex recording track between the (2n)th concave recording track and the (2n+1)th concave recording track, the degree of amplitude modulation of the photo detection signal on the basis of the second sub-identification signal can be increased in the same manner as described above.

According to a third aspect of the present invention, an optical information recording medium in which both concave and convex portions spirally or concentrically formed on the optical information recording medium are used as recording tracks, identification signal areas in which identification signals including position information and so on on the optical information recording medium are recorded in advance are provided, and information signals are recorded by use of a change of a local optical constant or a physical shape caused by irradiation with a light beam, has a configuration wherein the identification signals are disposed in recording tracks of the concave portions, have a unit pattern different by one bit between adjacent recording tracks, and use a gray code pattern in which one and the same pattern is repeated every predetermined plurality of tracks, and wherein the identification signals are made coincident with each other in their head positions between the recording tracks adjacent to each other.

A further optical information recording/reproducing apparatus according to the present invention comprises the optical information recording medium according to the third aspect of the present invention, an optical system for radiating a light beam generated from a light source onto a recording track of the optical information recording medium, a shift means for shifting the light beam relatively in the recording track direction, a light detecting means for detecting reflected light of the light beam from the optical information recording medium, and outputting a light detection signal; and an identification signal reading means for extracting an identification signal from the light detection signal outputted from the light detecting means, has a configuration wherein the identification signal reading means binary-codes the light detection signal amplitude-modulated with the identification signal, on the basis of a first reference value, and converts the obtained binary signal to position information and so on when the light beam is scanning on a recording track of a concave portion, and wherein the identification signal reading means binary-codes the light detection signal amplitude-modulated with the identification signals on the recording tracks of the concave portions adjacent thereto, on the basis of a second reference value, and converts the obtained binary signal to position information and so on when the light beam is scanning on a recording track of a convex portion.

In the above configuration, even in the case where a light beam performs scanning on a convex recording track having no identification signal arranged therein, a part of the light beam is modulated with identification signals of concave recording tracks adjacent to the convex recording track. Because not only Gray codes different by one bit from each other are used as two identification signals in adjacent concave recording tracks but the head positions of the two identification signals coincide with each other, the light beam is modulated equally with the identification signals in the adjacent concave recording tracks except the above-mentioned one bit. The photo detecting means detects the light beam and generates an output signal as a photo detection signal, so that the identification signal reading means performs two-valuing of the photo detection signal on the basis of the second reference value. With respect to the one bit different between the two identification signals in the adjacent recording tracks, modulation of the light beam due to this bit becomes small, so that this bit can be regarded as an error bit at the point of time of two-valuing. Because such Gray code is large in redundancy, the identification signal reading means can correct this error and can obtain correct position information.

According to a fourth aspect of the present invention, an optical information recording medium in which both concave and convex portions spirally or concentrically formed on the optical information recording medium are used as recording tracks, identification signals indicating positions and so on on the optical information recording medium are recorded in advance, and information signals are recorded by use of a change of a local optical constant or a physical shape caused by irradiation of a light beam, has a configuration wherein a part or all of the identification signals are displaced by about a quarter of a pitch of recording tracks of the concave or convex portions in the direction crossing recording tracks from the center line of recording tracks of the concave or convex portions. Preferably, the identification signal is formed of a concave/convex pre-pit the optical depth or height of which is about $\lambda/4$ ($\lambda$ is a wavelength of the light beam).

A still further optical information recording/reproducing apparatus according to the present invention comprises the optical information recording medium according the fourth aspect of the present invention, an optical head for radiating a light beam onto the optical information recording medium, receiving reflected light thereof, converting the reflected light to an electric signal, and outputting the electric signal as a reproducing signal, a shift means for shifting the light beam relatively in the recording track direction, a tracking error detecting means for outputting a tracking error signal representing a gap quantity between the light beam radiated onto the optical information recording medium and a recording track of a concave portion on the optical information recording medium or the center line of a recording track of a convex portion, a tracking control means for displacing the light beam in the direction crossing recording tracks in accordance with the tracking error signal to thereby dissolve the gap quantity, a judgment means for making a judgement as to which one of a recording track of the concave portion and a recording track of the convex portion is being scanned by the light beam, outputting the result of judgement as a judgment signal, an identification signal reading means for generating an identification signal from the reproducing signal outputted from the optical head, when the light beam is scanning on the identification signal on the optical information recording medium, and a position detecting means for calculating the position where the light beam is scanning, from the identification signal and the judgment signal, whereby information signals are recorded, reproduced or deleted on the optical information recording medium by means of the light beam.

In the above configuration, even in the case where the light beam performs scanning on any suitable one of concave and convex recording tracks, a part of the light beam overlaps the identification signal. Accordingly, reflected light is modulated with the identification signal, so that the optical head receives the reflected light and converts the light into a photo detection signal. The position calculation means calculates the scanning position of the light beam on the basis of the identification signal read from the photo detection signal by the identification signal reading means and the result of judgment by the judgment means as to whether the currently traced track is a concave recording track or whether the currently traced track is a convex recording track.

According to a fifth aspect of the present invention, an optical information recording medium in which both concave and convex portions spirally or concentrically formed on the optical information recording medium are used as recording tracks, identification signals including position information and so on on the optical information recording medium are recorded in advance, and information signals are recorded by use of at least a change of a local optical constant caused by radiating a light beam, has a configuration wherein the widths of the concave portions are modulated to record the identification signals, and wherein the identification signals are made coincident with each other in their head positions between the recording tracks adjacent to each other in at least an area of the optical information recording medium. The position information in an identification signal is formed of a gray code only one bit of which changes at the time of count-up.

Another optical information recording/reproducing apparatus according to the present invention comprises the optical information recording medium according to the fifth aspect of the present invention, an optical head for radiating a light beam onto the optical information recording medium, receiving reflected light thereof, converting the reflected light to an electric signal, and outputting the electric signal as a read signal, a polarity inverting means for inverting the polarity of the read signal while the light beam is scanning on a recording track of a convex portion of the optical information recording medium, an information signal reading means for decoding an information signal from the read signal put from the optical head, an information recording means for recording medium, a shift means for shifting the light beam relatively in the recording track direction, a tracking control means for displacing the light beam onto a recording track of a concave portion of the optical information recording means or a recording track of a convex portion.

The above apparatus further comprises a tracking error detecting means for detecting the inclination of distribution of the quantity of light in the direction crossing tracks upon a light beam reflected on the optical information recording medium, and outputting a tracking error signal in accordance with the inclination, and an error detecting means for outputting a first detection pulse when the tracking error signal is beyond a predetermined threshold positive value, and outputting a second detection pulse when the tracking error signal is below a predetermined threshold negative value, while a light beam is scanning on an identification signal in a recording track of a convex portion, whereby the identification signal reading means corrects an identification signal decoded from a read signal in accordance with the first and second detection pulses while a light beam is scanning on the identification signal in a recording track of a convex portion.

In the above configuration of the optical information recording medium according to the present invention, not only the width of each of concave recording tracks is modulated in accordance with the identification signal but the head positions of identification signals in adjacent concave recording tracks are made to coincide with each other. Accordingly, even the convex recording track is subjected to width modulation with the polarity inverted to that of concave recording tracks adjacent to the convex recording tracks. Accordingly, if identification signals in the adjacent tracks are the same, the identification signal in the convex recording track is detected as the change of the quantity of reflected light. Further, Gray codes are used in a part of identification signals recorded in convex recording tracks. Even if identification signals in adjacent tracks have different values respectively, error in reading of the identification signal in the convex recording track therebetween is not larger than one bit. Accordingly, the value of the correct identification signal can be inferred easily. In the optical information recording/reproducing apparatus, the polarity inverting means inverts the reproducing signal only when the light beam traces a convex recording track, so that the identification signal reading means decodes the identification signal on the basis of the polarity.

Further, the tracking error detecting means detects the eccentricity of the light quantity distribution of the light beam reflected from the optical disk in the direction of the radius of the disk and outputs a tracking error signal. While the light beam performs scanning on an identification signal in a convex recording track, the error bit detecting means outputs the first detection pulse signal when the tracking error signal is larger than a predetermined positive threshold and, on the other hand, the error bit detecting means delivers the second detection pulses signal to the identification signal reading means when the tracking error signal is smaller than a predetermined negative threshold. The identification signal reading means corrects the Gray code in the reproducing signal in accordance with the first and second detection pulse signals to thereby generate a correct identification signal. BRIEF DESCRIPTION OF THE DRAWINGS FIG. 1 is a plan view of a first optical disk according to the present invention;

FIGS. 8A and 8B are views for explaining an example of Gray code used in a second optical disk according to the present invention;

FIGS. 9A and 9B are views for explaining a sector format in the second optical disk according to the present invention;

FIGS. 11A and 11B are views for explaining a Gray code used in the second optical disk and an addition Gray code based on crosstalk according to the present invention;

FIGS. 12A to 12D are views for explaining other examples of Gray codes according to the present invention;

FIGS. 33A to 33D are views for explaining the reason why the identification signal is obtained in the convex recording track of the fifth optical disk according to the present invention;

FIG. 34 is a block diagram showing the configuration of main parts in an apparatus for producing the fifth optical disk according to the present invention;

DESCRIPTION OF THE PREFERRED EMBODIMENTS

Optical information recording/reproducing apparatus according to embodiments of the present invention will be described below with reference to the drawings. In the following description of embodiments, a phase change type recording material in which recording is performed on the basis of the change of real reflectance is used as a recordable/reproducible optical disk, and a constant angular velocity (hereinafter referred to as "CAV") control system is used as an optical disk rotating control system.

Figure 1:
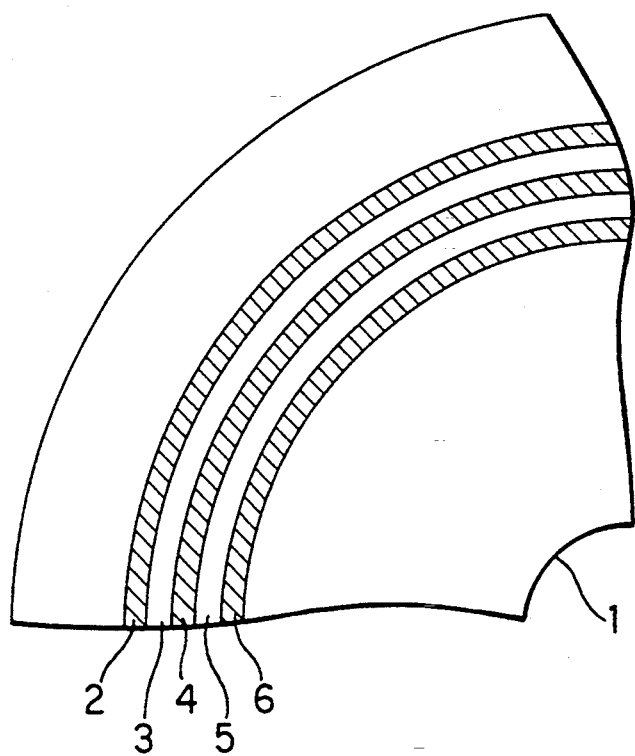

FIG. 1 is a plan view of a first optical disk according to the present invention. In the drawing, the reference numeral 1 designates a first optical disk; 2, 4 and 6, concave recording tracks (hereinafter referred to as "concave portions") constituted by guide grooves; and 3 and 5, convex recording tracks (hereinafter referred to as "convex portions") constituted by regions between guide grooves.

Figure 2:
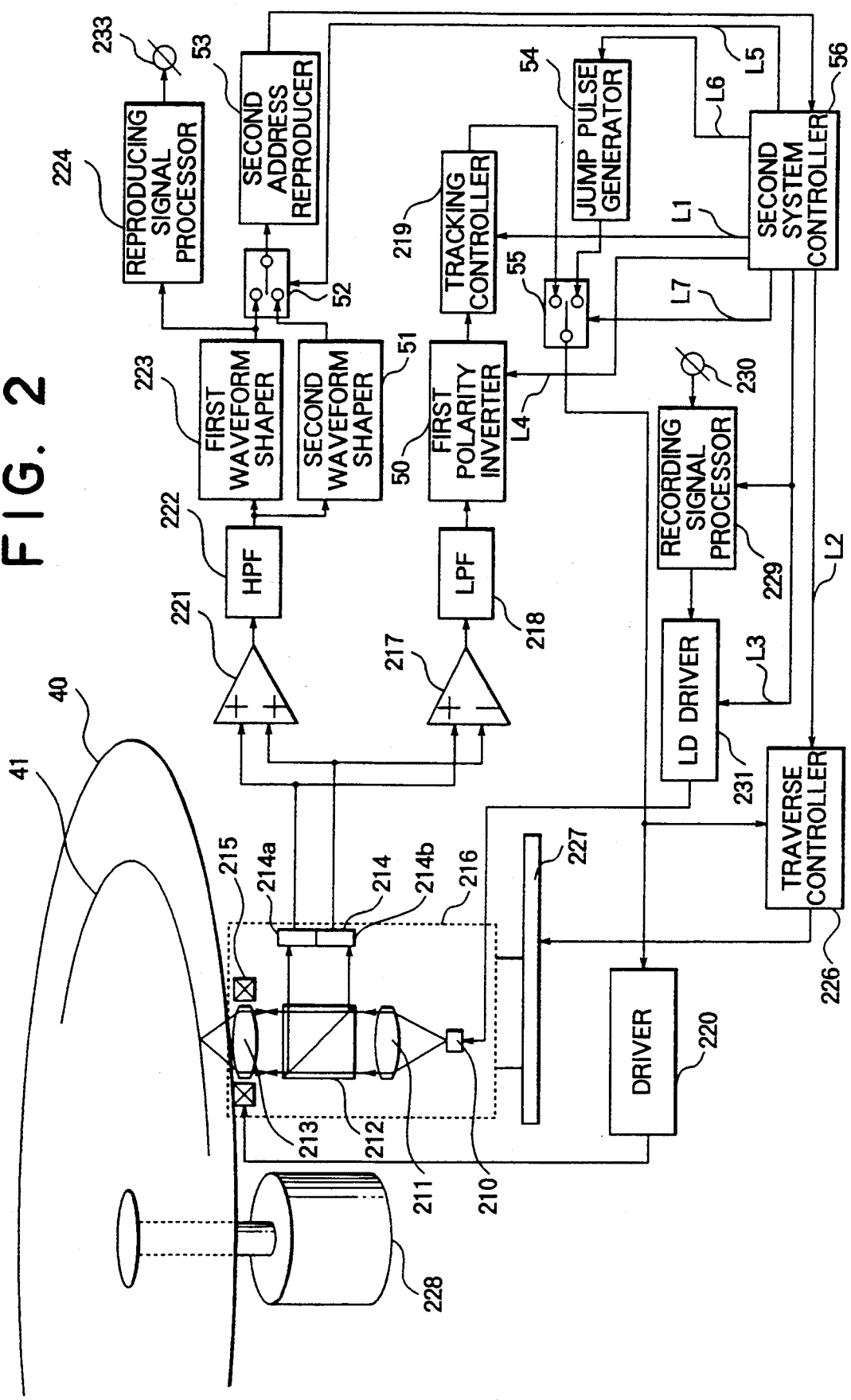
FIG. 2 is a block diagram showing the configuration of a first optical information recording/reproducing apparatus according to the present invention.

FIG. 2 is a block diagram of a first optical information recording/reproducing apparatus according to the present invention. In the drawing, the reference numeral 40 designates a first optical disk using concave portions and convex portions as recording tracks; and 41, a recording track. In the first optical disk 40, an identification signal is preliminarily formed only in the concave portions. The reference numeral 210 designates a semiconductor laser; 211, a collimator lens; 212, a half mirror; 213, an objective lens; 214, a photo detector; 214a and 214b, light-receiving portions thereof; 215, an actuator; 216, an optical head; 217, a differential amplifier; 218, a low pass filter (LPF); 219, a tracking control circuit; 220, a driving circuit; 221, an addition amplifier; 222, a high pass filter (HPF); 223, a first waveform shaping circuit; 224, a reproduction signal processing circuit; 226, a traverse control circuit; 227, a traverse motor; 228, a spindle motor; 229, a recording signal processing circuit; 230, an external input terminal; 231, an LD driving circuit; and 233, an output terminal. These parts are substantially similar to constituent parts of a conventional optical recording/reproducing apparatus shown in FIG. 40. Accordingly, reference numerals given to the constituent parts of the conventional apparatus are given to these parts for omission of detailed description.

The structure of portions different from portions in FIG. 40 will be described below. The reference numeral 50 designates a first polarity inverting circuit which receives a control signal L4 from a second system controller 56 and transmits a tracking error signal outputted from the LPF 218 to the tracking control circuit 219. With respect to the polarity for tracking control, it is assumed that tracking leading-in is performed on concave recording tracks in the case where a tracking error signal is inputted to the tracking control circuit 219 directly from the differential amplifier without any change of the polarity. The reference numeral 51 designates a second waveform shaping circuit which receives high-frequency components of a summation signal from the HPF 222 and gives a digital signal to the other input terminal of a first selector 52. The reference numeral 52 designates a first selector which receives a control signal L5 from a second system controller 56 and transmits outputs of the first and second waveform shaping circuits 223 and 51 to a second address reproducing circuit 53. The reference numeral 53 designates a second address reproducing circuit which receives the digital signal from the first selector 52 and gives address data to a second system controller 56. The reference numeral 54 designates a jump pulse generating circuit which receives a control signal L6 from the second system controller 56 and gives a jump pulse signal to one input terminal of a second selector 55. The reference numeral 55 designates a second selector which receives a switching signal L7 from the second system controller 56 and transmits the jump pulse signal from the jump pulse generating circuit 54 and the tracking control signal from the tracking control circuit 219 to the driving circuit 220. The reference numeral 56 designates a second system controller which receives an address signal from the second address reproducing circuit 53 and gives control signals L1 to L7 to the tracking control circuit 219, the traverse control circuit 226, the LD driving circuit 231, the recording signal processing circuit 229, the polarity inverting circuit 50, the first selector 52, the jump pulse generating circuit 54 and the second selector 55 respectively.

Figure 3:
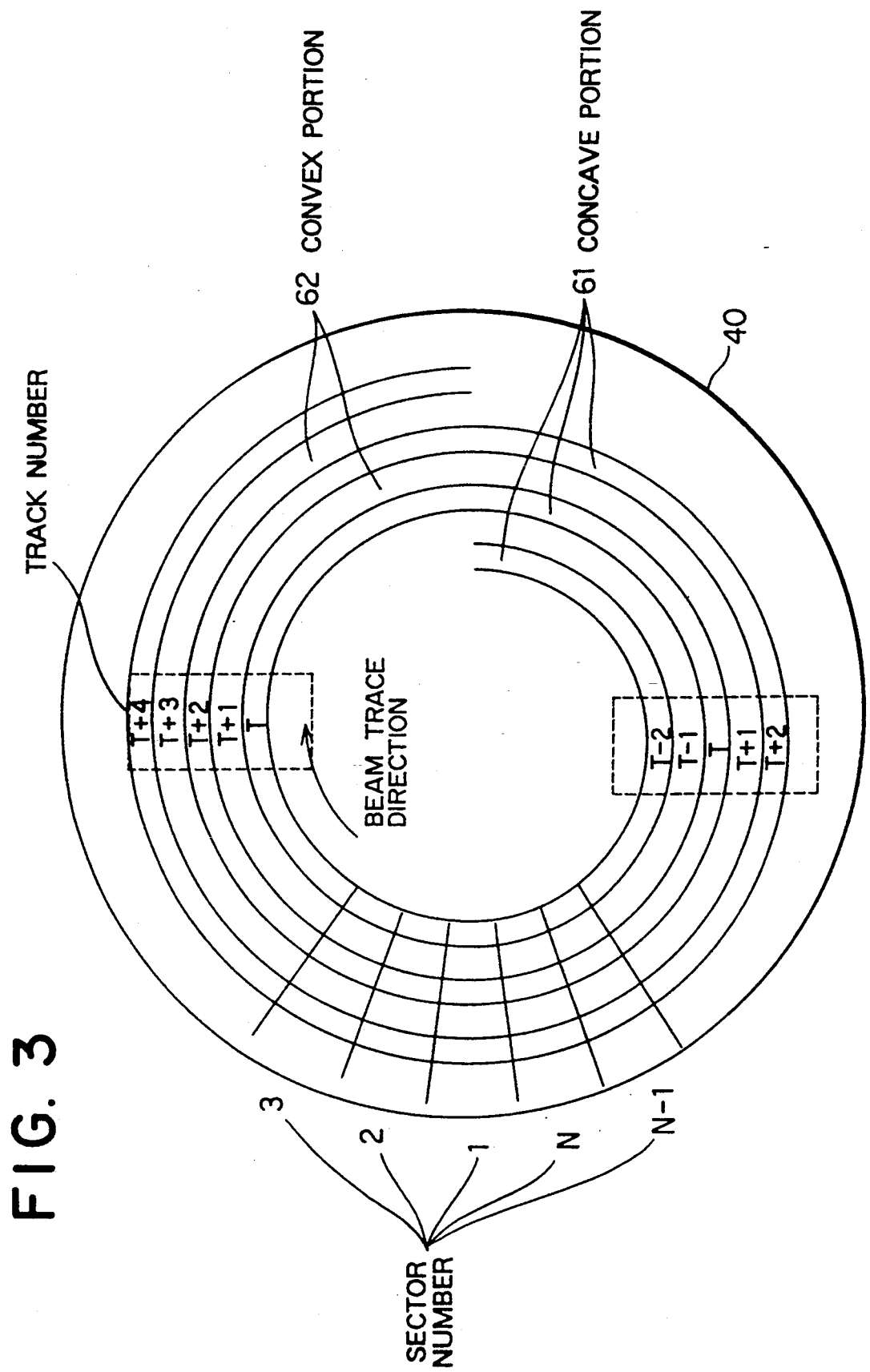
FIG. 3 is a plan view showing the configuration of recording tracks in the first optical disk according to the present invention.
Figure 4A:
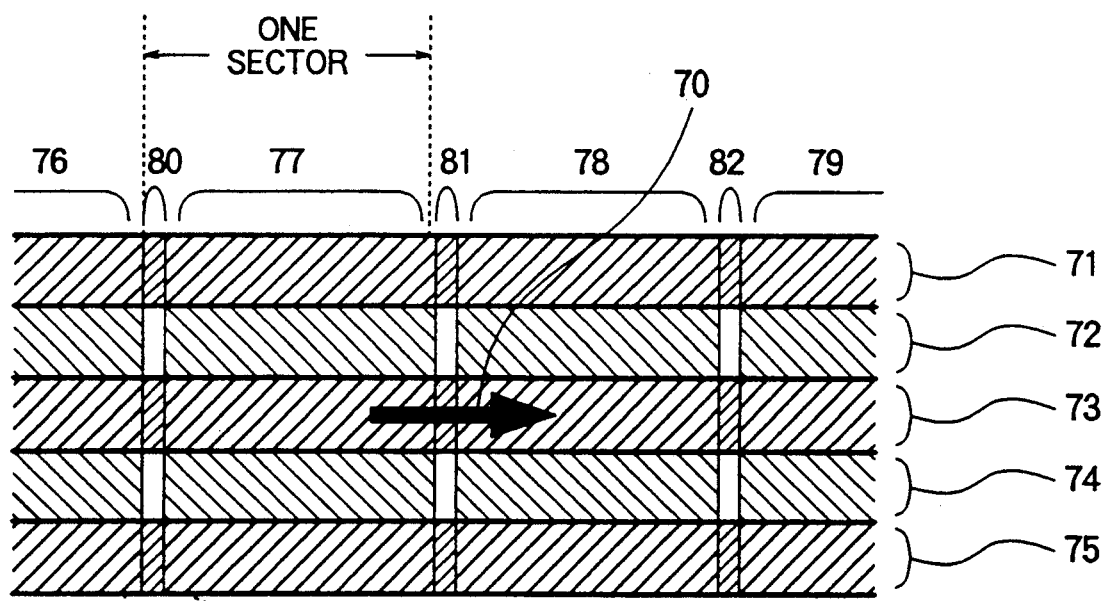
FIGS. 4A to 4C are views for explaining a sector format in the first optical disk according to the present invention.
Figure 4B:
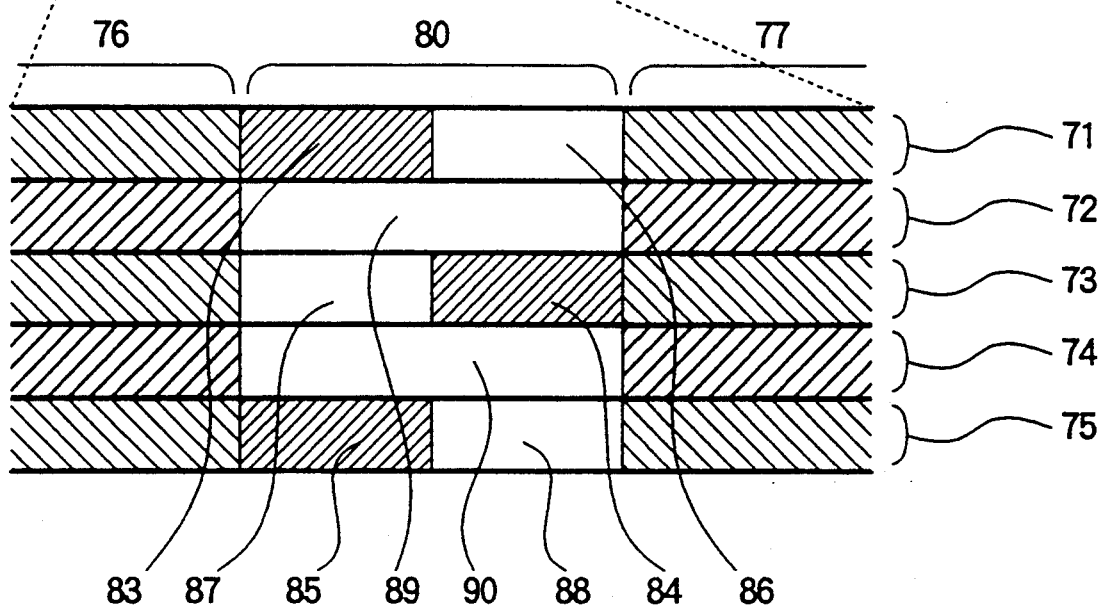
Figure 4C:
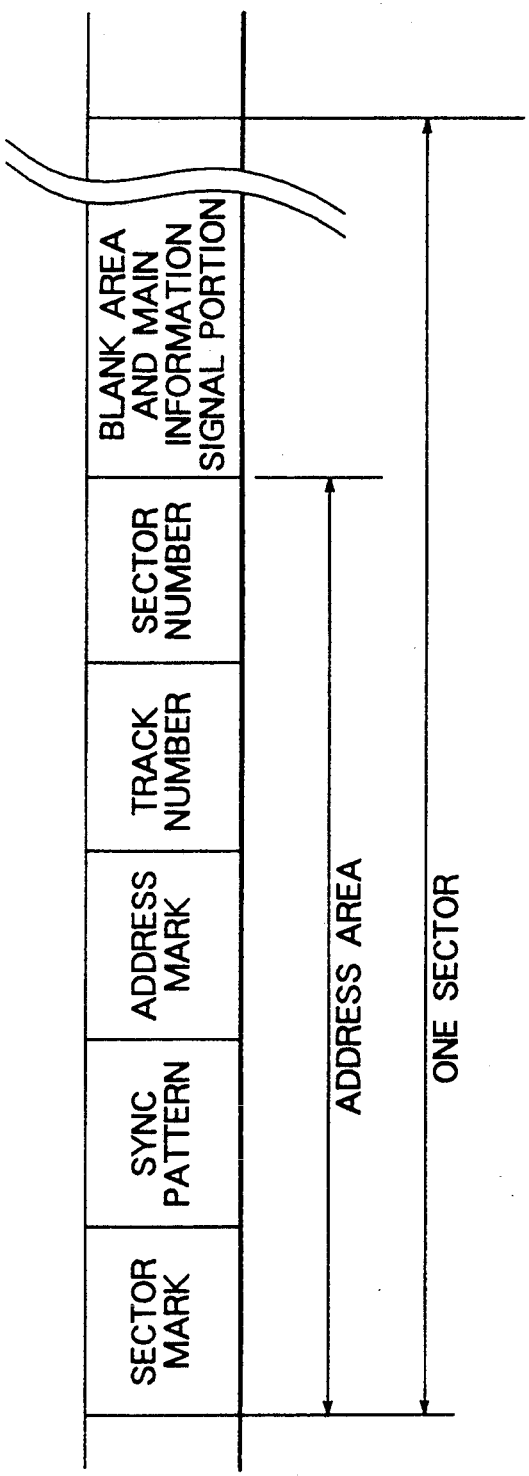

The structure of the first optical disk will be described below. FIG. 3 is a plan view showing the structure of recording tracks. FIGS. 4A to 4C are structural views of a sector format.

In FIG. 3, the reference numeral 61 designates concave portions; and 62, convex portions. Recording track numbers are assigned to respective tracks so that the tracks are numbered through the concave and convex portions at intervals of one rotation. A beam spot rotates to perform tracing clockwise from the inner circumferential side to the outer circumferential side so that recording track numbers are represented by T, T+1, T+2, T+3 and T+4 in the drawing. One rotation of each track is divided into N sectors so that sector numbers of from No. 1 to No. N are assigned to the N sectors. Because the recording tracks are shaped like a helical coil, the concave portions are formed so that sector No. N of track No. T is connected to sector No. 1 of track No. T+2. Further, the convex portions are formed so that sector No. N of track No. T+1 is connected to sector No. 1 of track No. T+3. These recording track numbers and sector numbers are preliminarily formed on the disk as pre-pits as described above. Because the optical disk in this embodiment uses a CAV system as described above, boundaries between sectors are arranged on lines radially.

FIG. 4A is a structural view of a sector format of the first optical disk 40. In the drawing, the transverse direction represents a track direction, and the longitudinal direction represents a disk radius direction. The reference numeral 70 designates a beam spot tracing direction. The reference numerals 71, 73 and 75 designate concave portions; and 72 and 74, convex portions. The reference numerals 76, 77, 78 and 79 designate main information signal portions for recording digitalized information signals such as audio signals, video signals, etc.; and 80, 81 and 82, identification signal portions provided on concave portions. Areas 89 and 90 which are provided on convex recording tracks so as to be radially adjacent to these identification signal portions are provided as blank areas where nothing is recorded. Identification signal portions are disposed before the main information signal portions respectively, so that a combination of one identification signal portion and one main information signal portion forms one sector. FIG. 4B shows an identification signal portion which is enlarged in the track direction. In the drawing, the reference numerals 83, 84 and 85 designate address areas in which pre-pits or the like are formed in respective sectors. The address areas 83, 84 and 85 are formed only on concave portions as described above. Because data stored in each of the address areas contains information such as track number and sector number and because the address areas are formed only on concave portions, track numbers in the address areas are picked up alternately so as to be represented by T, T+2, T+4... Sector numbers can be defined so that the same value is given to radially adjacent sectors. The reference numerals 86, 87 and 88 designate blank areas which are disposed before or after the address areas so as to be adjacent to the address areas and in which no signal is recorded. The length of each of the blank areas 86, 87 and 88 is equal to the length of each of the address areas 83, 84 and 85. The address areas 83, 84 and 85 and the blank areas 86, 87 and 88 are arranged alternately correspondingly to the concave portions. FIG. 4C is a structural view of the inside of each address area. One address area is composed of a sector mark block, a sync pattern block, an address mark block, a track number block, and a sector number block. The respective blocks function as follows.

1) Sector mark: This block shows the head of a sector.
2) Sync pattern: This block generates address data reproduction clock pulses.
3) Address mark: This block shows the start of address data.
4) Track number, sector number: These blocks show address dada.

Among these blocks, the sector mark block, the sync pattern block and the address mark block may be equalized in all sectors.

Figure 5A:
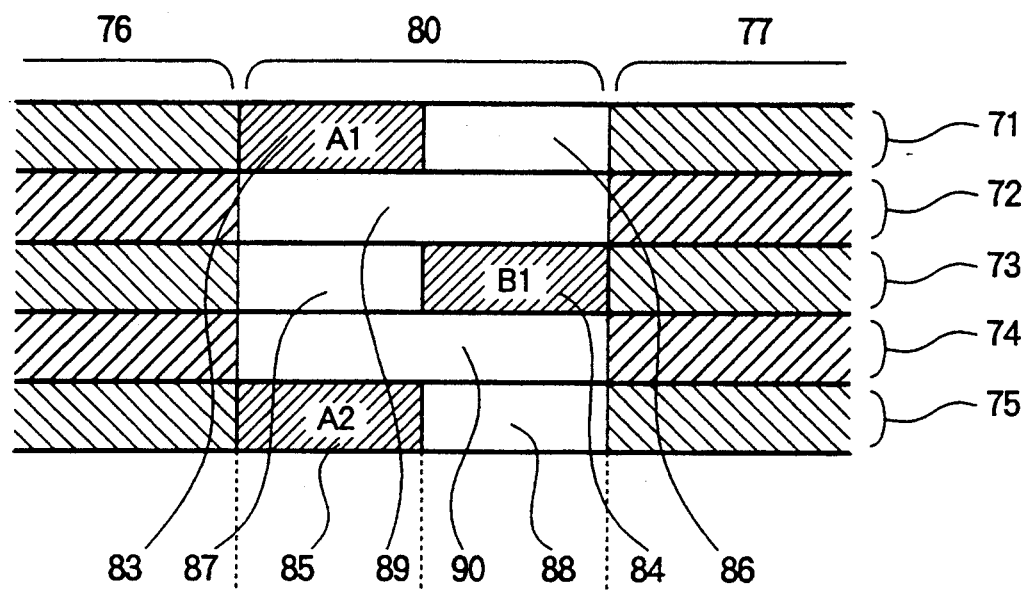
FIGS. 5A and 5B are a detailed structural view of an identification signal portion of the first optical disk and a timing chart of a reproducing signal thereof according to the present invention.
Figure 5B:
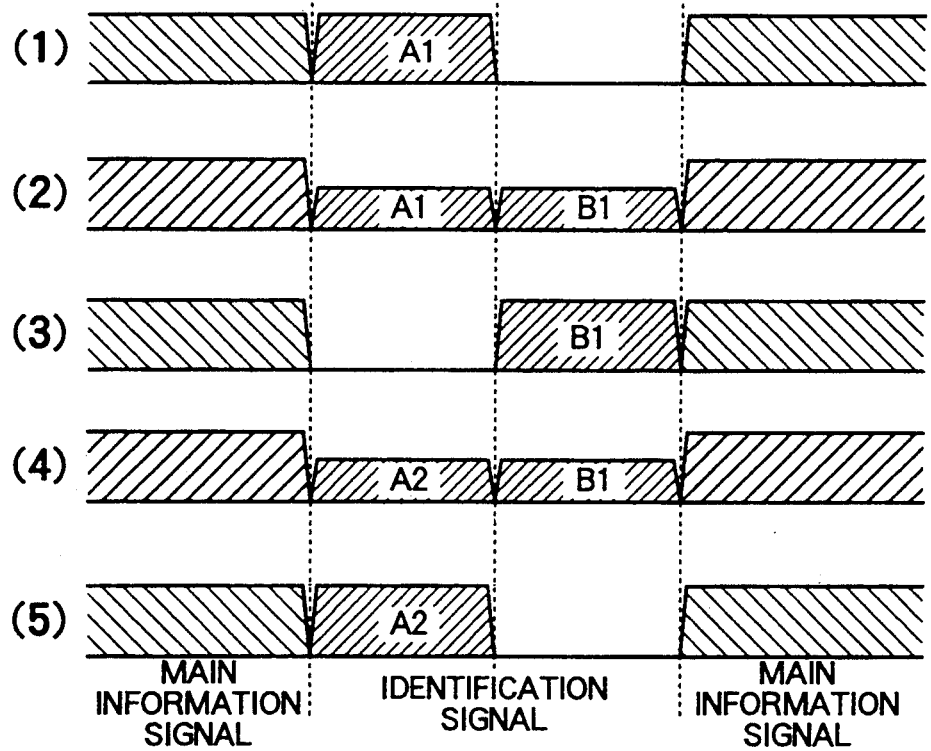

How to detect identification signals in the sector format shown in FIGS. 4A to 4C will be described below. FIG. 5A is a detailed structural view of an identification signal portion similar to FIG. 4B. Like numerals in each of FIGS. 5A and 4B refer like parts. FIG. 5B is a timing chart of a reproducing signal in the case where a beam spot traces convex and concave portions. In FIG. 5B, the diagram (1) is a timing chart in the case where the concave portion 71 is traced, the diagram (2) is a timing chart in the case where the convex portion 72 is traced, the diagram (3) is a timing chart in the case where the concave portion 73 is traced, the diagram (4) is a timing chart in the case where the convex portion 74 is traced, and the diagram (5) is a timing chart in the case where the concave portion 75 is traced. In FIG. 5B, the transversal axis represents time, and the longitudinal axis represents the amplitude of the reproducing signal. The broken lines between FIGS. 5A and 5B show correspondence between position and time. In the drawings, data (track number and sector number) in the address portions 83, 84 and 85 are replaced by A1, B1 and A2, respectively.

In the concave portions 71 and 75, a beam spot performs tracing on the address areas 83 and 85 arranged in the first half of the identification signal portion to thereby reproduce addresses A1 and A2 as shown in the diagrams (1) and (5). In the concave portion 73, a beam spot performs tracing on the address area 84 arranged in the second half of the identification signal portion to thereby reproduce an address B1 as shown in the diagram (3). A signal component obtained from the quantity of reflection light modified with a pre-pit of an address area by scanning of the center of the beam spot 70 just above the address area as described above is hereinafter referred to as "main component". On the other hand, in the convex portion 72, there is no main component reproduced from the blank area 89 of the identification signal portion even if the beam spot traces the blank area 89, but address signals A1 and B1 based on pre-pits of the address areas 83 and 84 of the adjacent concave portions 71 and 73 are reproduced as crosstalk as shown in the diagram (2). Hereinafter, these components are referred to as "crosstalk components". Because the address areas of the adjacent concave portions are arranged alternately, the crosstalk component from the address area 83 and the crosstalk component from the address area 84 are reproduced while separated with respect to time. The amplitude of these crosstalk signals is made smaller than the amplitude of signals reproduced in the case where the beam spot traces the address areas 83 and 85. Further, because there is no main information signal recorded in the blank area 89, unnecessary signal components except the crosstalk signals from the address areas 83 and 84 are prevented from mixing as noise. The case of the convex portion 74 is similar to the case of the convex portion 72, so that address values B1 and A2 of the address areas 84 and 85 are reproduced as crosstalk. Accordingly, track numbers of concave portions adjacent to the convex portion can be known by detecting these crosstalk signals, so that the track number of the currently traced convex portion can be calculated. Further, because the sector number is constant with respect to the radial direction, the sector number of the convex portion can be known directly from the sector numbers of concave portions adjacent to the convex portion. Assuming now that the track numbers of the tracks 71, 72, 73, 74 and 75 in FIG. 5A are T, T+1, T+2, T+3 and T+4 respectively, then the track numbers recorded as pre-pits in the address areas 83, 84 and 85 are T, T+2 and T+4 respectively. When the beam spot traces the concave portions 71, 73 and 75, track numbers stored in the address areas thereof are reproduced directly. On the other hand, when the beam spot traces the convex portion 72, track numbers T and T+2 stored in address areas adjacent to the address area of the convex portion 72 are reproduced as crosstalk components. Accordingly, by averaging the numbers according to the arithmetic operation $\{T+(T+2)\}/2$, the correct track number T+1 can be obtained.

Referring to FIG. 2, the operation of the optical information recording/reproducing apparatus configured as described above will be described. Because the processes of radiation of a laser beam to the first optical disk 40 and reflection of the laser beam therefrom are carried out in the same manner as in the conventional apparatus, the detailed description of this apparatus will be omitted but only the point where this apparatus is different from the conventional apparatus, that is, how to perform the operation of detecting identification signals from pre-pits or the like and retrieving information (hereinafter referred to as "seek operation"), will be described below.

When a recording/reproducing start address is designated, the second system controller 56 judges by reference to an address map or the like whether the sector of the designated address exists in a convex portion or whether the sector exists in a concave portion. When the sector of the designated address exists in a convex portion, the polarity of an input signal to the first polarity inverting circuit 50 is inverted through the control signal L4 so that the polarity-inverted signal is outputted from the first polarity inverting circuit 50. When the sector of the designated address exists in a convex portion, the polarity of a signal is not changed so that the signal is outputted directly. At the same time, the second system controller 56 gives the control signal L5 to the first selector 52 and makes the first selector 52 select either of the output of the first waveform shaping circuit 223 and the output of the second waveform shaping circuit 51 so that the former output is used as an input source to be given to the second address reproducing circuit 53 when the sector of the designated address exists in a concave portion, and the latter output is used as the input source when the sector of the designated address exists in a convex portion. Further, the second selector 55 is made to select the tracking control circuit 219 through the control signal L7 so that the output of the tracking control circuit 219 is to be supplied to the driving circuit 220. Then, the traverse control circuit 226 is made to drive the traverse motor 227 through the control signal L2 to thereby move the optical head 216 near to a track in which the target address exists. This operation is called "rough seek". For example, this movement is carried out on the basis of comparison between the number of tracks preliminarily calculated from difference between the address value before the movement and the target address value and the number of traverse tracks obtained from the tracking error signal during the movement. Then, the tracking control circuit 219 is made to turn on through the control signal L1 to thereby control the beam spot to perform tracing on the convex or concave portion. When the tracking leading-in is completed, the output currents of the light-receiving portions 214a and 214b are subjected to I-V conversion and addition amplification by the addition amplifier 221 in the same manner as shown in the description of the prior art with reference to FIG. 40. Then, after unnecessary frequency band components are removed by the HPF 222, the output of the HPF 222 is inputted to the first and second waveform shaping circuits 223 and 51. In the case where the beam spot traces a concave recording track, the first waveform shaping circuit 223 performs waveform shaping of an address signal from the reproduced main component to a digital signal whereafter the first selector 52 is made to deliver the digital signal to the second address reproducing circuit 53 through the control signal L5 given by the second system controller 56. The second address reproducing circuit 53 decodes address data from the digital and delivers the address data to the second system controller 56. Thereafter, the second system controller 56 performs control while regarding the address data as a current address value.

On the other hand, in the case where the beam spot traces a convex recording track, the second waveform shaping circuit 51 performs waveform shaping of an address signal from the reproduced crosstalk component to a digital signal whereafter the first selector 52 is made to deliver the digital signal to the second address reproducing circuit 53 through the control signal L5 given by the second system controller 56. Because the second waveform shaping circuit 51 performs waveform shaping after the input reproducing signal is amplified by a predetermined gain, even the waveform of a signal having small-amplitude crosstalk components can be shaped suitably. The second address reproducing circuit 53 decodes address data from the output of the first selector 52 and delivers the address data to the second system controller 56. The second system controller 56 calculates a current address value from the address data and thereafter performs control on the basis of the current address value. That is, as described above, the second system controller 56 receives two address values (A1 and B1 in the diagram (2) in FIG. 5B or B1 and A2 in the diagram (4) in FIG. 5B) from the second address reproducing circuit 53, calculates the number of a track between tracks designated by the two address values on the basis of the two address values and determines a current address value as well as a sector number common to the two.

The second system controller 56 compares the current address value with the target address value. When the difference between the current address value and the target address value is not smaller than one track, the second system controller 56 makes the second selector 55 connect the output of the jump pulse generating circuit 54 to the input of the driving circuit 220 through the control signal L7 again. Then, the second system controller 56 gives the number of tracks to be jumped to the jump pulse generating circuit 54 through the control signal L6, so that the jump pulse generating circuit 54 supplies driving pulses to the driving circuit 220 to move the actuator 215 by a fine quantity to thereby perform jumping of the set number of tracks. This is called "fine seek". When the fine seek is completed so that the beam spot reaches the target track, tracking leading-in is performed so that the current address value is detected again. After the beam spot reaches the target sector by the rotation of the disk, an information signal is recorded on or reproduced from the target sector and sectors after the target sector in the same manner as shown in the description of the prior art in FIG. 40.

At the time of recording, the second system controller 56 controls the recording operation timing of the recording signal processing circuit 229 and the LD driving circuit 231 through the control signal L3 to prevent recording of main information signals or the like on the blank areas 86, 87, 88, 89 and 90 shown in FIG. 4B.

As described above, according to the optical information recording/reproducing apparatus in this embodiment, the address areas 83 and 84 arranged on the concave recording tracks 71 and 73 are shifted so as not to be adjacent to each other in the track-crossing direction. Accordingly, in the case where the beam spot 70 traces the convex recording track 72, crosstalk components of two identification signals in a detection signal outputted from the photo detector 214 are provided by means of time division. Accordingly, the second waveform shaping circuit 51 can perform two-valuing of the identification signals from the crosstalk component suitably, so that the second address reproducing circuit 53 can decode address information accurately. Accordingly, because address information can be obtained in two types recording tracks, that is, concave and convex recording tracks, it is possible to form address areas only in the concave recording tracks in order to reduce the number of processes for producing an optical disk. Furthermore, because main information signals or the like are not recorded in the blank areas 86, 87, 88, 89 and 90 at the time of recording, unnecessary recording signals are prevented from mixing as noise in the crosstalk component of the reproduced identification signal. Accordingly, accuracy in reading address information can be improved.

Although this embodiment shows the case where address areas are arranged in concave recording tracks, it is to be understood that the same effect can be obtained in the case where address areas are arranged in convex recording tracks.

Although this embodiment shows a seeking operation in which the second system controller 56 selects the polarity of the output of the first polarity inverting circuit 50 at the time of starting of seeking on the basis of judgment as to whether the destination of seeking is a concave recording track or a convex recording track to thereby move the beam spot to the target recording track through rough seeking and fine seeking, it may be preferable that a seeking operation from a concave portion to a concave portion or from a convex portion to a convex portion and a seeking operation from a concave portion to a convex portion or from a convex portion to a concave portion are switched over as follows. That is, in the former case, the beam spot can be made to reach the target recording track directly if the second system controller 56 performs rough seeking and fine seeking without changing the polarity of the output of the first polarity inverting circuit 50. In the latter case, the second system controller 56 performs rough seeking and fine seeking without changing the polarity of the output of the first polarity inverting circuit 50 to thereby make the beam spot reach a recording track adjacent to the target recording track. Then, the polarity of the output of the first polarity inverting circuit 50 is inverted and, at the same time, a driving pulse signal corresponding to track jumping of the beam spot by the width of ½ of the guide groove pitch is generated from the jump pulse generating circuit 54 to the driving circuit 220. Such ½ track jumping can be substantially realized by using the 1 track jumping method employed in the conventional optical disk. That is, such ½ track jumping can be substantially realized by the same method as Bang-Bang control using acceleration/deceleration pulses at regular intervals as disclosed in Murayama et al., "Optical Disk Technique (Third Edition)", pp. 163-164, issued by RADIO GIJUTSUSHA. Because the polarity of a tracking error signal does not change at the time of starting of seeking if the seeking operation is carried out as described above, the number of traverse tracks at the time of rough seeking can be measured accurately so that a higher-speed seeking operation can be provided.

Figure 6A:
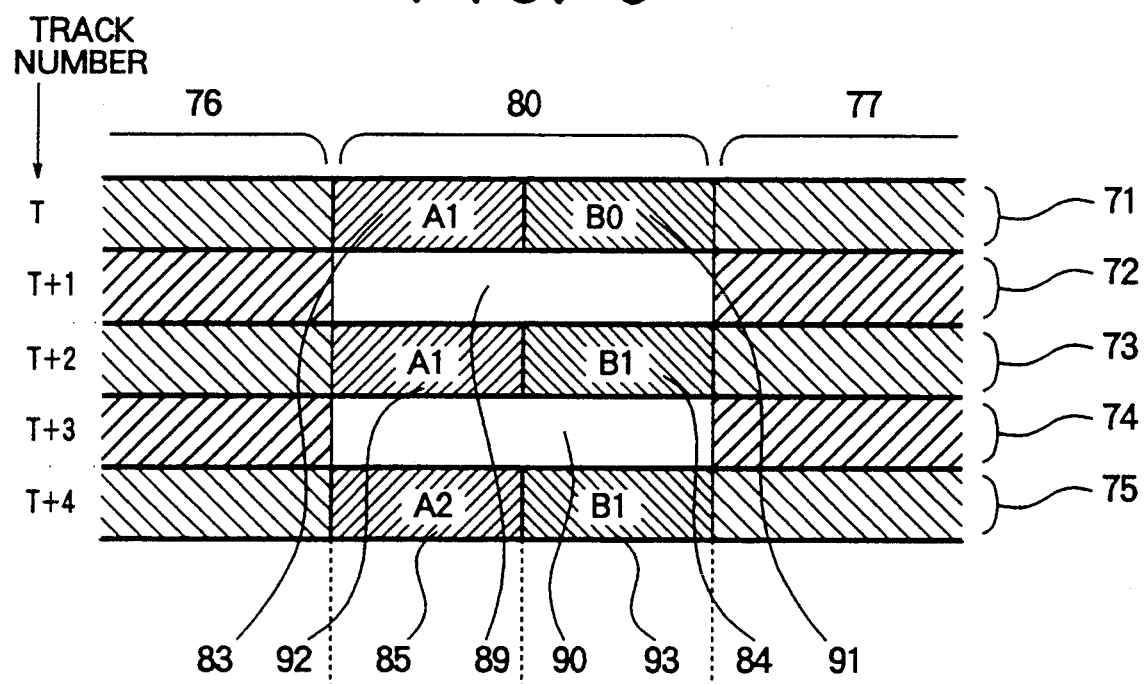
FIGS. 6A and 6B are a detailed structural view of an identification signal portion in another embodiment of the first optical disk and a timing chart of a reproducing signal thereof according to the present invention.

Although this embodiment shows the case where pre-pits are not formed on the blank areas 86, 87 and 88 as shown in FIG. 5A, the present invention can be applied to the case where the same pre-pit pattern as that of an adjacent address area on the inner or outer circumferential side is formed. FIG. 6A is a detailed structural view showing the vicinity of an identification signal portion of such a second optical disk. In the drawing 6A the reference numeral is 71, 73 and 75 designate concave portions; 72 and 74, convex portions; 76 and 77, main information signal portions; 80, an identification signal portion; 89 and 90, blank areas; and 83, 84 and 85, address areas. These parts are substantially equivalent to the parts designated by reference numerals in FIG. 5A. The reference numerals 91, 92 and 93 designate address areas constituted by pre-pits. The pit pattern of each of the address areas 91, 92 and 93 is the same as the pit pattern of an adjacent address area on the disk inner circumferential side (the upper side in the drawing). That is, address signals A1 and B1 are recorded in the address areas 92 and 93, respectively. Though not shown in FIG. 5A, an address signal B0 is recorded in the address area 91.

Figure 6B:
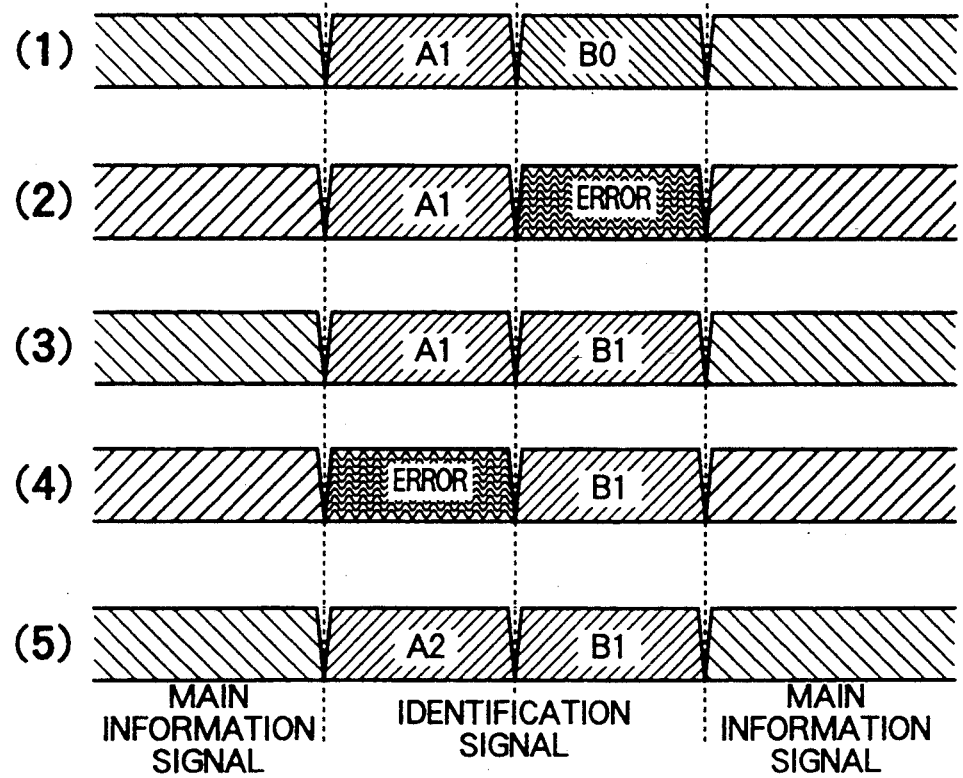

FIG. 6B is a timing chart of a reproducing signal in the case where the beam spot traces convex and concave portions. In FIG. 6B, the diagram (1) is a timing chart in the case where the concave portion 71 is traced, the diagram (2) is a timing chart in the case where the convex portion 72 is traced, the diagram (3) is a timing chart in the case where the concave portion 73 is traced, the diagram (4) is a timing chart in the case where the convex portion 74 is traced, and the diagram (5) is a timing charting the case where the concave portion 75 is traced. In FIG. 5B, the transversal axis represents time, and the longitudinal axis represents the amplitude of the reproducing signal. The broken lines between FIGS. 6A and 6B show correspondence between position and time. In the concave portion 71, a beam spot performs tracing on the address areas 83 and 91 to thereby reproduce addresses A1 and A2 as shown in the diagram (1). In the concave portion 73, a beam spot performs tracing on the address areas 92 and 84 to thereby reproduce addresses A1 and B1 as shown in the diagram (3). In the concave portion 75, a beam spot performs tracing on the address areas 85 and 93 to thereby reproduce addresses A2 and B1 as shown in the diagram (5). As described above, in these recording tracks, main components modulated with pre-pits of address areas are obtained as address signals. On the other hand, in the convex portion 72, crosstalk components from the address areas of the concave portions 1 and 73 are reproduced when the beam spot traces the blank area 89. In the first half of the blank area 89, address areas 83 and 92 of the same pit pattern (A1) are arranged in concave portions 71 and 73 adjacent thereto, so that the degree of modulation of the beam spot is doubled compared with the case where there is no address area 92. Accordingly, the amplitude of the reproducing signal is also doubled as shown in the diagram (2) in FIG. 6B. This is very effective for improvement of accuracy in detection of address signals. In the second half of the blank area 89, bit patterns of the two adjacent address areas 91 and 84 are different from each other (B0 and B1), so that the reproducing signal synthesized from crosstalk components obtained from the two adjacent address areas 91 and 84 respectively is made error. This signal is not used as an address signal. Like the case of the Convex portion 72, in the case of the convex portion 74, the address value B1 of adjacent address areas 84 and 90 is reproduced as an address signal. Accordingly, the track numbers of two adjacent concave portions can be known by detecting these address signals, so that the track number of the currently traced convex portion can be calculated. Assuming now that the track numbers of the tracks 71, 72, 73, 74 and 75 in FIG. 6A are T, T+1, T+2, T+3 and T+4 respectively, then the track numbers of the pit patterns B0, A1, B1 and A2 are set to T−1, T+1, T+3 and T+5 respectively. When the beam spot traces the concave portion 71, the track numbers of the address signals to be reproduced are T+1 and T−1 in the first and second halves respectively. Accordingly, by averaging the two numbers according to the arithmetic operation {(T+1)+(T−1)}/2, the correct track number T can be obtained. When the beam spot traces the concave portion 72, the track numbers of the address signals to be reproduced are T+1 and error in the first and second halves respectively. Hence, T+1 is employed as the track number directly. By the above method, correct address signals, particularly, track numbers, can be obtained also in the concave portion 73, the convex portion 74 and the concave portion 75.

Figure 7:
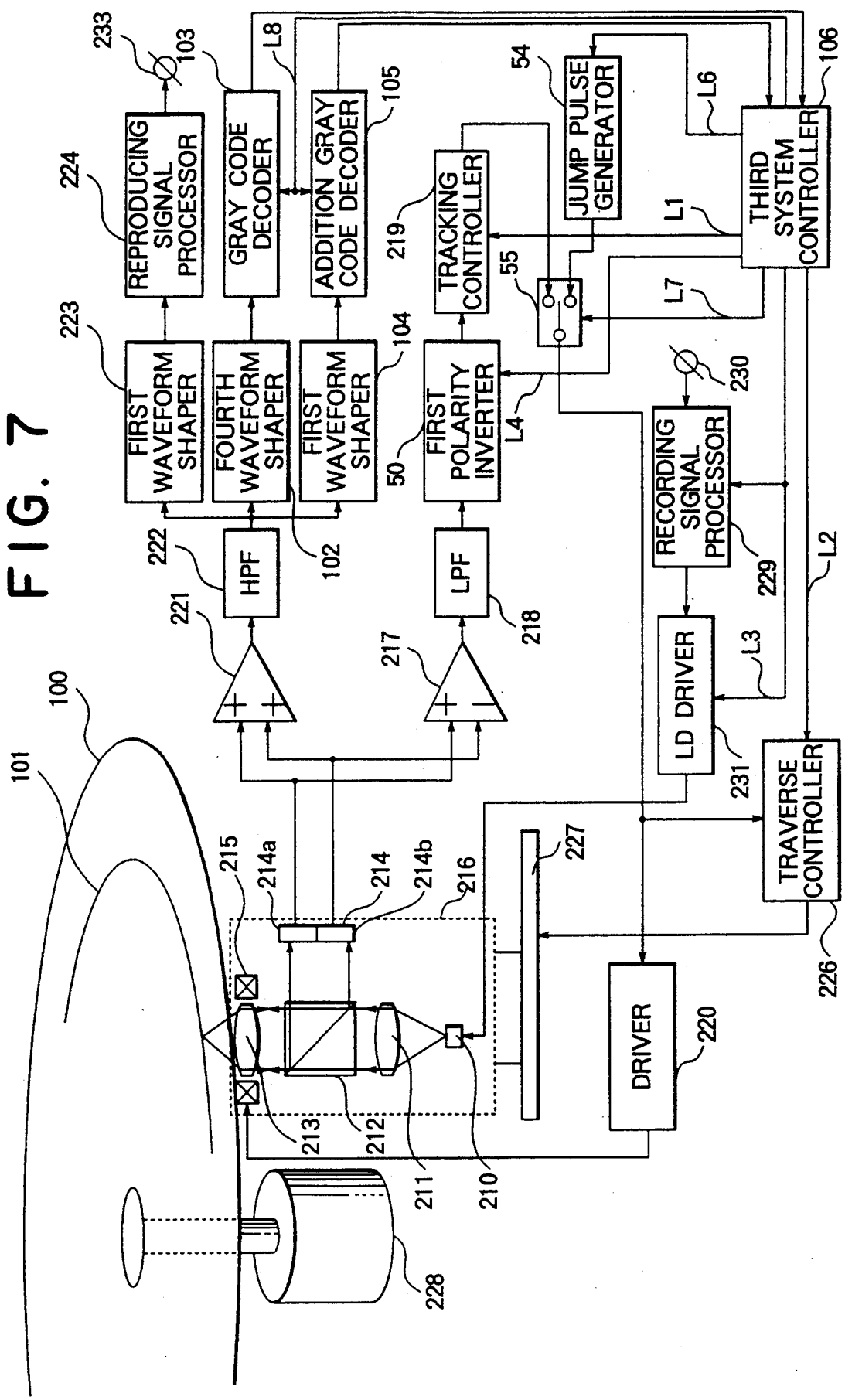
FIG. 7 is a block diagram showing the configuration of a second optical information recording/reproducing apparatus according to the present invention.

A second optical information recording/reproducing apparatus according to the present invention will be described below. FIG. 7 is a block diagram of the optical information recording/reproducing apparatus. In the drawing, the reference numeral 210 designates a semiconductor laser; 211, a collimator lens; 212, a half mirror; 213, an objective lens; 214, a photo detector; 214a and 214b, light-receiving portions thereof; 215, an actuator; 216, an optical head; 217, a differential amplifier; 218, a low pass filter (LPF); 219, a tracking control circuit; 220, a driving circuit; 221, an addition amplifier; 222, a high pass filter (HPF); 224, a reproduction signal processing circuit; 226, a traverse control circuit; 227, a traverse motor; 228, a spindle motor; 229, a recording signal processing circuit; 230, an external input terminal; 231, an LD driving circuit; 233, an output terminal; 50, a first polarity inverting circuit; 223, a first waveform shaping circuit; 54, a jump pulse generating circuit; and 55, a second selector. These parts are substantially similar to constituent parts of the optical recording/reproducing apparatus according to the first embodiment of the present invention shown in FIG. 2. Accordingly, reference numerals given to the constituent parts of the apparatus are given to these parts for omission of detailed description.

The structure of portions different from portions in FIG. 2 will be described below. The reference numeral 100 designates a second optical disk using Gray code as track number in the identification signal portion. The reference numeral 101 designates a recording track of the second optical disk 100. The reference numeral 102 designates a fourth waveform shaping circuit which receives an output signal from the HPF 222 and gives a digital signal to a Gray code decoding circuit. The reference numeral 103 designates a Gray code decoding circuit which receives the digital signal from the fourth waveform shaping circuit 102 and a control signal L8 from a third system controller and gives address data to the third system controller. The reference numeral 104 designates a fifth waveform shaping circuit which receives an output signal from the HPF 222 and gives a digital signal to an addition Gray code decoding circuit. The reference numeral 105 designates an addition Gray code decoding circuit which receives the digital signal from the fifth waveform shaping circuit 104 and a control signal L8 from the third system controller and gives address data to the third system controller. The reference numeral 106 designates a third system controller which receives address signals from the Gray code decoding circuit 103 and the addition Gray code decoding circuit 105 and gives control signals L1, L2, L3, L4, L6, L7 and L8 to the tracking control circuit 219, the traverse control circuit 226, the LD driving circuit 231, the first polarity inverting circuit 50, the jump pulse generating circuit 54, the second selector 55, the Gray code decoding circuit 103 and the addition Gray code decoding circuit 105 respectively. As is obvious from the above configuration, this embodiment is characterized in that so-called Gray code patterns are used as identification signals arranged on the second optical disk 100.

Figures 8A, 8B:
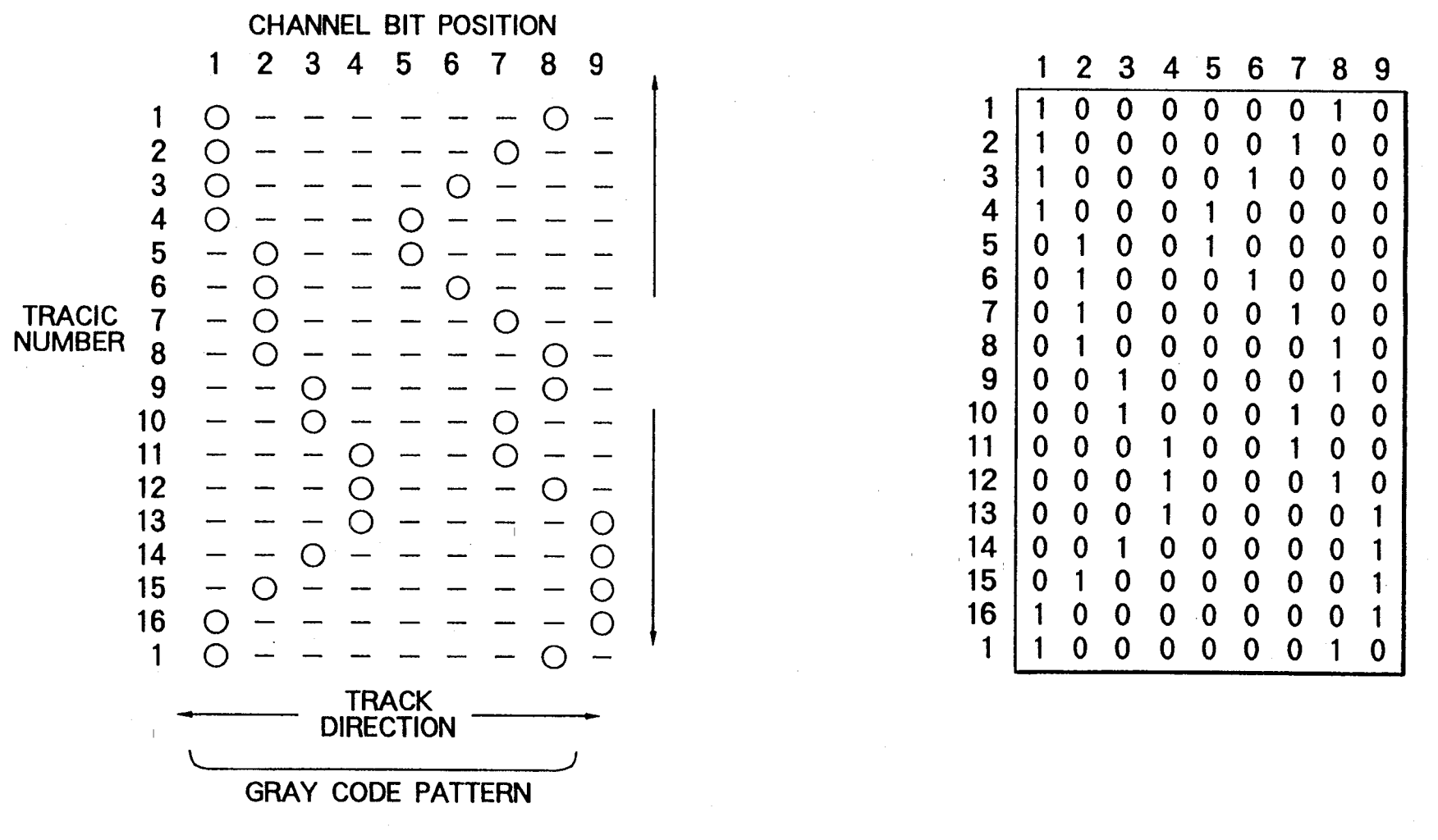

Gray code patterns used in the optical disk 100 will be described with reference to the drawings. FIGS. 8A and 8B show an example of Gray code patterns adapted to track numbers. In this example, 16 kinds of 9-bit unit patterns from 1 to 16 are set as Gray code patterns and assigned for track numbers so-that a series of patterns is repeated every 16 tracks. FIG. 8A shows a series of patterns on the disk. In FIG. 8A, "○" represents the existence of pits, "−" represents the non-existence of pits, the transversal numerals represent channel bit positions, and the longitudinal numerals represent track numbers. FIG. 8B shows binary codes obtained by reading the Gray code patterns in FIG. 8A. As is obvious from the drawings, this series of patterns is characterized in that the bit position in one of unit patterns of adjacent tracks always changes by one channel bit compared with the bit pattern in the other unit pattern of the adjacent tracks.

Figures 10A, 10B:
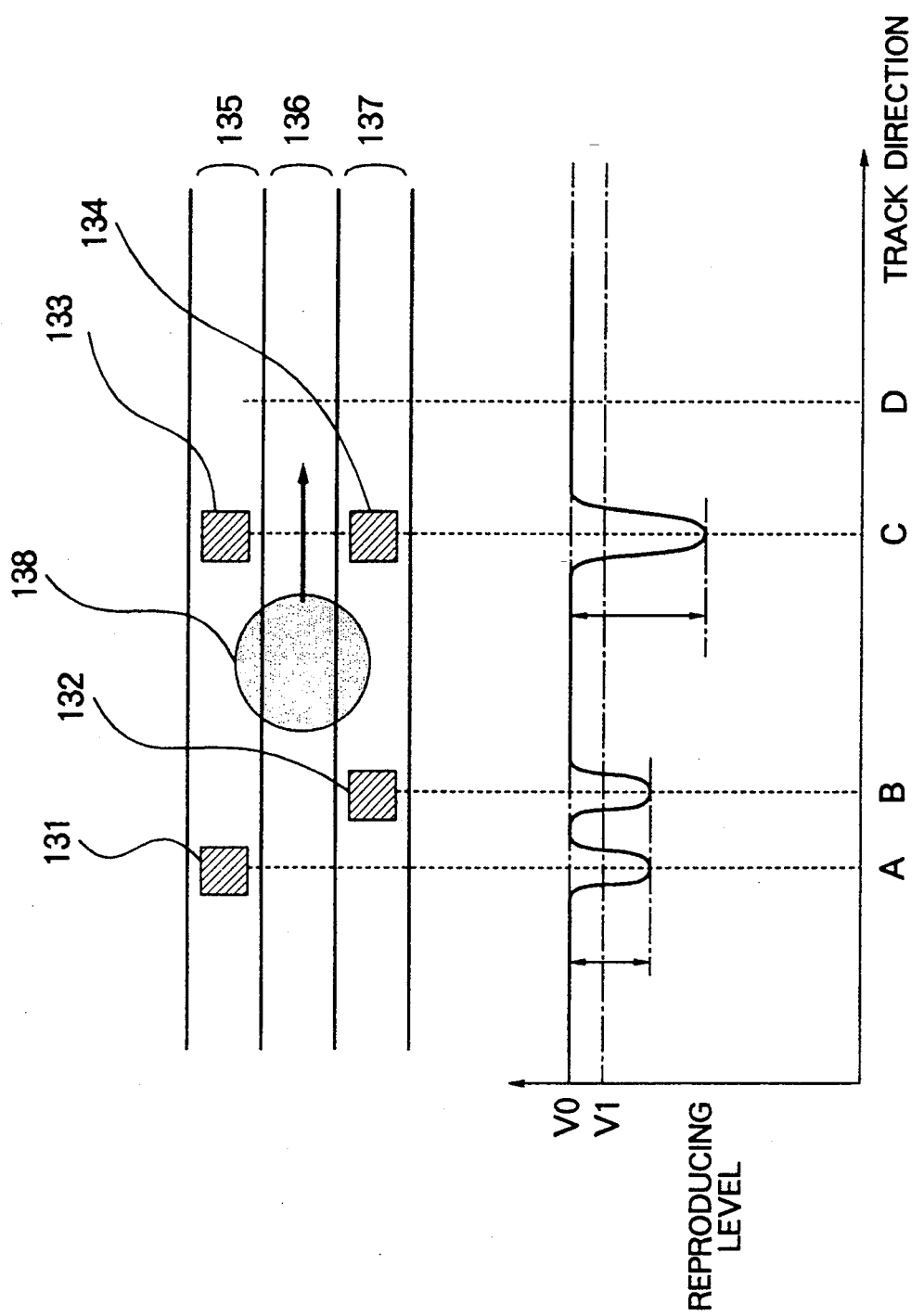
FIGS. 10A and 10B are views showing the relation between pit arrangement on a concave portion and reproducing signal waveform in the case where a beam spot traces a convex portion in an address area of the second optical disk according to the present invention.

The structure of the optical disk 100 will be described below more in detail. FIGS. 9A and 9B are structural views of a sector in the second optical disk 100 in this embodiment. In the drawings, the reference numeral 70 designates the direction of tracing of the beam spot. The reference numerals 111, 113 and 115 designate concave portions; 112 and 114, convex portions; 116, 117, 118 and 119, main information signal portions; 120, 121 and 122, identification signal portions; and 126 and 127, blank areas. Because this structure is equivalent to the sector structure in the first embodiment shown in FIGS. 4A to 4C, the detailed description thereof will be omitted. The reference numerals 128, 129 and 130 designate address areas formed on the concave portions 111, 113 and 115 and having the same structure as shown in FIG. 4C. Track numbers and sector numbers are expressed by Gray code patterns shown in FIGS. 8A and 8B. How to detect address signals in the above structure will be described below. At the time of reproduction on the concave portions 111, 113 and 115, the beam spot performs tracing on the address areas 128, 129 and 130 directly so that information, such as sector mark, sync pattern, address mark, track number and sector number, recorded in these areas can be reproduced. The Gray codes of track number and sector number thus reproduced are converted into generally-used binary codes through a conversion table using memory or the like. On the other hand, at the time of reproduction on the convex portions 112 and 114, the beam spot performs tracing on the blank areas 126 and 127 but signals recorded in address areas on the opposite sides of the blank areas are reproduced as crosstalk in the same manner as described above in the first embodiment. In this case, the relation between crosstalk signal and pit arrangement of address areas on opposite sides is as shown in FIGS. 10A and 10B. FIGS. 10A and 10B are views showing the relation between pit arrangement on concave portions and reproducing signal waveform in the case where the beam spot traces a convex portion. FIG. 10A is a view of arrangement of pits, and FIG. 10B is a graph view of reproducing signal waveform. In FIG. 10A, the reference numerals 131, 132, 133 and 134 designate pre-pits set as identification signals on concave portions in advance. The reference numerals 135 and 137 designate concave portions; and 136, a convex portion. In FIG. 10B, the abscissa represents the tracking-direction position of the beam spot, and the ordinate represents the quantity of reproduced light. Because the optical information recording/reproducing apparatus in this embodiment uses CAV control, pre-pits in address areas are aligned in radial directions. Accordingly, when attention is given to one convex track, pit arrangement of concave portions on opposite sides of the convex portion is classified into the following three cases: the case where a pit exists in either of the concave portions on opposite sides of the convex portion as represented by position A and position B in FIG. 10B; the case where pits exist in the opposite sides as represented by position C in FIG. 10B; and the case where there is no pit on the opposite sides as represented by position D in FIG. 10B. When the beam spot is on the convex portion between the concave portions in the respective cases, the quantity of reproduced light is as shown in FIG. 10B. Assuming now that the quantity of light reproduced in position D in which there is no pit on the opposite sides is regarded as a reference $V_0$, then the quantity of reproduced light in positions A and B is reduced by $\alpha$ as shown in FIG. 10B because of scattering of the beam caused by the pit of the adjacent concave portion whereas the quantity of reproduced light in position C is reduced by $\beta$ larger than $\alpha$ because of scattering of the beam caused by the pits of the two adjacent concave portions. Accordingly, if a level lower by $\alpha/2$ than $V_0$ is used as a threshold for data slicing as shown in FIG. 10B when the reproducing signal is two-valued, a signal expressing the logical sum of pits in the address areas of the concave portions on the opposite sides is reproduced. Because sector mark, sync pattern and address mark among signals of address areas shown in FIG. 4C have pit patterns common to all sectors, the summation signal based on crosstalk is also equal to one of the original signals. Because sectors adjacent to each other in the track-crossing direction in this embodiment have the same sector number, the summation signal based on crosstalk is also equal to one of the original signals. On the other hand, track numbers use Gray code patterns shown in FIG. 8, so that the summation signal based on crosstalk is generated as shown in FIG. 11B. FIG. 11A shows Gray codes arranged in concave recording tracks, and FIG. 11B shows two-valued codes of crosstalk summation signals in convex recording tracks. The Gray codes shown in FIG. 11A are the same as the Gray codes shown in FIG. 8B. FIG. 11B shows results of summation of codes of adjacent track numbers shown in FIG. 11A. Hereinafter, the results of summation are called "addition Gray codes". Because Gray codes of adjacent tracks are formed so that any one bit position in the unit pattern changes by one channel bit, it is apparent from FIG. 11B that the summation Gray codes are different from each other. Accordingly, by detecting the code patterns of the summation Gray codes, the respective track numbers of the concave portions on the opposite sides can be identified so that the track number of the convex portion can be identified. In this manner, an address signal can be detected in accordance with the Gray code pattern.

Referring to FIG. 7, the operation of the optical information recording/reproducing apparatus of this embodiment configured as described above will be described below. Because the operation of the optical information recording/reproducing apparatus in this embodiment is substantially similar to the operation of the optical information recording/reproducing apparatus in the first embodiment shown in FIG. 2, the detailed description thereof will be omitted but different points, that is, how to detect identification signals, will be described below.

When a recording/reproducing start address is designated, the third system controller 106 judges by reference to an address map or the like whether the sector of the designated address exists in a convex portion or whether the sector exists in a concave portion. When the sector of the designated address exists in a convex portion, the polarity of an input signal to the first polarity inverting circuit 50 is inverted through the control signal L4 so that the polarity-inverted signal is outputted from the first polarity inverting circuit 50. When the sector of the designated address exists inca convex portion, the polarity of a signal is not changed so that the signal is outputted directly. At the same time, the third system controller 106 gives the control signal L8 to the Gray code decoding circuit 103 and the addition Gray code decoding circuit 105 so that the Gray code deciding circuit 103 and the addition Gray code decoding circuit 105 are turned to an operative state and an inoperative state respectively when the given address is in a concave portion, and the Graylcode deciding circuit 103 and the addition Gray code decoding circuit 105 are turned to an inoperative state and an operative state respectively when the given address is in a convex portion. In these states, rough seeking and tracking leading-in are performed.

The reproducing signals from the light-receiving portions 214a and 214b are inputted to the first waveform shaping circuit 223, the fourth waveform shaping circuit 102 and the fifth waveform shaping circuit 104 via the addition amplifier 221 and the HPF 222. In the case where the beam spot traces an address area of a concave recording track, the fourth waveform shaping circuit 102 performs waveform shaping to a digital signal by two-valuing the reproducing signal reproduced from the address area of the concave portion and delivers the digital signal to the Gray code decoding circuit 103. The Gray code decoding circuit 103 converts track number expressed in Gray code into general address data allowed to be used in the system controller on the basis of a conversion table constituted by memory or the like and delivers the address data together with other identification signals such as sector number to the third system controller 106. Thereafter, the system controller 106 performs control while regarding the address data as a current address value.

On the other hand, in the case where the beam spot traces a convex recording track, the fifth waveform shaping circuit 104 performs waveform shaping to a digital signal by two-valuing the reproducing signal reproduced by crosstalk from identification signal portions of two concave portions adjacent to the convex portion and delivers the digital signal to the addition Gray code decoding circuit 105. The addition Gray code decoding circuit 105 converts track number expressed in Gray code into general address data allowed to be used in the system controller on the basis of a conversion table constituted by memory or the like and delivers the address data together with other identification signals such as sector number to the third system controller 106. Thereafter, the third system controller 106 performs control while regarding the address data as a current address value.

As described above, according to the optical information recording/reproducing apparatus in this embodiment, Gray codes are used as track numbers arranged as pre-pits in the address areas 128 and 129, so that when the beam spot traces a Convex recording track 112, the addition Gray code decoding circuit 105 can decode address information accurately by using crosstalk components obtained from the address areas 128 and 129. Accordingly, because address information can be obtained in two types of recording tracks, that is, concave and convex recording tracks, it is possible to form address areas only in concave recording tracks so that the number of processes required for manufacturing optical disks can be reduced.

It is a matter of course that any other code may be used as the address code for track number as long as patterns generated by logical summation of adjacent unit patterns are different from each other. Examples of Gray code allowed to be used in this embodiment are shown in FIGS. 12A to 12D. Alternatively, patterns as described in detail in JP-A 3-168927 may be used.

A third optical disk and an optical information recording/reproducing apparatus using the disk will be described below in detail.

Figure 13:
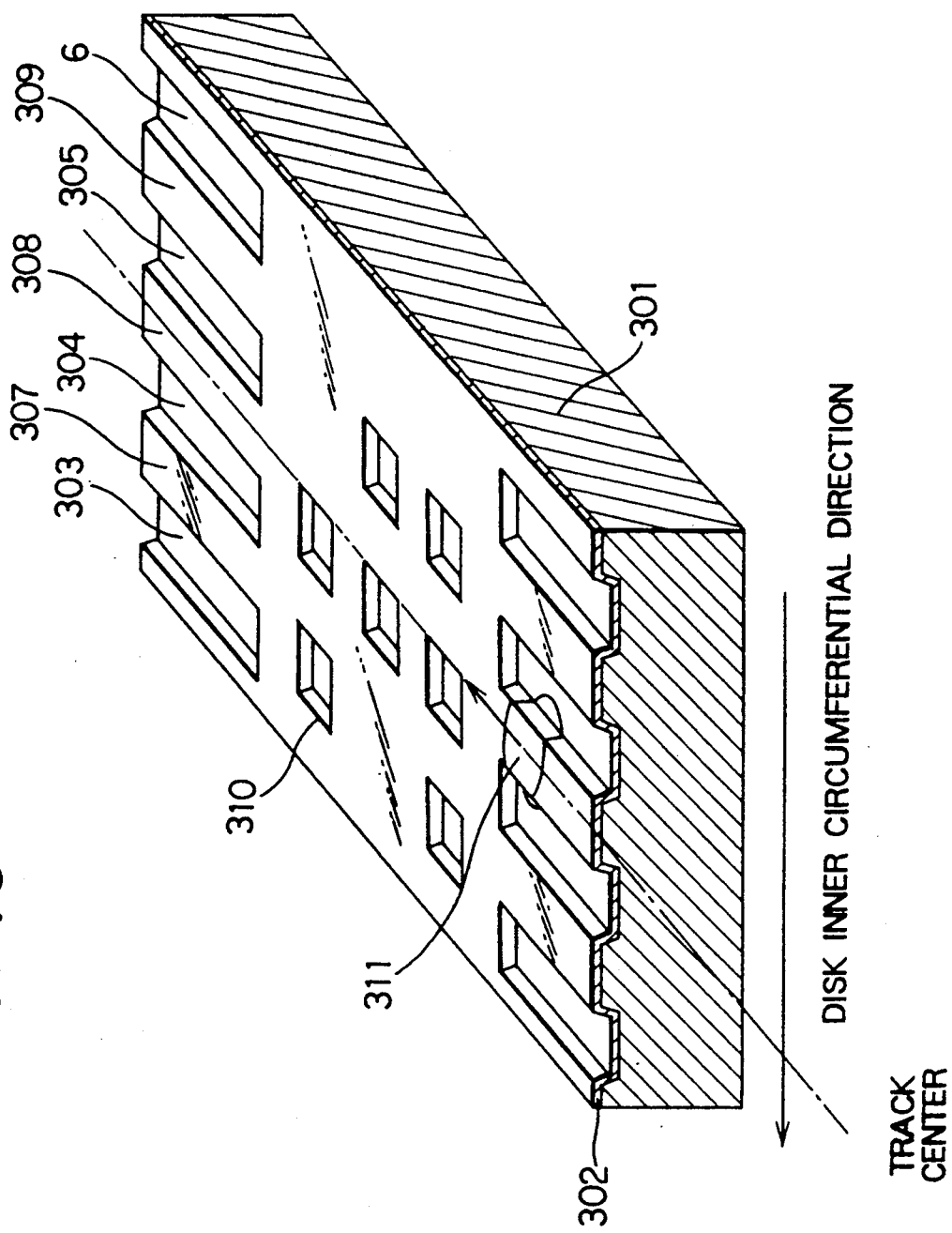
FIG. 13 is an enlarged perspective view showing the configuration of a third optical disk according to the present invention.

FIG. 13 is an enlarged perspective view of a recording surface of a third optical disk according to the present invention. In the drawing, the reference numeral 301 designates a disk substrate; 302, a recording layer; 303, 304, 305 and 306, concave portions formed spirally and serving as guide grooves for tracking control; 307, 308 and 309, convex portions between the concave portions. The concave portions and the convex portions are arranged at intervals of the pitch Tp. In this drawing, the concave/convex portions are lined up in numerical order so that low-numbered concave/convex portions are arranged in the inner circumferential side. The reference numeral 310 designates pre-pits aligned in the convex-concave form in areas where guide grooves are interrupted. The respective center lines of pre-pit trains are shifted by $\frac{1}{4}$ of Tp from the respective center lines of the guide grooves to the outer circumferential side. That is, one pre-pit area corresponds to a combination of a concave portion and a convex portion adjacent to each other. Identification signals are recorded according to the arrangement of such pre-pits 310. For simplification, this drawing shows the case where the number of identification signal pre-pits is not larger than 3 per one track. The number of pre-pits is however actually from the order of tens to the order of hundreds according to the information capacity of the identification signal. The reference numeral 311 designates a beam spot converged into the recording layer by an objective lens and the like. The beam spot 311 is scanned along the center line of a concave or convex portion (hereinafter referred to as "track center") as shown in FIG. 13.

Figure 14:
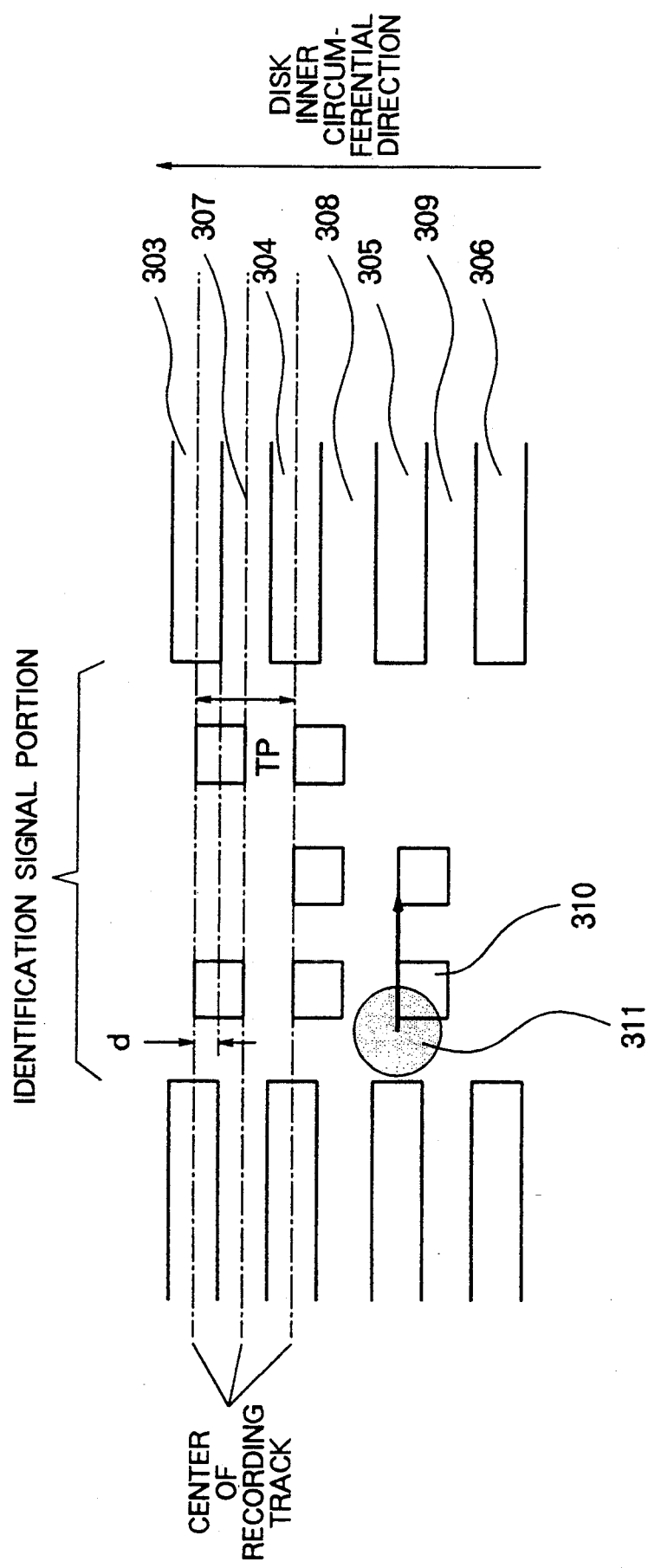
FIG. 14 is an enlarged plan view showing the positional relation between pre-pits of an identification signal portion in the third optical disk and a beam spot according to the present invention.

When an information signal is to be recorded/reproduced, the beam spot 311 moves on a concave or convex portion along the track center. Though the beam spot 311 reaches guide groove interruption area, scanning is performed along the track center if the interruption area passing time is sufficiently short. The positional relation between the beam spot 311 and a pre-pit 310 in this case is shown in FIG. 14. FIG. 14 is an enlarged view of a recording surface of the optical disk in this embodiment, from just above. When the beam spot 310 moves along the track center of a concave portion, the right half of the beam spot 310 in the direction of movement of the spot overlaps a pre-pit 310 in an interruption area. When the beam spot 310 moves along the track center of a convex portion, the left half of the beam spot 310 overlaps a pre-pit 310. In any case, the reflected light of the beam spot is modulated with such a pre-pit. Accordingly, address information or the like can be obtained if the modulated light is detected by a photo detector or the like. Further, when the depth of the pre-pit 310 calculated as an optical length is set to $\frac{1}{4}$ of the wave length of a radiation beam generating the beam spot, the degree of modulation of the reflected light can be maximized.

Figure 15:
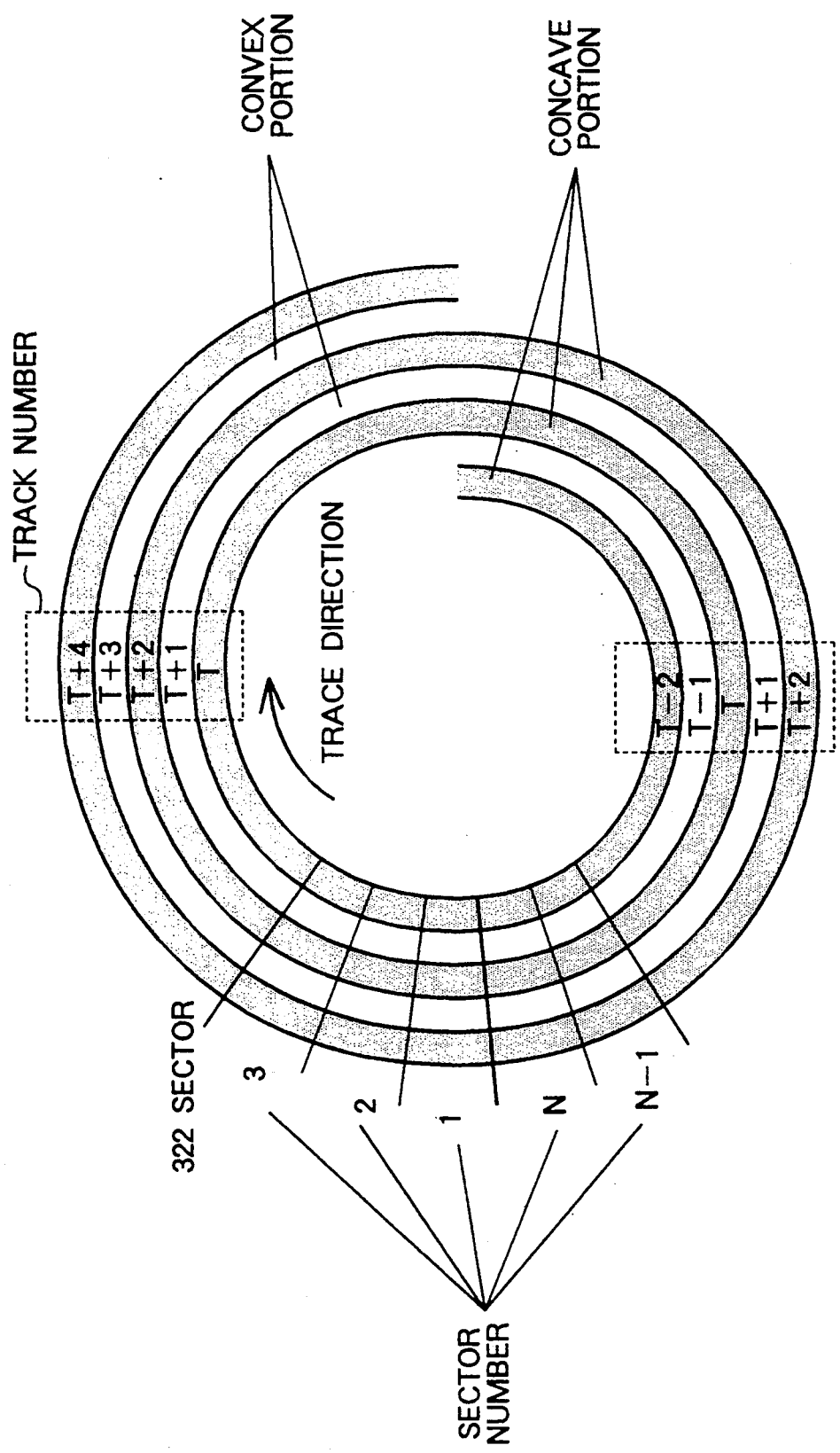
FIG. 15 is a view showing the structure of recording tracks in the third optical disk according to the present invention.

The track format of the optical disk in this embodiment will be described below. FIG. 15 is a structural view of recording tracks. In the drawing, the reference numeral 320 designates concave portions; and 321, convex portions. Recording track numbers are assigned to respective tracks so that the tracks are numbered through the concave and convex portions at intervals of one rotation. A beam spot rotates to perform tracing clockwise from the inner circumferential side to the outer circumferential side so that recording track numbers are represented by T, T+1, T+2, T+3 and T+4 in the drawing. The reference numeral 322 designates sectors obtained by diving one rotation of each track into N groups. Sector numbers of from No. 1 to No. N are given to the N sectors, respectively. Because the recording tracks are shaped like a helical coil, the concave portions are formed so that sector No. N of track No. T is connected to sector No. 1 of track No. T+2. Further, the convex portions are formed so that sector No. N of track No. T+1 is connected to sector No. 1 of track No. T+3. These recording track numbers and sector numbers are preliminarily formed on the disk as pre-pits as described above. In this embodiment, address data in convex recording tracks are recorded as pre-pits. When a convex recording track is traced, the current position information can ba obtained easily by adding 1 to the track number in the address data reproduced from prepits. Further, because the sector numbers of adjacent sectors in radial directions are equal to each other, signals reproduced from pre-pits in concave and convex recording tracks can be used as position information directly.

Figure 16:
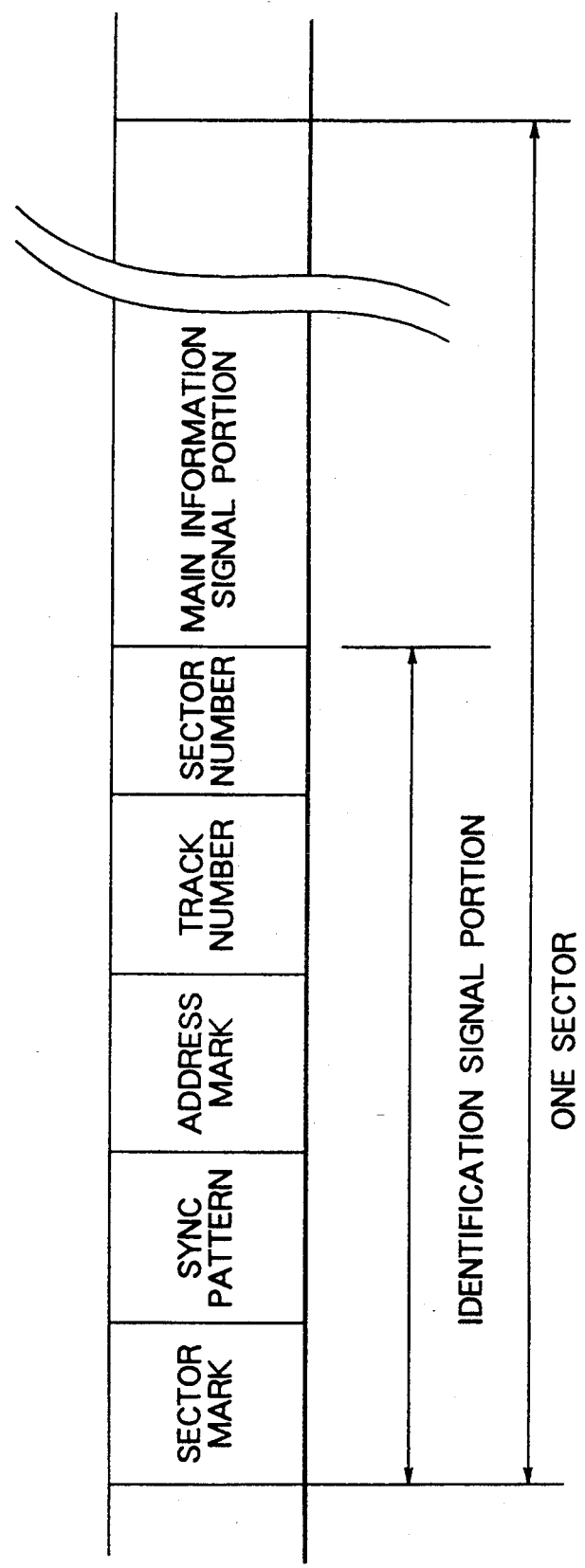
FIG. 16 is a view showing a sector format in the third optical disk according to the present invention.

FIG. 16 is a view for explaining the format of identification signals per one sector. As shown in FIG. 16, one sector is composed of an identification signal area and a main information signal area. The identification signal area is composed of a sector mark block, a sync pattern block, an address mark block, a track number block, and a sector number block. The respective blocks function as follows.

1) Sector mark: This block shows the head of a sector.
2) Sync pattern: This block generates address data reproduction clock pulses.
3) Address mark: This block shows the start of address data.
4) Track number, sector number: These blocks show address data.

Among these blocks, the sector mark block, the sync pattern block and the address mark block may be equalized in all sectors.

Figure 17:
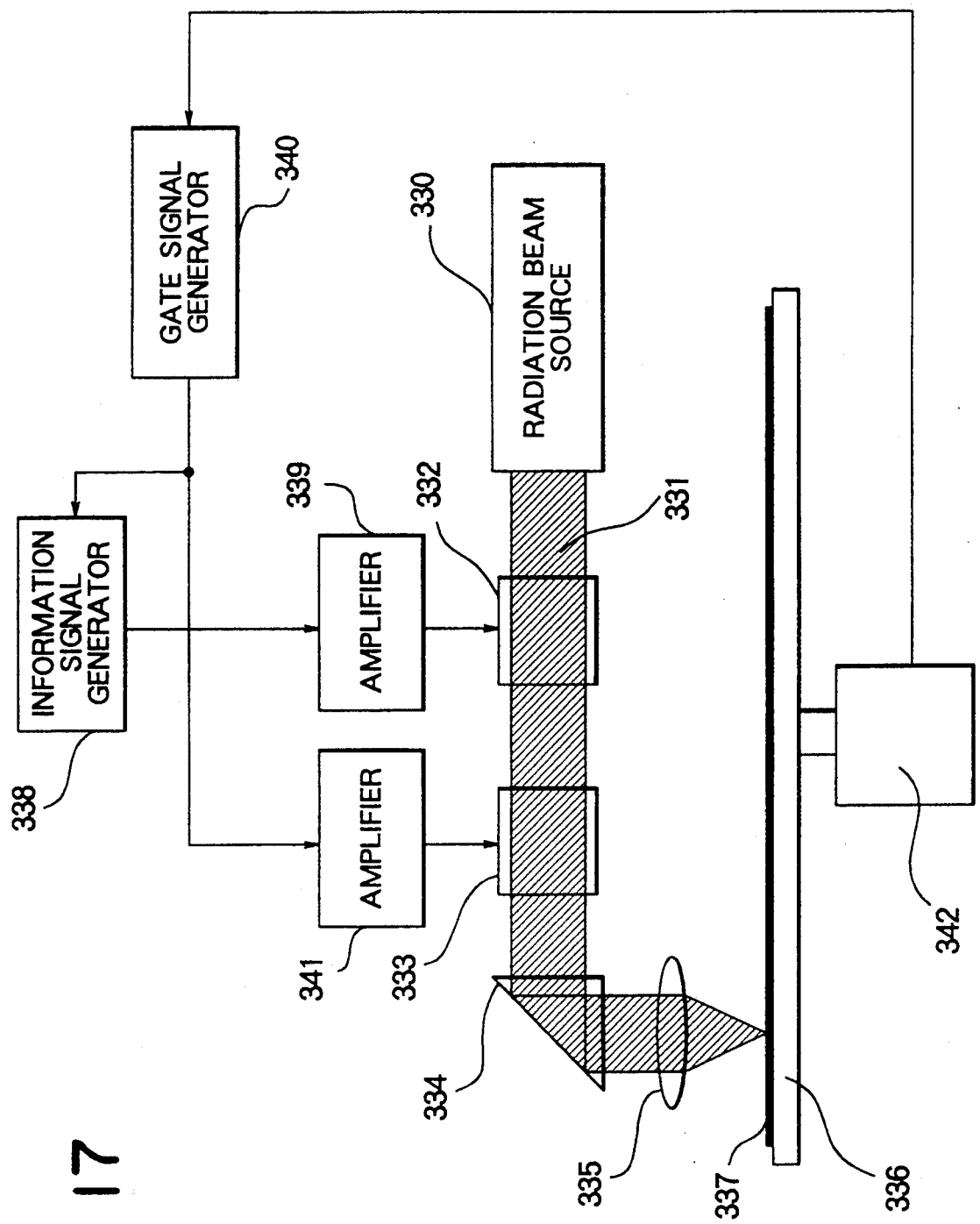
FIG. 17 is a block diagram showing the configuration of main parts in an apparatus of producing the third optical disk according to the present invention.

For example, a method described in JP-A-50-68413 is used as the method for production of the optical disk in this embodiment. An apparatus of producing the optical disk in this embodiment will be described below briefly with reference to the drawings. FIG. 17 is a block diagram showing the configuration of the apparatus. The reference numeral 330 designates a radiation beam source such as a laser light source for radiating a radiation beam 331 having sufficient energy. The radiation beam 331 passes through a light intensity modulator 332, a light deflector 333 and a mirror prism 334 and is converged to a fine radiation beam spot by an objective lens 335. A radiation beam sensing layer 337 such as a photoresist layer is applied to a recording carrier 336 such as an optical disk substrate. The light intensity modulator 332 intercepts the radiation beam 331 in accordance with the identification signal given from an identification signal generator 338 through an amplifier 339. Accordingly, the identification signal outputted from the identification signal generator 338 is converted into radiation beam pulses and converted into photosensitive mark trains on the radiation beam sensing layer 337. Upon reception of gate pulse signal from a gate signal generator 340, the identification signal generator 338 generates an identification signal. For example, the light intensity modulator 332 can be constituted by a photoelectric crystal for rotating the direction of deflection of the radiation beam in response to application of a voltage, and an analyzer for converting the direction change of a deflection surface into the change of light intensity.

Further, the light deflector 333 makes the angle of the radiation beam 331 change by a very small value so that the fine beam spot is moved by a predetermined width on the recording carrier in the direction of the radius thereof only when a gate pulse signal is given from the gate signal generator 340 connected through an amplifier 341. The gate signal generator 340 generates a gate pulse signal having a length equal to the length of the identification signal in a predetermined period in synchronism with a rotation phase signal outputted from a motor 342 for rotating the recording carrier 336 and delivers the gate pulse signal to the identification signal generator 338 and the amplifier 341. As a result, a continuous track is written on the radiation beam sensing layer when the gate pulse signal is absent, but an identification signal is written as a mark train in a position shifted by a predetermined quantity in the radial direction compared with the continuous track when the gate pulse signal is generated. In this manner, the continuous track and the pre-pit train as an identification signal can be written on the radiation beam sensing layer 337 by a series of operations. That is, the identification signal is expressed by intermission of the continuous track. After writing, a disk substrate is completed though steps such as etching, transferring, shaping, etc.

Figure 18:
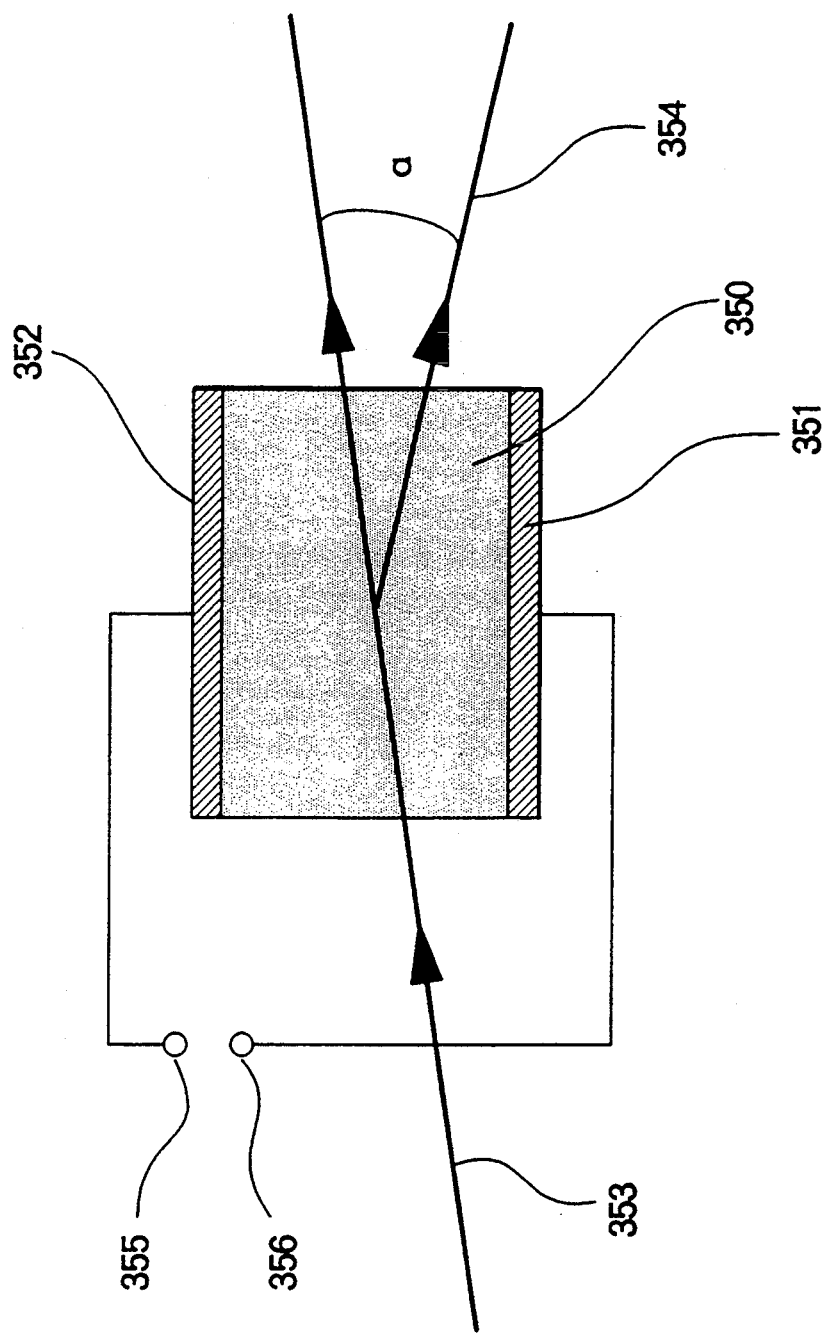
FIG. 18 is a structural view of an acoustic-optical element used in the apparatus of producing the third optical disk according to the present invention.

The light deflector 341 can be constituted by a so-called acoustic-optical deflector. FIG. 18 shows an acoustic-optical element used as the deflector 341. In the acoustic-optical element, an acoustic-optical cell 350 is provided with two electro-mechanical transducers 351 and 352 connected to terminals 355 and 356 respectively. When an electric signal is supplied between the terminals 355 and 356, an acoustic wave with a certain frequency is generated in a medium such as glass within the cell 350. As a result, Bragg refraction occurs in the medium so that a part of the radiation beam 353 is deflected by an angle α as a sub-beam 354. The angle is proportional to the frequency of the supplied electric signal.

As described above, according to the optical disk in this embodiment, the respective center lines of pre-pit trains are shifted by ¼ of the guide groove pitch from the respective center lines of the guide grooves to the outer circumferential side. Accordingly, both in concave recording tracks and in convex recording tracks, the beam spot can be sufficiently modulated with pre-pits so that the identification signal can be detected. Further, there is no necessity of forming pre-pits both in concave recording tracks and in convex recording tracks, so that the number of processes required for production of an optical disk can be reduced.

Figure 19:
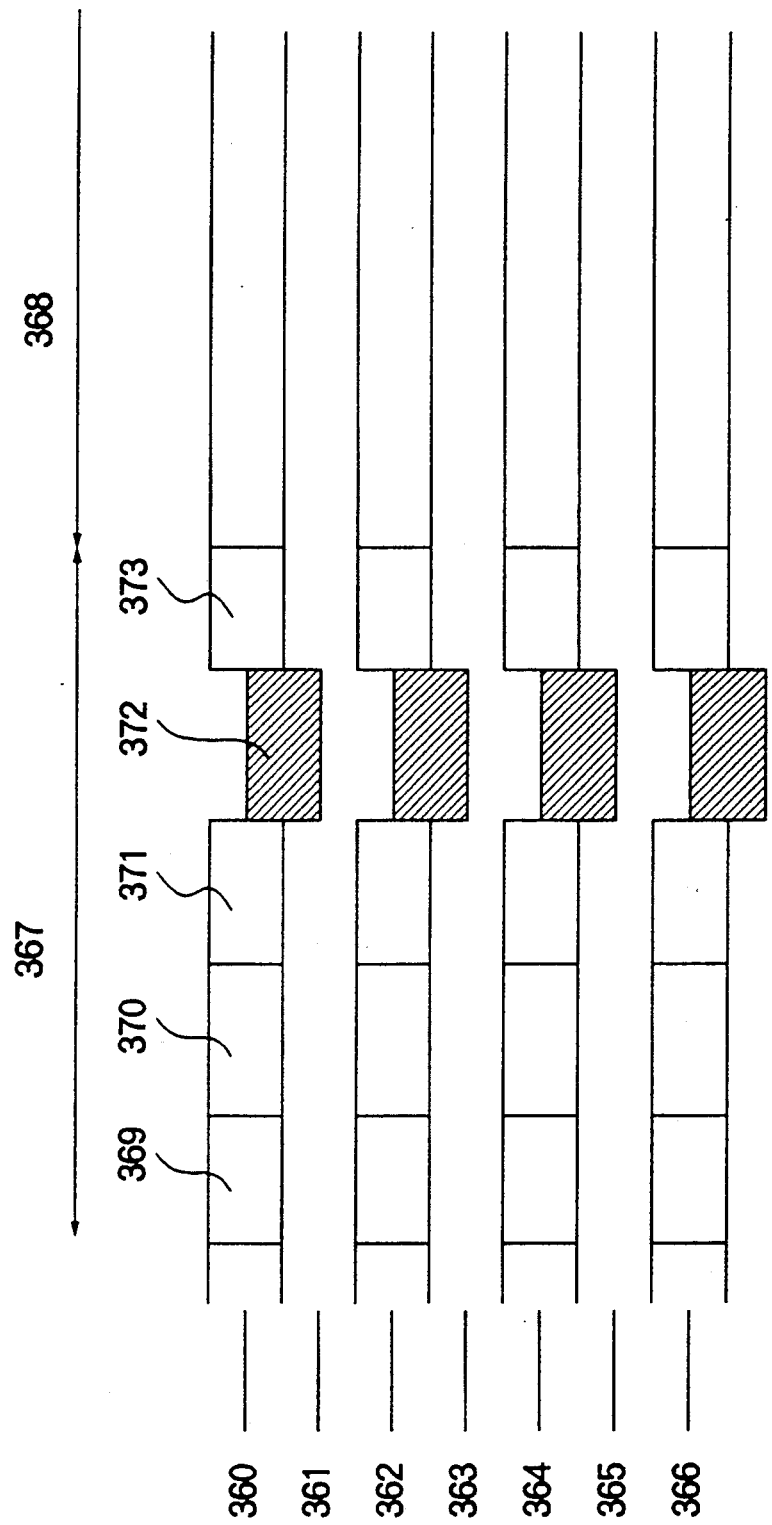
FIG. 19 is a schematic view showing the structure of recording tracks in another embodiment of the third optical disk according to the present invention.

Although this embodiment shows the case where all identification signal areas in the optical disk are shifted in radial directions, the present invention can be applied to the case where identification signal areas are shifted only when there is difference between adjacent recording tracks. FIG. 19 shows an example of a sector format of such a disk. The reference numerals 360, 362, 364 and 366 designate concave portions; 361, 363 and 365, convex portions; 367, an identification signal portion; 368, a main information signal portion; 369, an area in which a sector mark is recorded; 370, an area in which a sync pattern is recorded; 371, an area in which an address mark is recorded; 372, an area in which a track number is recorded; and 373, an area in which a sector number is recorded. Among the respective identification signal blocks shown in FIG. 16, only the track number block is shifted but the other blocks are formed so that pre-pits are formed on concave recording tracks. Because these blocks have the same pattern between adjacent tracks, even in the case where the beam spot traces a convex portion, the beam spot is modulated with pre-pits of convex portions on opposite sides of the traced convex portion. Accordingly, even in convex portions, identification signals can be reproduced from these blocks. In the case of such configuration, a segment in which a pre-pit is shifted from the track center is short so that there arises an advantage in that tracking control of the beam spot is stabilized.

Figure 20:
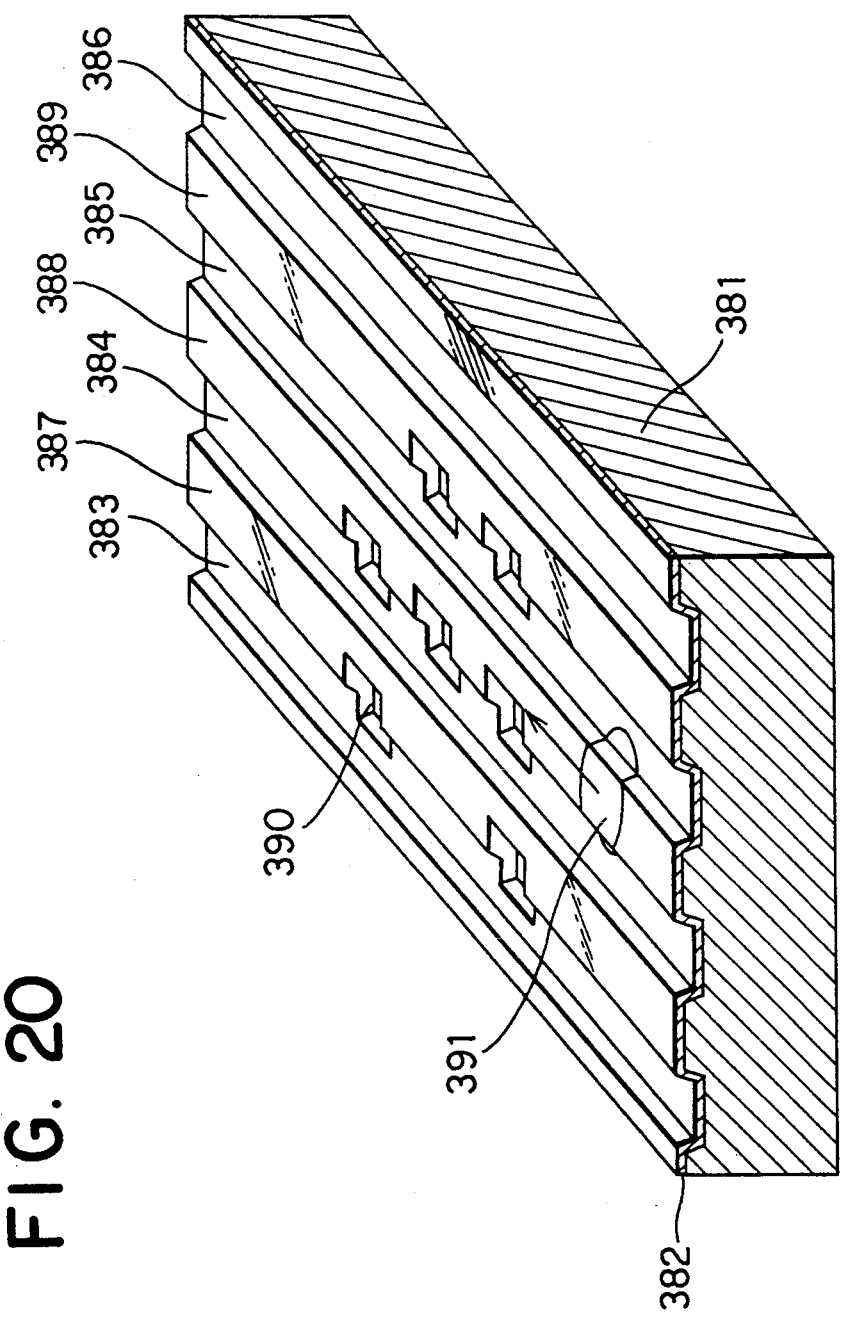
FIG. 20 is an enlarged perspective view of an optical disk in which guide grooves are not interrupted, in another embodiment of the third optical disk according to the present invention.

Although this embodiment shows the case where an identification signal is arranged in a segment in which a concave portion constituted by a guide groove is interrupted, the present invention can be applied to the case where identification signals are arranged by making pre-pits overlap a continuous guide groove as shown in FIG. 20. In this case, there is no interruption of the guide groove, so that tracking control is stabilized.

An optical information recording/reproducing apparatus for recording an information signal on the third optical disk and for reproducing or erasing the information signal from the third optical disk will be described below with reference to the drawings.

Figure 21:
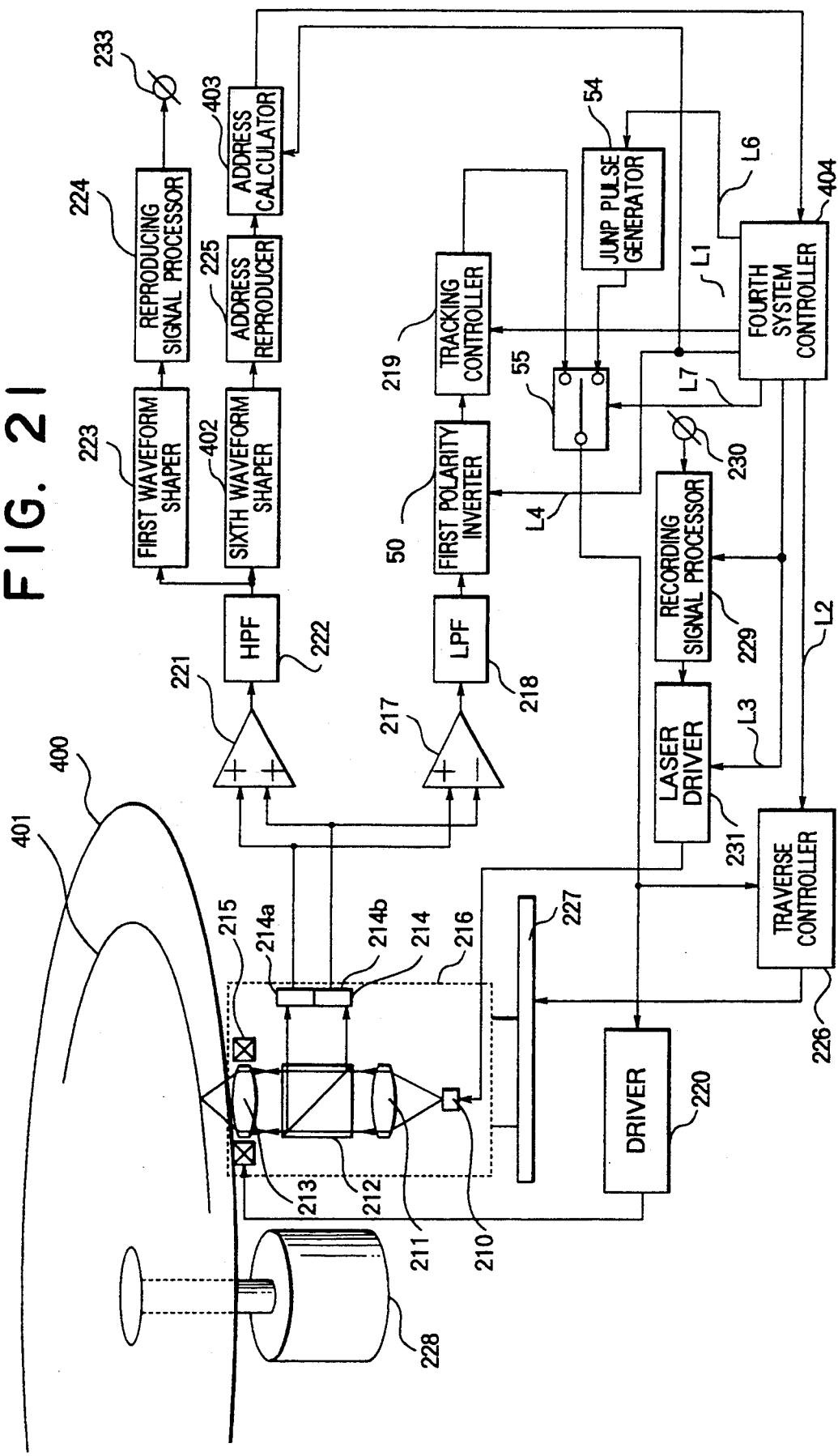
FIG. 21 is a block diagram showing the configuration of a third optical information recording/reproducing apparatus using the third optical disk according to the present invention.

FIG. 21 is a block diagram showing the configuration of the optical information recording/reproducing apparatus. In the drawing, the reference numeral 210 designates a semiconductor laser; 211, a collimator lens; 212, a half mirror; 213, an objective lens; 214, a photo detector; 214a and 214b, light-receiving portions thereof; 215, an actuator; 216, an optical head; 217, a differential amplifier; 218, a low pass filter (LPF); 219, a tracking control circuit; 220, a driving circuit; 221, an addition amplifier; 222, a high pass filter (HPF); 223, a first waveform shaping circuit; 224, a reproduction signal processing circuit; 225, an address reproducing circuit; 226, a traverse control circuit; 227, a traverse motor; 228, a spindle motor; 229, a recording signal processing circuit; 230, an external input terminal; 231, an laser driving circuit; and 233, an output terminal. Because these parts are substantially equivalent to the constituent parts of the conventional optical information recording/reproducing apparatus shown in FIG. 40, reference numerals given to the constituent parts of the conventional apparatus are given to these parts for omission of detailed description. Further, the reference numeral 50 designates a first polarity inverting circuit; 223, a first waveform shaping circuit; 54, a jump pulse generating circuit; and 55, a second selector. These parts are substantially similar to constituent parts of the first optical information recording/reproducing apparatus shown in FIG. 2.

Figure 40:
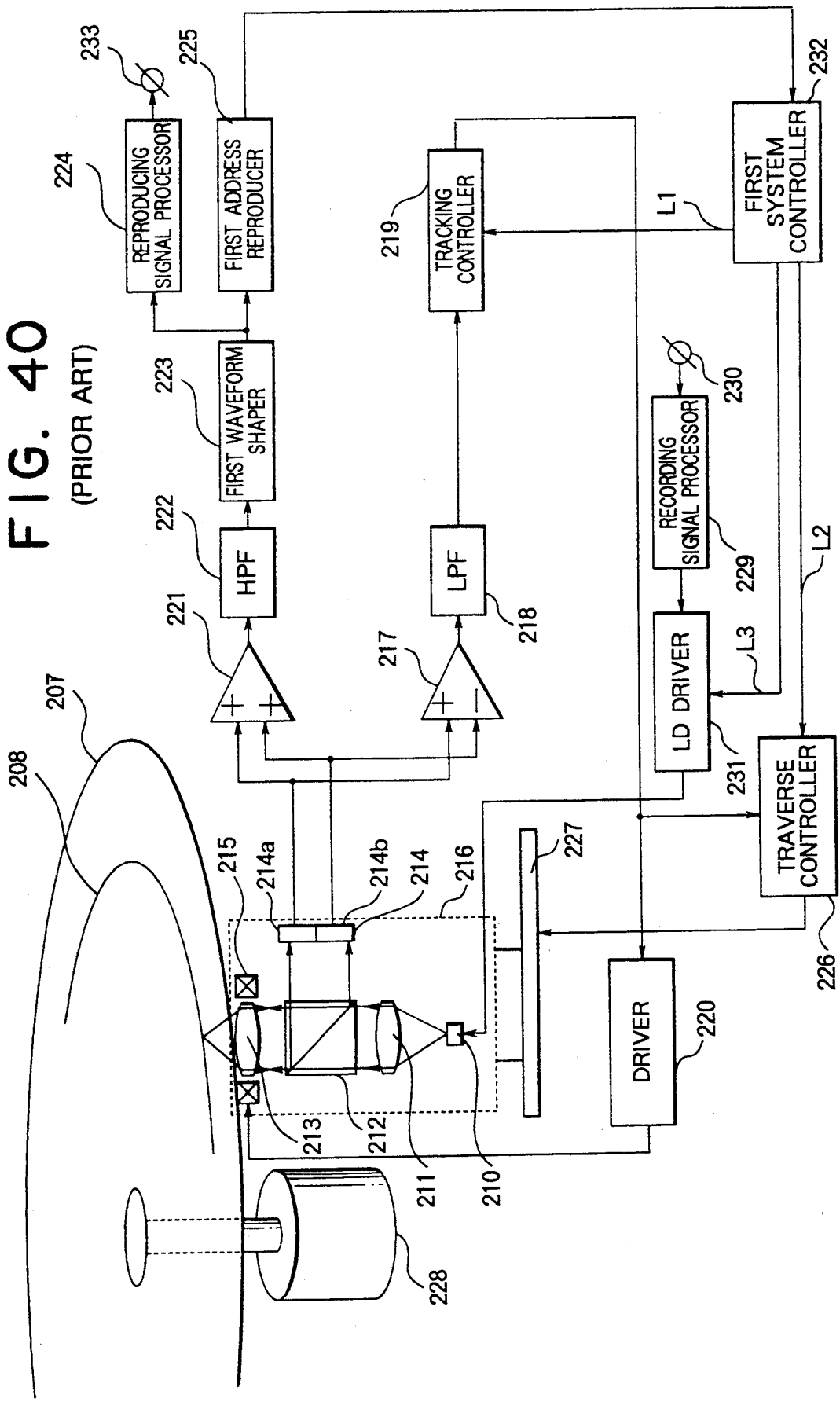
FIG. 40 is a block diagram showing the configuration of the conventional optical information recording/reproducing apparatus.
Figure 41:
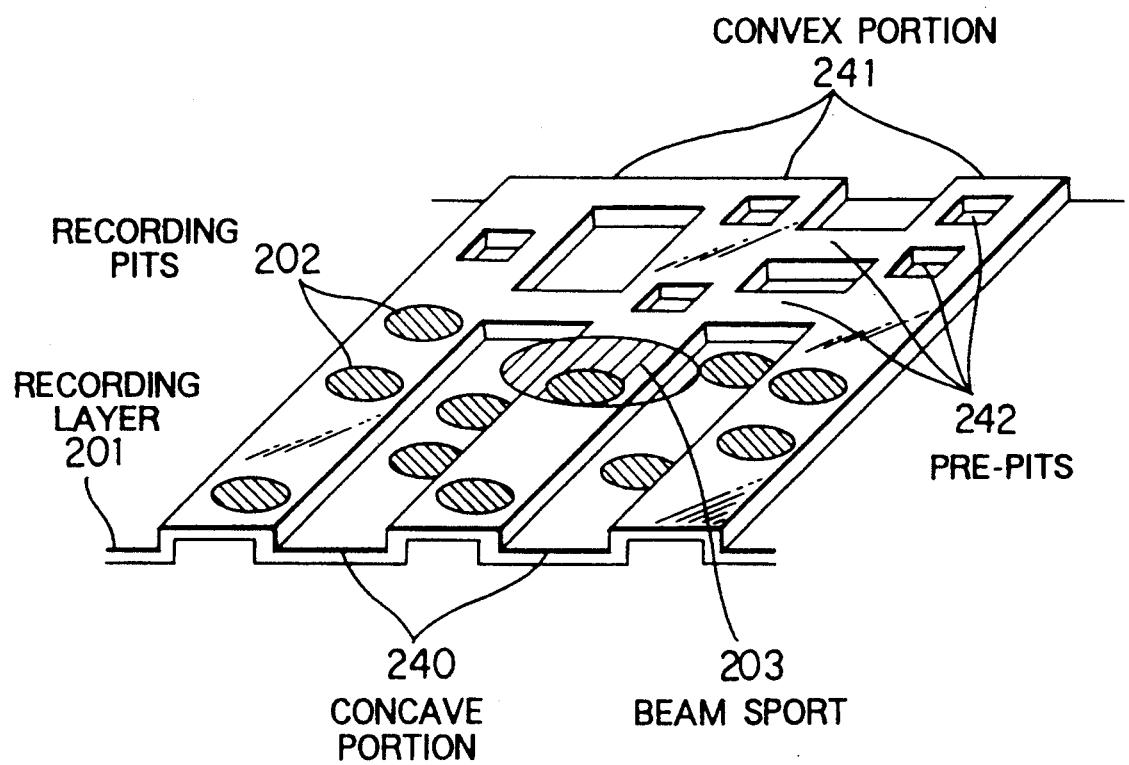
FIG. 41 is an enlarged perspective view for explaining the configuration of the conventional optical disk in which signals are recorded both in concave recording tracks and in convex recording tracks.

In the following, points in which the configuration shown in FIG. 21 is different from those in FIGS. 2 and 40 are described. The reference numeral 400 designates a third optical disk as described above with reference to FIG. 13; 401, a recording track thereof; and 402, a sixth waveform shaping circuit which receives high-frequency components of a summation signal from the HPF 222 and delivers a digital signal to the address reproducing circuit 225. The reference numeral 403 designates an address calculation circuit which receives an address signal from the address reproducing circuit 225 and the control signal L4 from a fourth system controller and delivers a correct address signal to the fourth system controller. The reference numeral 404 designates a system controller which receives the address signal from the address calculation circuit 403 and delivers control signals L1, L2, L3, L4, L6 and L7 to the tracking control circuit 219, the traverse control circuit 226, the laser driving circuit 231, the recording signal processing circuit 229, the first polarity inverting circuit 50, the address calculation circuit 403, the jump pulse generating circuit 54 and the first selector 55 respectively.

The operation of the optical information recording-/reproducing apparatus configured as described above will be described with reference to the drawings. Because the processes of radiation of a laser beam to the optical disk 400 and reflection of the laser beam therefrom are carried out in the same manner as in the conventional apparatus, the detailed description of this apparatus will be omitted but only the point where this apparatus is different from the conventional apparatus, that is, how to perform the operation of detecting identification signals from pre-pits or the like and seeking a target address, will be described below.

When a recording/reproducing start address is designated, the fourth system controller 404 judges by reference to an address map or the like whether the sector of the designated address exists in a convex portion or whether the sector exists in a concave portion, and outputs a judgment signal as L4. It is now assumed that the level of the signal L4 becomes low in the case of a concave portion whereas the level of the signal L4 becomes high in the case of a convex portion. When the start address is an address in a convex portion, the polarity of an input signal to the first polarity inverting circuit 50 is inverted. When the start address is an address in a concave portion, the polarity of a signal is not changed so that the signal is outputted directly. Further, the second selector 55 is made to select the tracking control circuit 219 through the control signal L7 so that the output of the tracking control circuit 219 is supplied to the driving circuit 220. Then, the traverse control circuit 226 is made to drive the traverse motor 227 through the control signal L2 to thereby perform rough seeking. This movement is carried out on the basis of comparison between the number of tracks preliminarily calculated from difference between the address value before the movement and the target address value and the number of traverse tracks obtained from the tracking error signal during the movement. Then, the tracking control circuit 219 is made to turn on through the control signal L1 to thereby control the beam spot to perform tracing on the convex or concave portion. When the tracking leading-in is completed, the output currents of the light-receiving portions 214a and 214b are subjected to I-V conversion and addition amplification by the addition amplifier 221 in the same manner as shown in the description of the prior art with reference to FIG. 40. Then, after unnecessary frequency band components are removed by the HPF 222, the output of the HPF 222 is inputted to the first and sixth waveform shaping circuits 223 and 406. In the case where the beam spot performs tracing on an interruption area, the reproducing signal outputted from the HPF 222 is a signal modulated with pre-pits. Upon reception of the reproducing signal from the HPF 222, the sixth waveform shaping circuit 402 performs waveform shaping to a digital signal by amplifying the reproducing signal to predetermined amplitude and two-valuing the amplified reproducing signal, and delivers the digital signal to the address reproducing circuit 225. The address reproducing circuit 225 decodes address data from the digital signal and delivers the address data to the address calculation circuit 403. When the level of the judgment signal L4 from the fourth system controller 404 is low, the address calculation circuit 403 delivers the input address data to the fourth system controller 404 directly while regarding the input address data as a current address. On the contrary, when the level of the judgment signal L4 is high, the address calculation circuit 403 adds 1 to the track number in the address data and delivers the resulting data to the fourth system controller 404. Thereafter, the fourth system controller 404 performs control while regarding the given value as a current address value.

The fourth system controller 404 compares the current address value with the target address value. When the difference between the current address value and the target address value is not smaller than one track, the fourth system controller 404 makes the second selector 55 connect the output of the jump pulse generating circuit 54 to the input of the driving circuit 220 through the control signal L7 again. Then, the fourth system controller 404 gives the number of tracks to be jumped to the jump pulse generating circuit 54 through the control signal L6, so that the jump pulse generating circuit 54 supplies driving pulses to the driving circuit 220 to move the actuator 215 by a fine quantity to thereby perform jumping of the set number of tracks. When the beam spot reaches the target track, tracking leading-in is performed so that the current address value is detected again. After the beam spot reaches the target sector by the rotation of the disk, an information signal is recorded on or reproduced from the target sector and sectors after the target sector. At the time of reproduction, upon reception of the reproducing from the HPF 222, the first waveform shaping circuit 22 performs waveform shaping to a digital signal by amplifying the reproducing signal to predetermined amplitude and two-valuing the amplified reproducing signal, and delivers the digital signal to the reproduction signal processing circuit 224. Because the amplitude of the main information signal based on recording marks is different from the reproduction amplitude of the identification signal based on pre-pits, the amplification factor of the first waveform shaping circuit 223 is set to be different from the amplification factor of the sixth waveform shaping circuit 402. The reproduction signal processing circuit 224 decodes the digital signal, corrects error and delivers the correct signal to the output terminal 233. Further, the operation of this apparatus at the time of recording is the same as that of the conventional optical information recording/reproducing apparatus shown in FIG. 40.

As described above, according to the optical information recording/reproducing apparatus in this embodiment, the fourth system controller 404 judges whether the track currently scanned by the light beam is a concave portion or a convex portion, so that the address calculation circuit 403 calculates the address of the position currently scanned by the light beam on the basis of the judgment result and the address data decoded by the address reproducing circuit 225. Accordingly, the address can be read correctly.

Although this embodiment is adapted to an optical disk in which pre-pits are shifted by ¼ of the guide groove pitch from the respective center lines of the guide grooves to the outer circumferential side, the present invention can be also applied to an optical disk in which pre-pits are shifted to the inner circumferential side. In this case, the value to be added to the track number in the address calculation circuit 403 is changed from +1 to −1 when the level of the judgment signal L4 is high.

In the optical information recording/reproducing apparatus in the first embodiment, when the beam spot traces an identification signal portion, the distribution of intensity of reflected light is biased to thereby make tracking control unstable because pre-pits are shifted in the radial directions. A fourth optical information recording/reproducing apparatus to prevent this problem will be described below with reference to the drawings.

Figure 22:
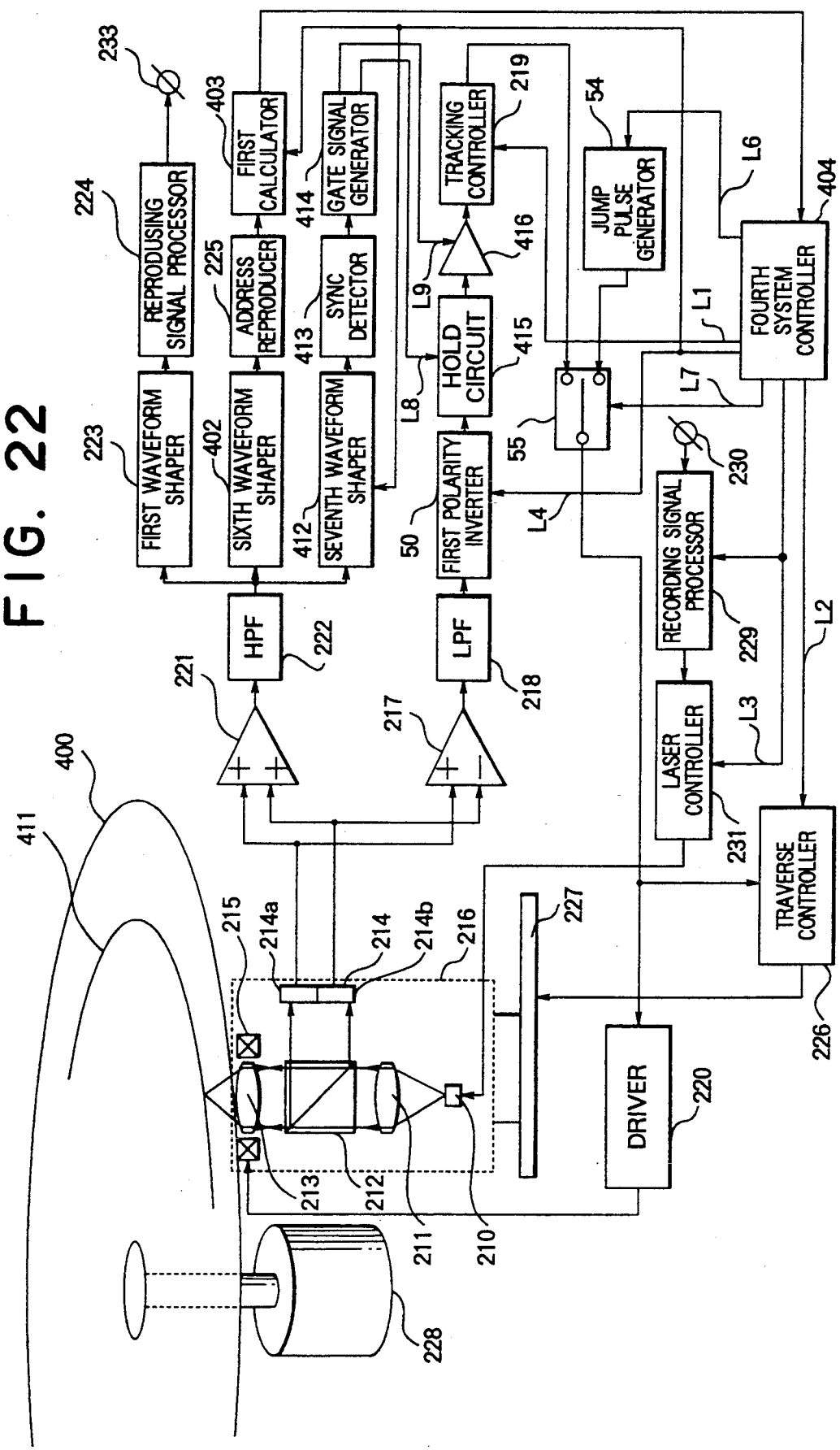
FIG. 22 is a block diagram showing the configuration of a fourth optical information recording/reproducing apparatus according to the present invention.

FIG. 22 is a block diagram showing the configuration of the fourth optical information recording/reproducing apparatus. In the drawing, the reference numeral 50 designates a first polarity inverting circuit; 223, a first waveform shaping circuit; 402, a sixth waveform shaping circuit; 403, an address calculation circuit; 54, a jump pulse generating circuit; 55, a second selector; 404, a fourth system controller; 210, a semiconductor laser; 211, a collimator lens; 212, a half mirror; 213, an objective lens; 214, a photo detector; 214a and 214b, light-receiving portions thereof; 215, an actuator; 216, an optical head; 217, a differential amplifier; 218, a low pass filter (LPF); 219, a tracking control circuit; 220, a driving circuit; 221, an addition amplifier; 222, a high pass filter (HPF); 224, a reproduction signal processing circuit; 225, an address reproducing circuit; 226, a traverse control circuit; 227, a traverse motor; 228, a spindle motor; 229, a recording signal processing circuit; 230, an external input terminal; 231, an laser driving circuit; and 233, an output terminal. Because these parts are substantially equivalent to the constituent parts of the third optical information recording/reproducing apparatus shown in FIG. 21, reference numerals given to the constituent parts of the third apparatus are given to these parts for omission of detailed description.

In the following, points in which the configuration shown in FIG. 22 is different from that in FIG. 21 are described. The reference numeral 410 designates a fourth optical disk; and 411, a recording track thereof. The reference numeral 412 designates a seventh waveform shaping circuit which receives an output from the HPF 222 and the control signal L4 from the fourth system controller 404 and delivers a signal to a sync signal detecting circuit; 413, a sync signal detecting circuit which receives the output signal of the seventh waveform shaping circuit 412 and delivers an address sync signal to a gate signal generating circuit; 414, a gate signal generating circuit which receives the address sync signal from the sync signal detecting circuit 413 and delivers first and second gate signals L8 and L9 to a hold circuit and a variable-gain amplifier respectively; 415, a hold circuit which receives the output of the first polarity inverting circuit 50 and the first gate signal of the gate signal generating circuit 414 and delivers a tracking error signal to the tracking control circuit 219; and 416, a variable-gain amplifier which receives the output of the hold circuit 415 and the second gate signal of the gate signal generating circuit 414.

Figure 23:
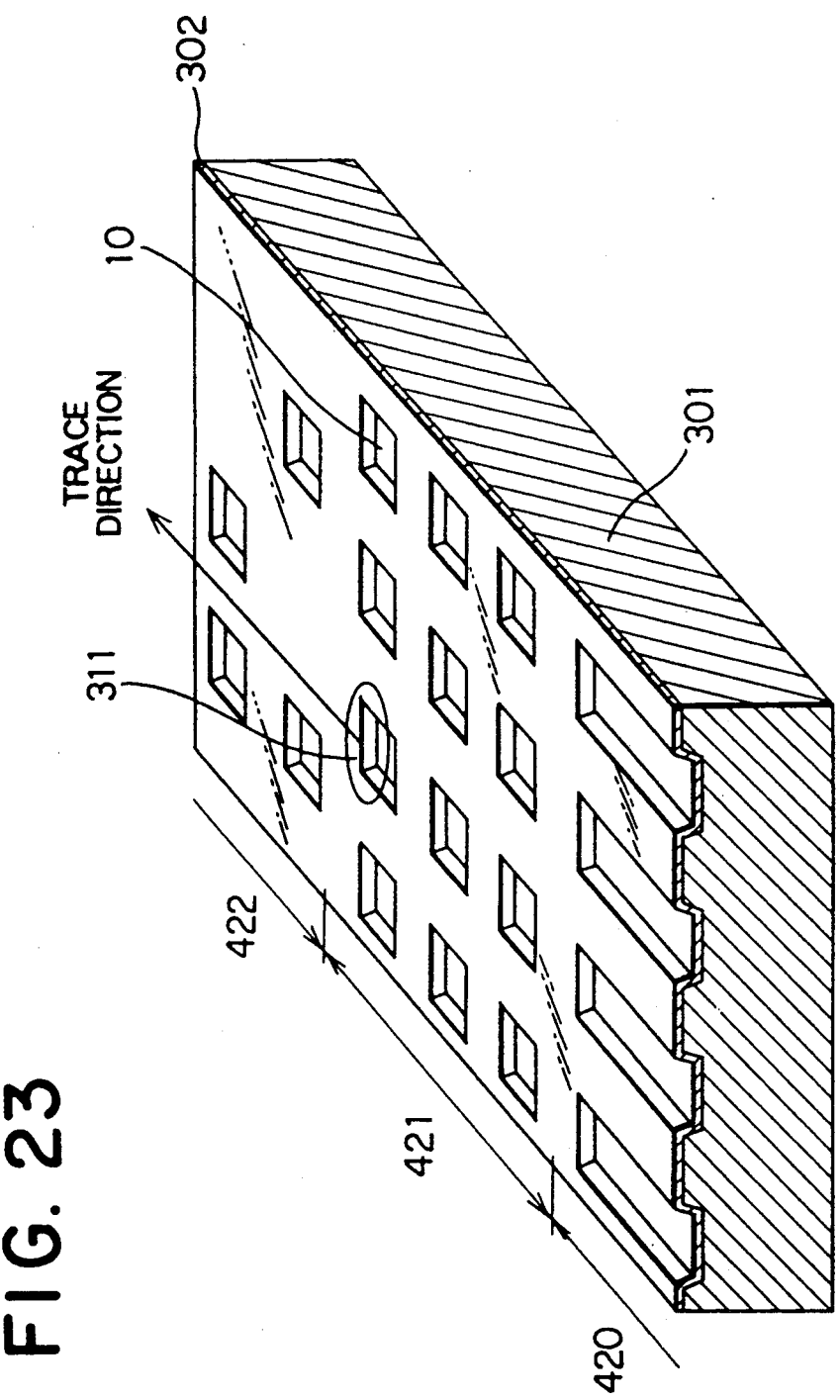
FIG. 23 is an enlarged perspective view showing the configuration of the fourth embodiment.

FIG. 23 is an enlarged perspective view of the fourth optical disk 410. In the drawing, the reference numeral 420 designates a main information signal area constituted by concave and convex recording tracks formed from guide grooves; and 421, an identification signal area in which pre-pits are arranged so as to be shifted in the direction of the radius of the disk in the same manner as described above with reference to FIG. 13. The reference numeral 422 designates a sync signal area which is formed between the main information signal area 420 and the identification signal area 421 on extension lines of concave portions and in which pre-pits are formed by intermission of guide grooves. The pattern of the sync signal is common to all sectors. Further, the reference numeral 301 designates a disk substrate; 302, a recording layer; 310, pre-pits; and 311, a beam spot.

The operation of the fourth optical information recording/reproducing apparatus configured as described above, as to points in which the apparatus is different from the third optical information recording/reproducing apparatus, will be described with reference to the drawings.

Consider now the case where the beam spot traces a concave portion at a recording or reproducing state. Upon reception of a tracking error signal via the photo detector 214 and the LPF 218, the first polarity inverting circuit 50 delivers the tracking error signal to the hold circuit 415 directly in accordance with the control signal L4 in the same manner as in the third optical information recording/reproducing apparatus shown in FIG. 21. When the beam spot 311 is on the main information signal area 420, the hold circuit 415 delivers the tracking error signal to the tracking control circuit 219 directly. The tracking control circuit 219 moves the actuator 215 through the driving circuit 220 to eliminate off-track in accordance with the tracking error signal. Here, the second selector 55 connects the tracking control circuit 219 and the driving circuit 220 on the basis of the control signal L7.

When the beam spot 311 enters into the sync signal area from the main information signal area 420, a sync signal recorded as arrangement of pre-pits 310 in the sync signal area 422 is inputted to the seventh waveform shaping circuit 412 through the photo detector 214, the addition amplifier 221 and the HPF 222. The seventh waveform shaping circuit 412 performs two-valuing of the reproduced sync signal on the basis of the first threshold Th1 and delivers the two-valued signal as a digital signal to the sync signal detecting circuit 413. The sync signal detecting circuit 413 always compares the pattern of the digital signal received from the seventh waveform shaping circuit 412 with the pattern of a sync signal preliminarily stored in the inside of the sync signal detecting circuit 412. When the two patterns coincide with each other, the sync signal detecting circuit 413 generates the first and second gate signals L8 and L9.

Figure 24:
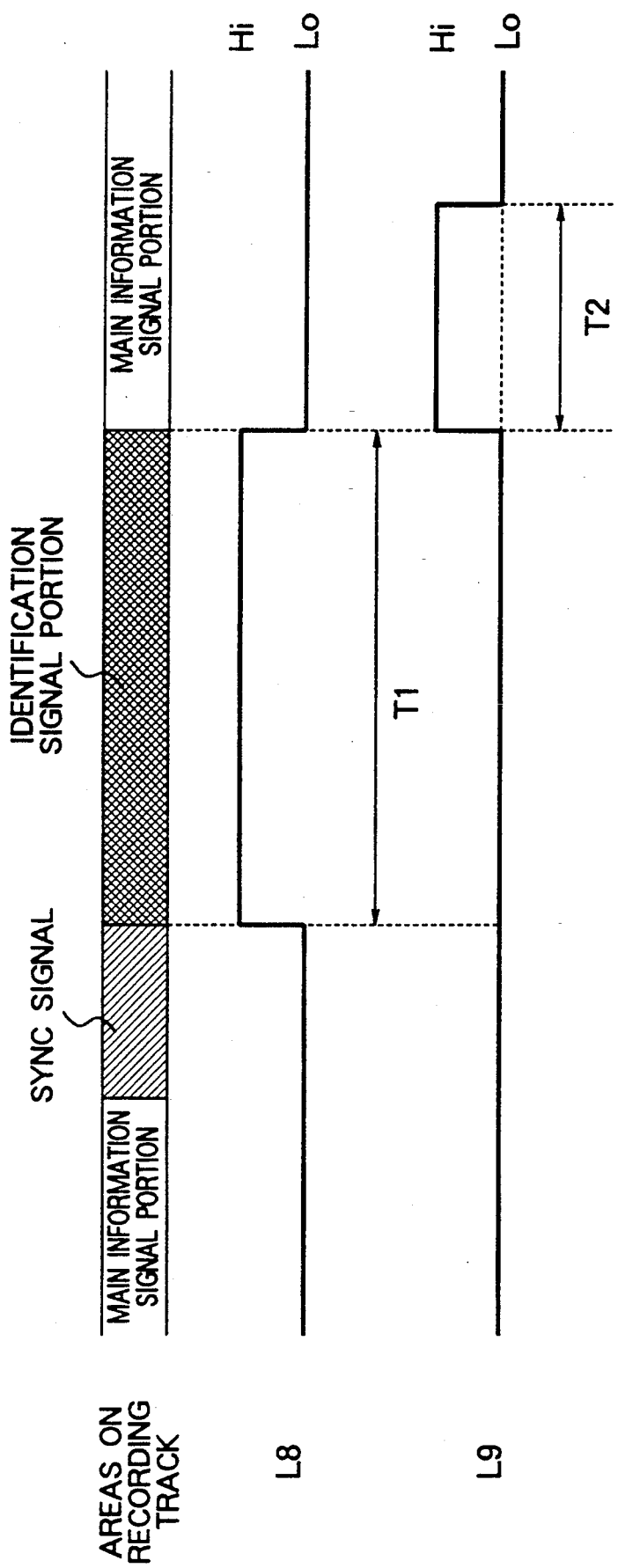
FIG. 24 is a timing chart of control signals in the fourth optical information recording/reproducing apparatus according to the present invention.

FIG. 24 is a timing chart showing the first and second gate signals in the case where the beam spot passes through respective areas. The level of the first gate signal being generally low (Lo) turns to a high level (Hi) when the sync signal is detected, and then returns to a low level (Lo) when the time T1 required for the beam spot's passing through the identification signal area 421 passes away. The level of the second gate signal being generally low (Lo) turns to a high level (Hi) at a point of time of falling of the first gate signal from Hi to Lo and is kept high (Hi) till a predetermined time T2 passes away.

On the other hand, a tracking error signal is inputted to the hold circuit 415 through the photo detector 214, the differential amplifier 217, the LPF 218 and the polarity inverting circuit 62. When the level of the gate signal L8 is low, the hold circuit 415 outputs the input signal directly. When the gate signal L8 rises from a low level (Lo) to a high level (Hi), the hold circuit 415 holds the value of the input signal just before the rising of the gate signal L8 and continuously outputs the value till the level of the signal L8 returns to a low level (Lo). The variable-gain amplifier 416 amplifies the input signal by gain A1 when the level of the gate signal L9 is slow, and it amplifies the input signal by gain A2 when the level of the gate signal L9 is high. The gain is set to satisfy A1<A2.

The reason why tracking control is stabilized by the above function will be described below.

Figure 25:
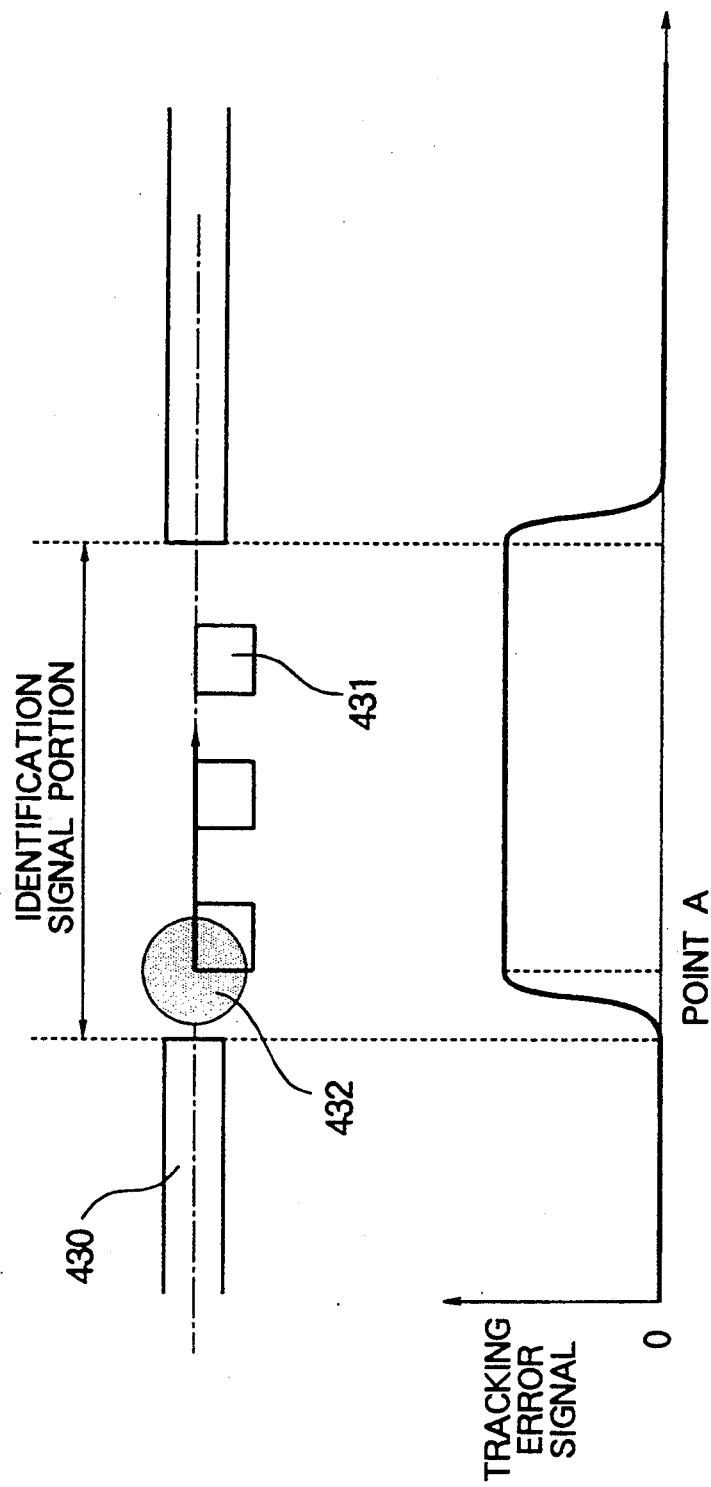
FIG. 25 is an explanatory view showing a tracking error signal in the case where the beam spot performs tracing on an identification signal area in the fourth optical information recording/reproducing apparatus according to the present invention.

FIG. 25 is a waveform view of a tracking error signal outputted from the polarity inverting circuit 50 in the case where the beam spot performs tracing on an identification signal area. The reference numeral 430 designates a concave portion; 431, pre-pits which are recorded so as to be shifted by Tp/4; and 432, a beam spot. When the beam spot 432 enters into the identification signal area, only the left half of the beam spot in the direction of the movement of the beam spot overlaps a pre-pit 431 so that reflected light of the beam is made asymmetric greatly. Accordingly, the tracking error signal takes a large value as shown at point A in the waveform view. As a result, an excessive driving current is supplied to the actuator 215 rapidly, so that tracking control may be shaken so as to be unstable.

In the fourth optical information recording/reproducing apparatus shown in FIG. 22, the sync signal arranged just before the identification signal area is detected so that the hold circuit 415 holds the tracking error signal in accordance with the first gate signal L8 just before the beam spot starts tracing of the identification signal area. Accordingly, the tracking error signal is prevented from increasing rapidly in this area, so that tracking control is prevented from becoming unstable.

When the beam spot moves from the identification signal area to the main information signal area with the passage of time T1, the holding is released so that tracking control is restarted in accordance with the tracking error signal outputted from the first polarity inverting circuit 50.

Further, when the holding is released, the beam spot may be out of track because of eccentricity of the disk, disturbance, etc. To cope with this problem, in this apparatus, the variable-gain amplifier 416 amplifies the tracking error signal by gain A2 to thereby increase the tracking control loop gain for time T2. When the gain increases, the tracking control circuit 219 makes the actuator 215 generate a large driving force in the direction of elimination of tracking error through the driving circuit 220. Accordingly, tracking leading-in is performed rapidly so that off-track after releasing of the holding is eliminated soon. The time T2 is set to an optimum value under the consideration of the linear speed of the disk, the length of the time T1, the driving force of the actuator 215, etc.

Figure 26:
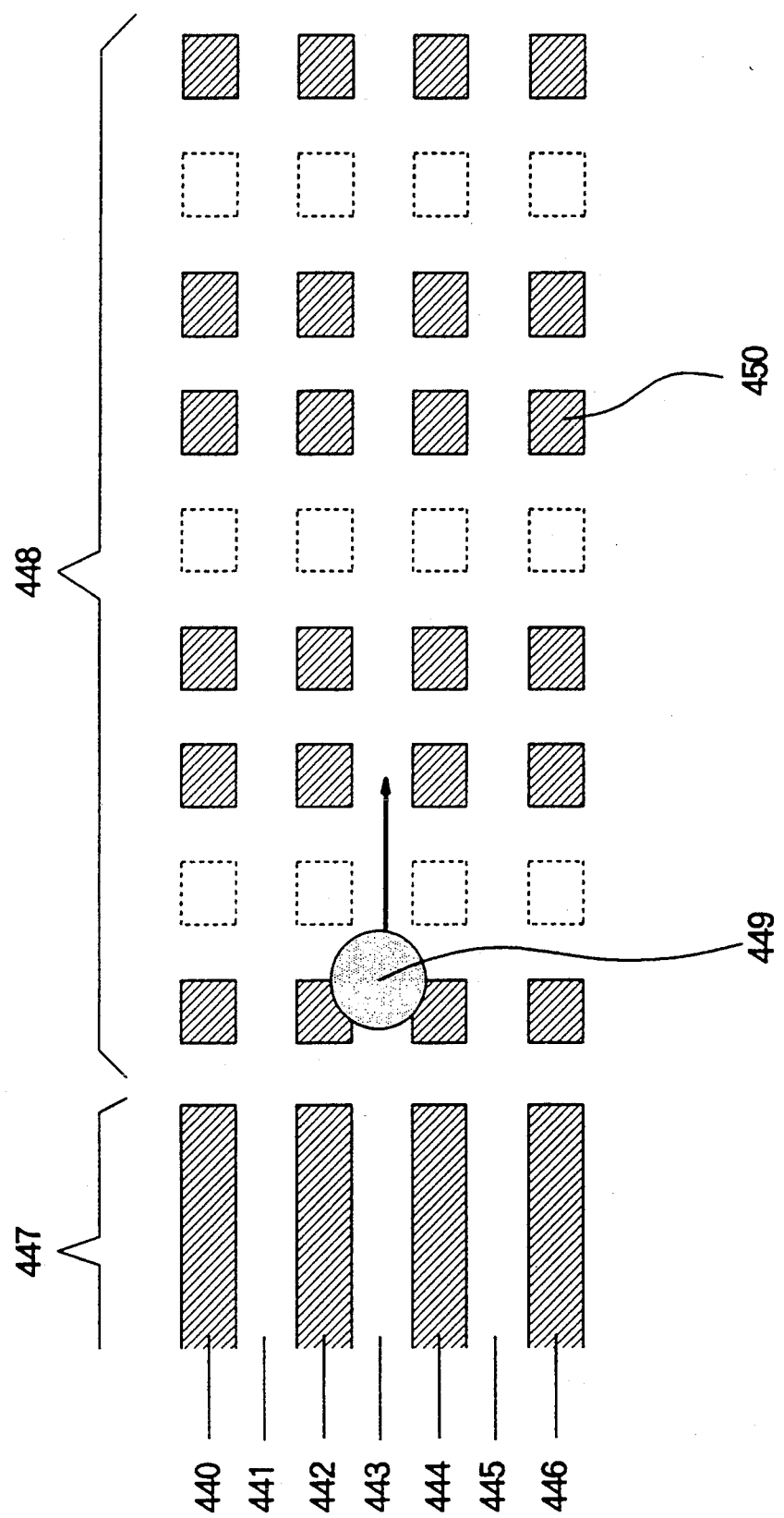
FIG. 26 is an enlarged plan view showing the positional relation between pre-pits of an identification signal area in a convex recording track in the fourth optical disk and a beam spot according to the present invention.

The case where the beam spot traces a convex portion will be described below. The first polarity inverting circuit 50 inverts the input tracking error signal on the basis of the control signal L4 given by the system controller. Accordingly, the beam spot traces a convex recording track. In the seventh waveform shaping circuit 412, the second threshold Th2 different from the first threshold Th1 is set as a comparison level for two-valuing on the basis the control signal L4. The reason why the threshold is made variable between concave recording tracks and convex recording tracks will be described below with reference to the drawings. FIG. 26 is an enlarged view showing the positional relation between pre-pits in a sync signal area and a beam spot in the case where the beam spot traces a convex recording track. The reference numerals 440, 442, 444 and 446 designate concave portions; and 441, 443 and 445, convex portions. The reference numeral 447 designates a main information signal portion; 448, a sync signal area; 449, a beam spot; and 450, pre-pits. As described above, the patterns of sync signals are all equal, so that the patterns of arrangement of pits on opposite sides of the beam spot 449 coincide with each other. The beam spot 449 partly overlaps pre-pits in the concave portions 442 and 444 on the opposite sides so that the beam spot 449 is modulated with the pre-pits. Accordingly, even in a convex recording track in which there is no pre-pit formed as a sync signal, the sync signal can be reproduced. Because the concave recording track is however different from the convex recording track in the area in which the beam spot overlaps pre-pits, the two types of tracks are also different in the degree of modulation of the reproduced sync signal. In the seventh-waveform shaping circuit 413, the thresholds Th1 and Th2 are set to optimum values in accordance with the degrees of modulation respectively, so that the sync signal can be two-valued well.

Figure 27:
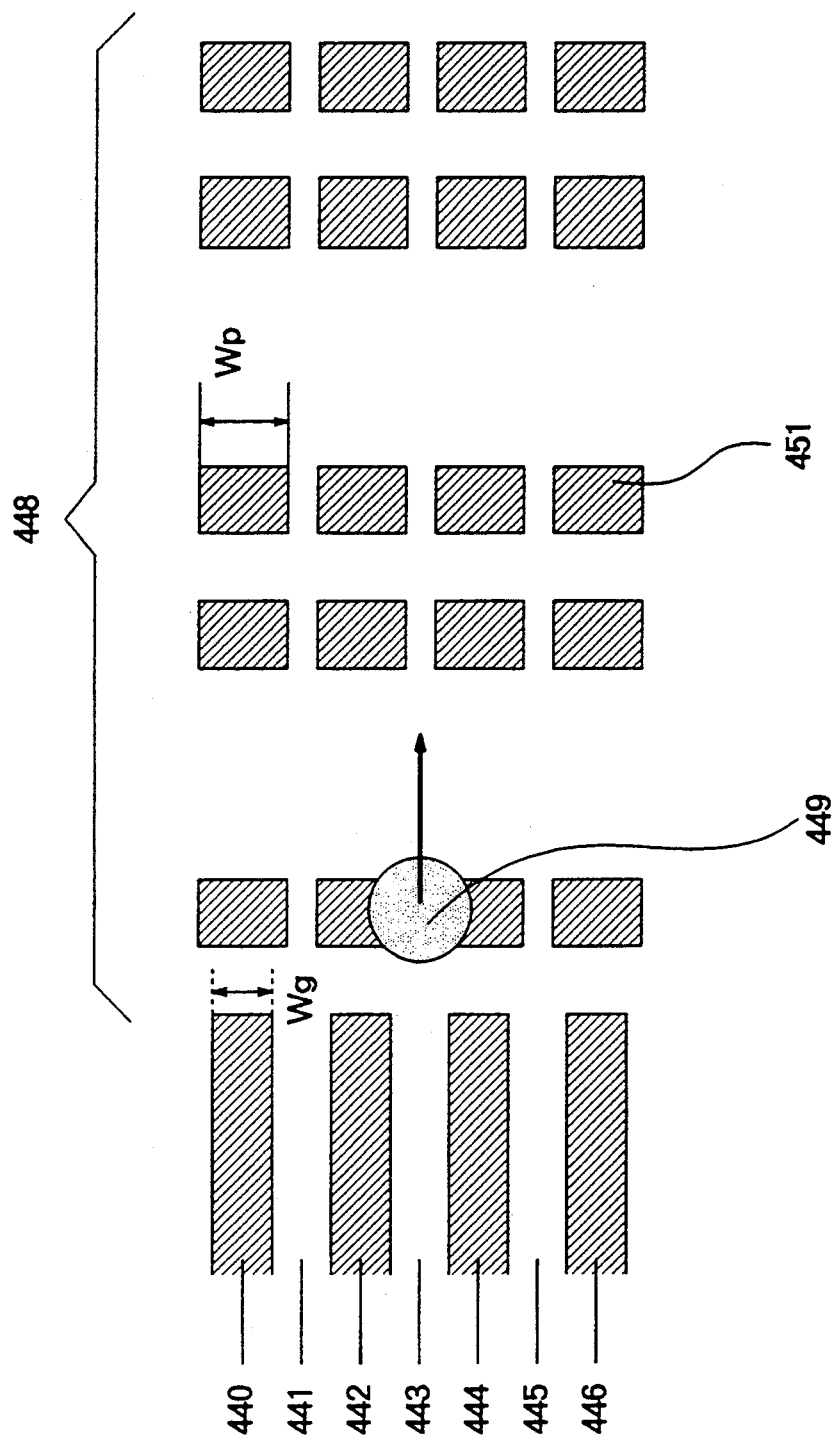
FIG. 27 is an enlarged plan view of another example of the fourth optical disk according to the present invention.

To make the detection of the sync signal in a convex recording track better, the width Wp of the pre-pit 451 for sync signal may be set to be larger than the width Wg of the guide groove as shown in FIG. 27. In this manner, the area in which the beam spot overlaps pre-pits at the time of tracing of a convex recording track is widened so that the degree of modulation of the reproducing signal is improved. Such pre-pits can be formed easily by increasing the intensity of the radiation beam to enlarge the photosensitive portion on the radiation beam sensing layer by using the optical disk producing apparatus as shown in FIG. 17.

Figure 28:
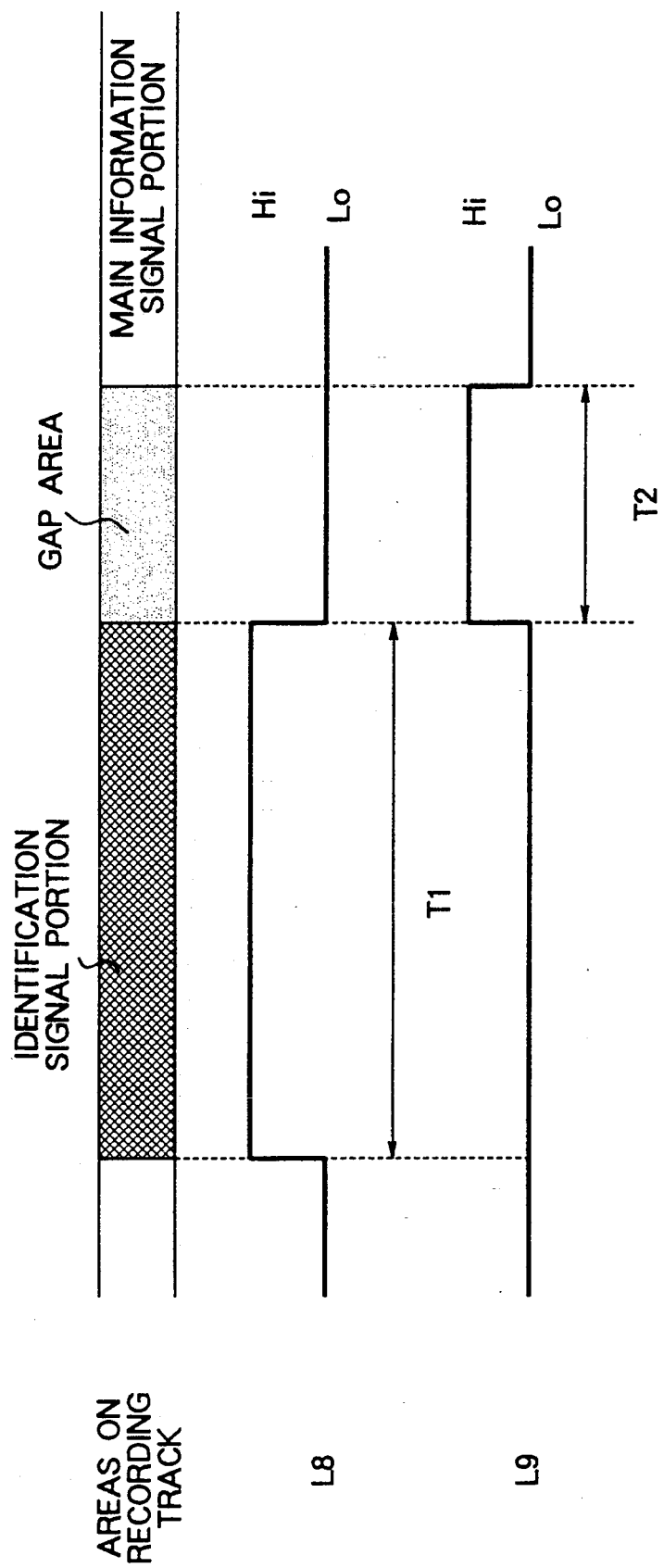
FIG. 28 is a timing chart for explaining the structure of a recording track in another embodiment of the fourth optical disk and the operation of the fourth optical information recording/reproducing apparatus using the disk according to the present invention.

Further, the fourth system controller 404 is provided so that main information is not recorded in the main information signal area during the time T2 after releasing of the holding through the recording signal processing circuit 229. FIG. 28 is a view for explaining the structure of a recording track in which such a gap area is provided. A gap area having a length corresponding to the time T2 is provided just after the identification signal portion, so that recording of the main information signal is prevented unless the track offset is eliminated. In this manner, recording of the main information signal in an off-track state can be avoided, so that the quality of the recording signal can be improved.

As described above, according to the fourth optical information recording/reproducing apparatus, the sync signal arranged just before the identification signal area is detected, so that the hold circuit 415 holds the tracking error signal just before the beam spot starts tracing of the identification signal area. In this manner, the driving current supplied to the actuator 215 is prevented from changing rapidly, so that tracking control can be stabilized. Further, the variable-gain amplifier 416 keeps the tracking control loop gain in a large value for the time T2 just after releasing of the holding. In this manner, tracking leading-in is performed rapidly, so that off-track produced at the time of holding can be eliminated soon. Further, a gap portion having a length corresponding to the time T2 is provided. In this manner, recording of the main information signal in an off-track state can be avoided, so that the quality of the recording signal can be improved.

Figure 29:
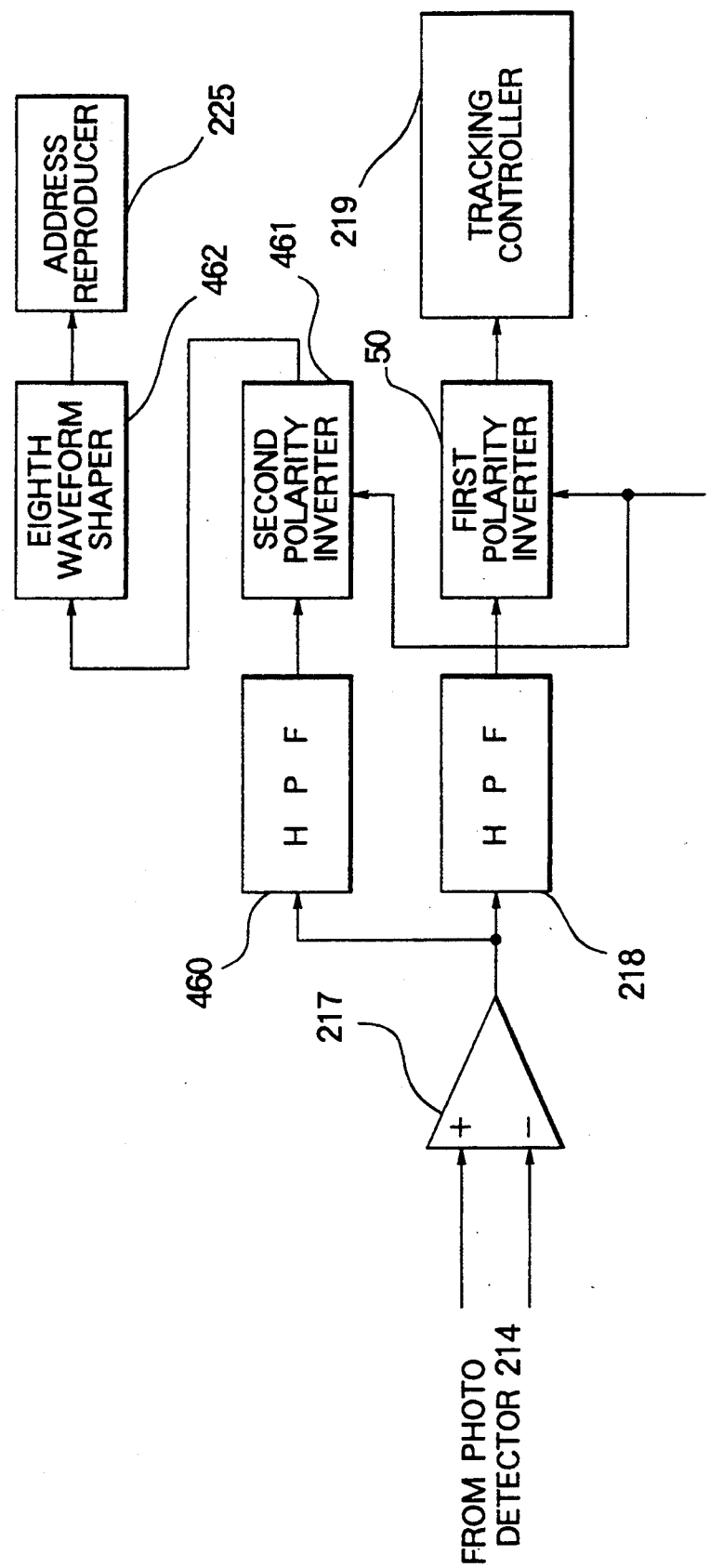
FIG. 29 is a block diagram showing the configuration of main blocks for detection of an identification signal in another embodiment of the fourth optical information recording/reproducing apparatus according to the present invention.

Although the optical information recording/reproducing apparatus in this embodiment has been described upon the case where a summation signal of reproducing signals generated by the light-detecting portions 214a and 214b of the photo detector 214 is used for detection of an identification signal, the present invention can be applied to the case where a signal of difference between the reproducing signals is used. FIG. 29 is a block diagram for detection of an identification signal in this case. In the drawing, the reference numeral 217 designates a differential amplifier; 218, an LPF; 50, a first polarity inverting circuit; 219, a tracking control circuit; 225, and an address reproducing circuit. The above configuration is the same as the configuration shown in FIG. 21. The reference numeral 460 designates a high pass filter (HPF) for extracting identification signal components from a push-pull signal outputted from the differential amplifier 217. The reference numeral 461 designates a second polarity inverting circuit for inverting the output signal of the HPF 460 in accordance with a control signal (equivalent to L4 in FIG. 21) given from a system controller not shown. The reference numeral 462 designates an eighth waveform shaping circuit for digitizing an analog reproducing signal outputted from the second polarity inverting circuit 225 and for delivering the resulting digital signal to the address reproducing circuit 225. As described above, in the case where the beam spot overlaps a pre-pit in an identification signal area, the distribution of the quantity of reflected light is made asymmetric in the direction of the radius of the disk because the pre-pit is shifted by Tp/4 in the direction of the radius of the disk. When the beam spot is between pre-pits, the asymmetry is small. Accordingly, the identification signal based on pre-pits can be detected by calculating the difference between the outputs of the light-detecting portions 214a and 214b arranged in the direction of the radius of the disk, that is, by taking a push-pull signal, in the same manner as in the tracking error signal. Because the positional relation between pre-pits and a beam spot in the concave recording track and the positional relation between pre-pits and a beam spot in the convex recording track are however reversed with respect to left and right, the polarity of the push-pull signal is inverted. Accordingly, in FIG. 29, the polarity inverting circuit 461 inverts the polarity of the push-pull signal in accordance with the control signal L4. If the identification signal modulating method used is not affected by the polarity, the second polarity inverting circuit 461 is not required. In the above configuration, the push-pull signal has no DC component, so that there arises an excellent advantage in that the ability of detection of the identification signal is not affected by the change of reflectance.

Figure 30:
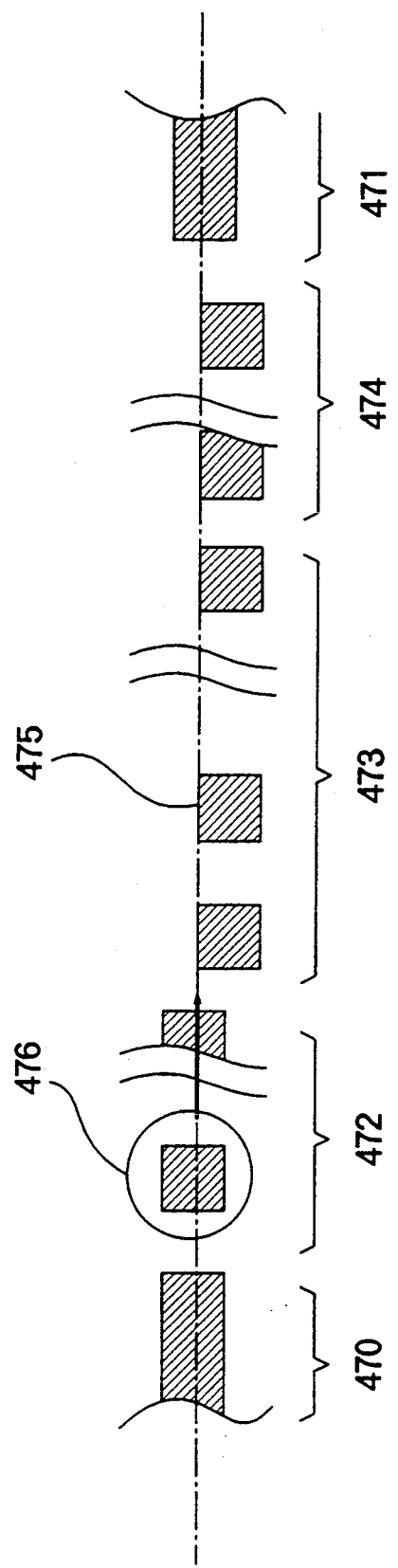
FIG. 30 is an enlarged plan view of the vicinity of an identification signal portion in another embodiment of the fourth optical disk according to the present invention.

Although the fourth optical information recording/reproducing apparatus shown in FIG. 22 has been described upon the case where the end of the identification signal portion is detected by measuring the elapsed time T1, the present invention can be applied to the case where a signal corresponding to an end identifier is formed as a pre-pit in the last of the identification signal so that the end of the identification signal portion is detected by detecting the signal at the time of recording/reproducing. FIG. 30 shows an example thereof. In the drawing, the reference numerals 470 and 471 designate main information signal portions; 472, a sync signal area; 473, an identification signal portion; 474, an end indicator; 475, pre-pits; and 476, a beam spot. The center line of the pre-pit train of the end identifier is made to coincide with that of the identification signal area so that the end identifier can be detected in the same manner as in the identification signal. In this manner, the timing of releasing the tracking error signal can be made accurate, so that tracking control can be prevented from becoming unstable because of difference in releasing timing.

A fifth optical disk and an optical information recording/reproducing apparatus using the fifth optical disk according to the present invention will be described below in detail.

Figure 31:
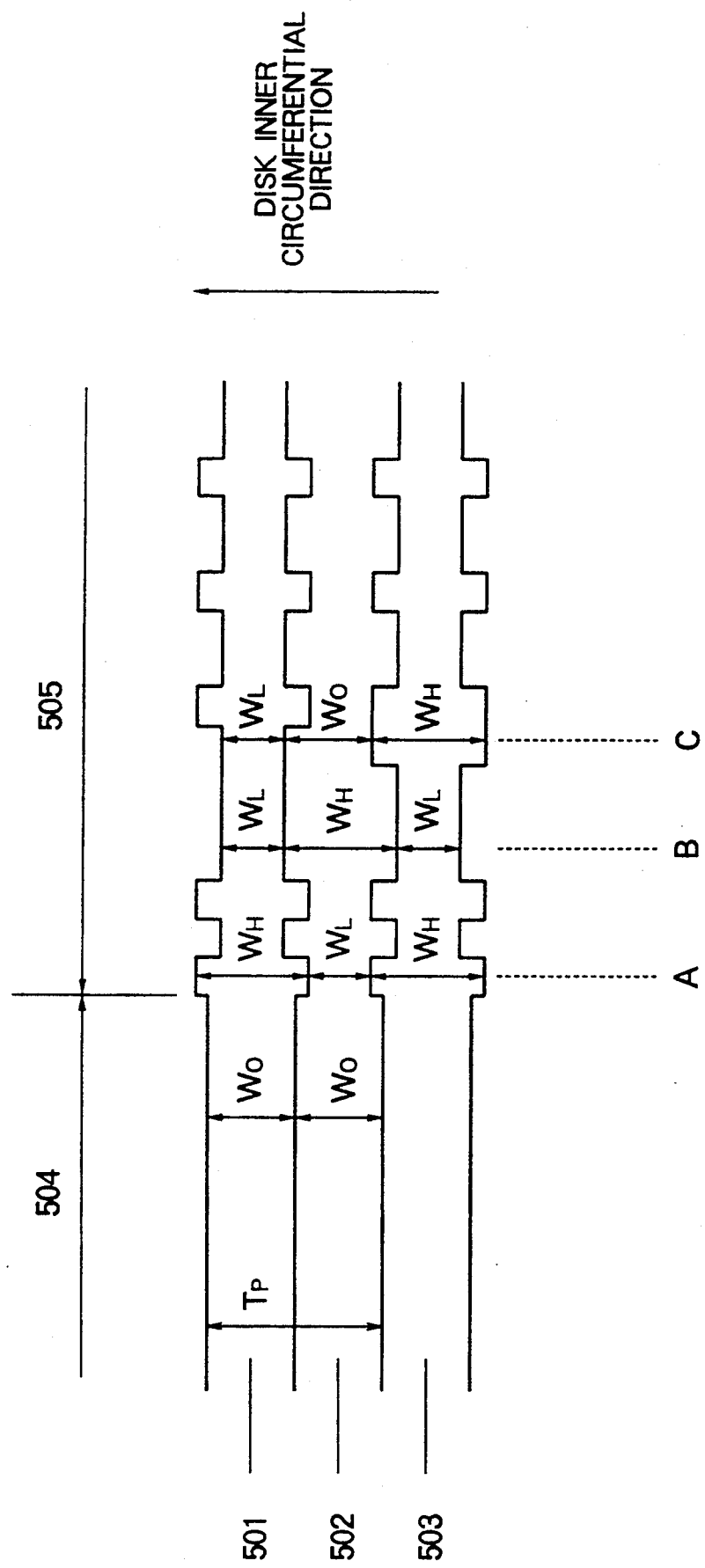
FIG. 31 is an enlarged plan view of the vicinity of an identification signal portion in a fifth optical disk according to the present invention.

FIG. 31 is an enlarged view of the vicinity of an identification signal portion of the fifth optical disk. In the drawing, the reference numerals 501 and 503 designate concave portions; and 502, a convex portion. The concave and convex portions are arranged at intervals of the pitch Tp. The reference numeral 504 designates a main information signal portion in which the width of a concave portion is $W_0 = Tp/2$. On the contrary, in the identification signal area 505, the width of the concave portion takes two values in accordance with the binary value of the identification signal so that the width is $W_H$ when the identification signal is 1, and the width is $W_L$ ($W_H > W_L$) when the identification signal is 0. That is, the width of the concave portion is modulated with the identification signal. In the case where the beam spot traces the identification signal area of the concave portion, the quantity of reflected light changes in accordance with the difference in width. As a result, the identification signal can be read. Assuming now that the quantities of reflected light corresponding to the respective widths of the concave portion of $W_O$, $W_H$ and $W_L$ are $I_O$, $I_H$ and $I_L$ respectively, then the relations $I_H > I_O > I_L$ hold. In this embodiment, CAV is used, and the identification signal area is arranged so that displacement points of identification signals in adjacent tracks coincide with each other. Accordingly, with respect to the convex portion, the width of the convex portion is $W_L$ (point A in FIG. 1) when the width of each of concave portions adjacent to the convex portion is $W_H$, the width of the convex portion is $W_H$ (point B in FIG. 1) when the width of each of concave portions adjacent to the convex portion is $W_L$, and the width of the convex portion is $W_O$ (point C in FIG. 1) when the widths of concave portions adjacent to the convex portion are $W_L$ and $W_H$ respectively. In this manner, the width of the convex portion is modulated in accordance with the pattern of the width modulation of concave portions adjacent to the convex portion.

Figure 32:
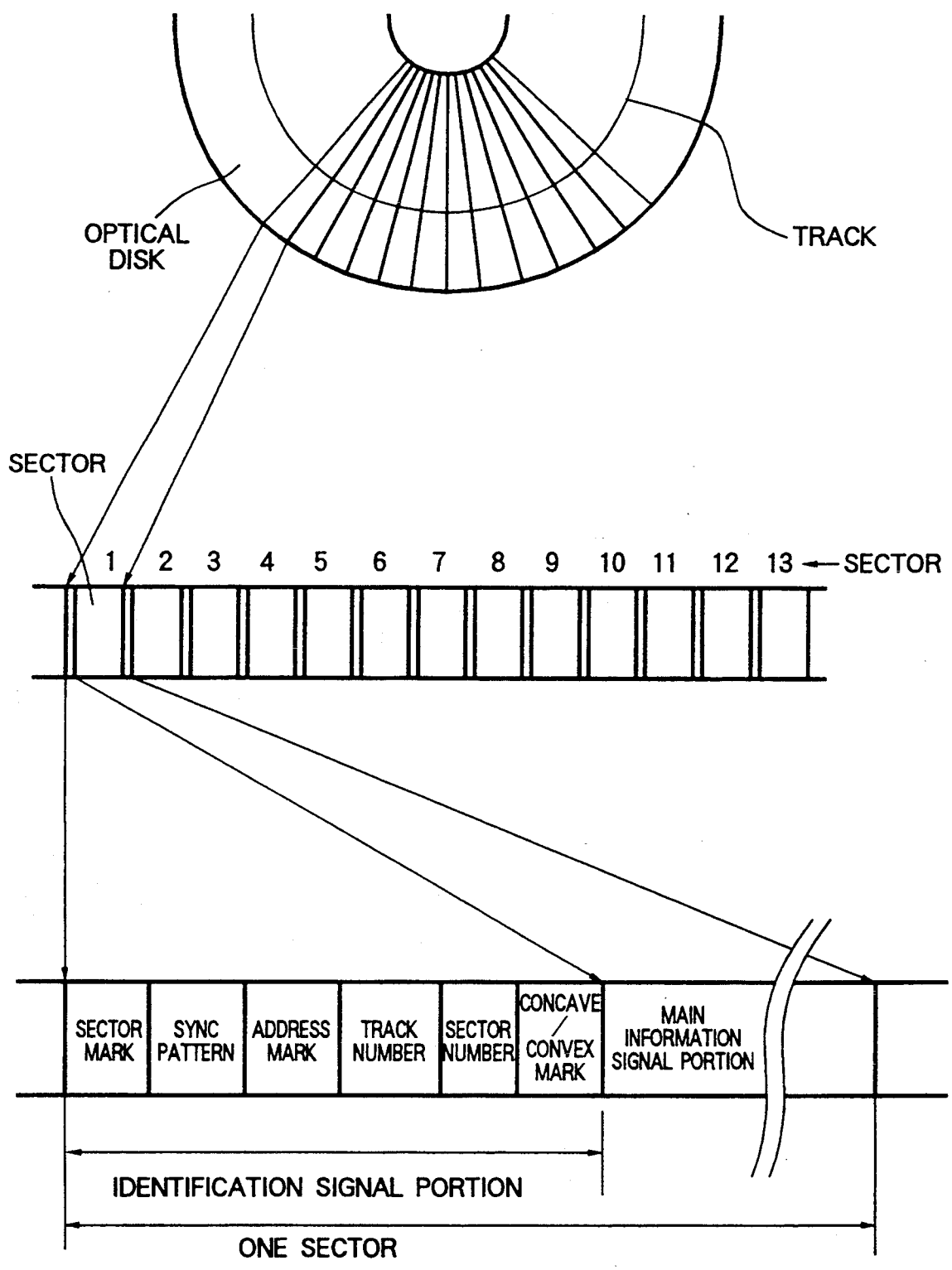
FIG. 32 is a view for explaining a recording format in a concave recording track of the fifth optical disk according to the present invention.

The recording format of the fifth optical disk in which identification signals are recorded by width modulation of concave portions as described above will be described below. FIG. 32 is a view for explaining the recording format in concave recording tracks. One track is divided into a plurality of sectors. By using CAV, respective sectors are arranged radially in the direction of the radius of the disk. One sector is composed of an identification signal area, and a main information signal area. The identification signal area is composed of a sector mark block, a sync pattern block, an address mark block, a track number block, a sector number block, and a concave-convex mark block. As described above, these blocks are recorded by the change of the width of a concave portion. These blocks function as follows.

1) Sector mark: This block shows the head of a sector.
2) Sync pattern: This block generates address data reproduction clock pulses.
3) Address mark: This block shows the start of address data.
4) Track number, sector number: These blocks show address data.
5) Concave-convex mark: This block shows discrimination between concave recording track and convex recording track.

Among these blocks, the sector mark block, the sync pattern block and the address mark block are common to all sectors. Sectors adjacent in the direction of the radius of the disk are supplied with the same sector number. Further, in this embodiment, Gray codes are used as track numbers so that adjacent track numbers are different by only one bit. Hereinafter, this bit is called "shift bit". In the concave-convex mark block, the width of the concave portion is set to $W_H$.

On the other hand, the recording format in convex portions is substantially similar to that in concave portions. In, the recording format in convex portions, however, the identification signal is obtained by using the fact that the width of a convex portion is changed by modulation of the width of concave portions adjacent to the convex portion in accordance with the identification signals.

That is, in the sector mark block, the sync pattern block, the address mark block and the sector number block, binary patterns of adjacent concave portions are equal to each other. Accordingly, in these blocks, the width of the convex portion is obtained by reversing the pattern of each of the adjacent concave portions. Accordingly, if the polarity of the reproducing signal obtained by the change of the quantity of reflected light when the beam spot traces this portion is inverted, data can be read in the same manner as in the case of a concave recording track. Because Gray codes are used in the track number block, patterns of bits except the shift bit in adjacent concave portions are equal to each other. Accordingly, this block can be read in the same manner as in the other blocks. In the shift bit, the widths of the adjacent concave portions are $W_L$ and $W_H$. Accordingly, the with of the convex portion is $W_O$, and the quantity of reflected light is substantially equal to $I_O$. Because $I_O$, $I_H$ and $I_L$ can be identified respectively if the change of the quantity of reflected light is detected by a three-value detector, the position of the shift bit can be detected. If the track number of a convex portion is defined to be equal to the track number of a concave portion adjacent to the convex portion with respect to the inner circumferential side, the track number of the convex portion can be obtained on the basis of the reproduced binary pattern except the shift bit and the position of the shift bit. This is because two track numbers can be obtained on the basis of the binary pattern except the shift bit, and smaller one of the track numbers as Gray codes is equal to the track number of the convex portion. This will be described below with reference to the drawings. FIGS. 33A to 33D are views for explaining this. FIG. 33A shows Gray codes of track numbers recorded in adjacent two concave portions, FIG. 33B is an enlarged view of the concave portions width-modulated correspondingly to the Gray codes, FIG. 33C is a waveform view of digital signals reproduced from the respective tracks, and FIG. 33D shows binary patterns obtained from a signal obtained by inverting a digital signal reproduced from the convex portion. In the drawings, the reference numerals 510 and 511 designate concave portions; and 512, a convex portion. In FIG. 33C, the shift bit is neither H nor L when the convex portion 512 is reproduced. Accordingly, error occurs so that the track number cannot be identified. Gray codes of adjacent numbers are however different by only one bit. According, if the shift bit in the binary patterns obtained in FIG. 33D is set to H, the resulting Gray code is made equal to the Gray code of the concave portion 510. If the shift bit is set to L, the resulting Gray code is made equal to the Gray code of the concave portion 511. If an algorithm of always selecting smaller one from the two codes is used on the basis of the above-mentioned definition of track numbers, an always correct track number can be obtained even in the convex portion.

In the concave-convex mark block, because the width of each of the two adjacent concave portions is $W_H$, the width of the convex portion is automatically determined to $W_L$ to thereby make it possible to discriminate between concave portion and convex portion.

Figure 35:
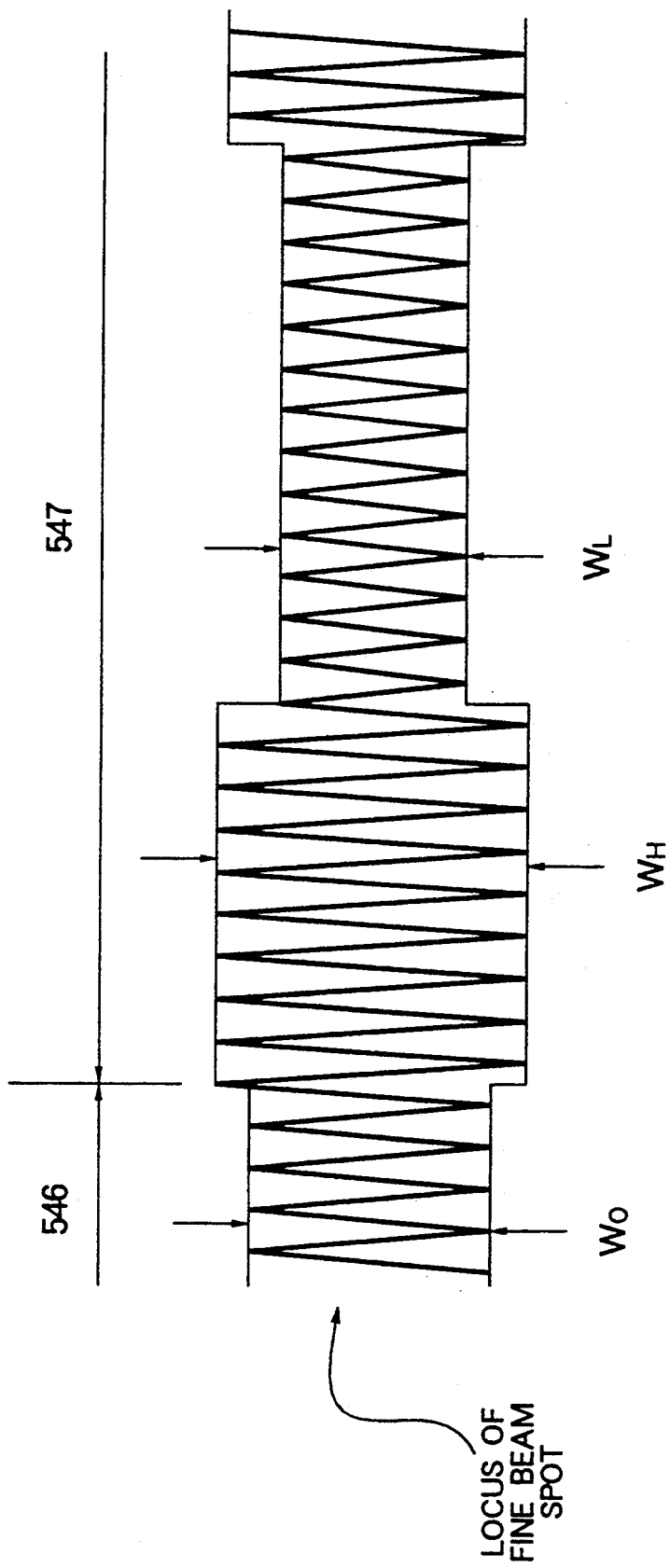
FIG. 35 is a view showing the locus of a fine beam spot at the time of production of the disk in the apparatus of producing the fifth optical disk according to the present invention.

An apparatus of producing the fifth optical disk will be described blow briefly with reference to the drawings. FIG. 34 is a block diagram showing the configuration of the apparatus. The reference numeral 530 designates a radiation beam source such as a laser light source for radiating a radiation beam 531 having sufficient energy. The radiation beam 531 passes through a light intensity modulator 532, a light deflector 533 and a mirror prism 534 and is converged to a fine radiation beam spot by an objective lens 535. A radiation beam sensing layer 537 such as a photoresist layer is applied to a recording carrier 536 such as an optical disk substrate. A gate signal generator 539 generates a gate pulse signal having a length equal to the length of the identification signal in a predetermined period in synchronism with a rotation phase signal outputted from a motor 538 for rotating the recording carrier 536 and delivers the gate pulse signal to an identification signal generator 540. Upon reception of the gate pulse signal from the gate signal generator 539, the identification signal generator 540 generates an identification signal to a modulator 542 and an intensity switching signal generator 544. An oscillator 541 generates a carrier signal having a sufficient high frequency compared with the bit clock of the identification signal and delivers the carrier signal to the modulator 542. The modulator 542 performs AM-modulation of the carrier signal generated from the oscillator on the basis of the identification signal and delivers the resulting signal as a modulation signal to an amplifier 543. A light deflector 533 makes the angle of the radiation beam 531 change by a very small value in accordance with the driving signal given through the amplifier 543 so that the fine beam spot is moved by a predetermined width on the recording carrier in the direction of the radius thereof. FIG. 35 shows the locus of the fine beam spot moved in accordance with the driving signal. As shown in FIG. 35, the amplitude of the movement of the beam spot in the direction of the radius of the disk in the main information signal area whereas is $W_O$ whereas the amplitude in the identification signal area takes two values $W_H$ and $W_L$ in accordance with the binary value of the identification signal. Here, in the modulator 542, the amplitude of the modulation signal outputted in a period in which the identification signal is not inputted is set so that the amplitude of movement in the main information signal area is $W_O$. In the modulator 542 and the amplifier 543, the amplitude of the driving signal and the degree of AM modulation are set so that the respective amplitude values become predetermined values. At the same time, factors such as error based on the intensity distribution of the fine beam spot, and so on, are adjusted. The intensity switching signal generator 544 generates a three-stage intensity switching signal to the light intensity modulator 532 through the amplifier 545 in accordance with the binary value of the identification signal and the presence/absence of inputting of the identification signal. The light intensity modulator 532 switches the intensity of the radiation beam 531 in accordance with the intensity switching signal inputted thereto. An intensity switching method is formed under the consideration of the speed of displacement of the fine beam spot in the direction of the radius of the disk so that the intensity is largest when the amplitude of displacement of the fine beam spot is $W_H$, the intensity is smallest when the amplitude is $W_L$, and the intensity is in an intermediate value when the amplitude is $W_O$. In this manner, the sensing layer 537 can be subjected to beam radiation with substantially constant intensity per unit time, so that irregularity of the exposure state can be eliminated. After exposure is terminated, a disk substrate is completed though steps such as etching, transferring, shaping, etc.

As described above, according to the optical disk in this embodiment, by modulating the width of a concave portion in a CAV control disk in accordance with the binary value of the identification signal, the width of a convex portion is also modulated. As a result, the identification signal can be obtained even in the convex portion. Further, by using Gray codes for track numbers recorded as identification signals in concave portions, correct track numbers can be obtained even in convex portions.

An embodiment of a fifth optical information recording/reproducing apparatus using the fifth optical disk will be described below with reference to the drawings. This embodiment is characterized in the method for reproducing identification signals recorded on the optical disk in advance. Accordingly, main portions concerning this characteristic will be described but the other portions will be regarded to be equivalent to those of the conventional optical disk shown in FIG. 40.

Figure 36:
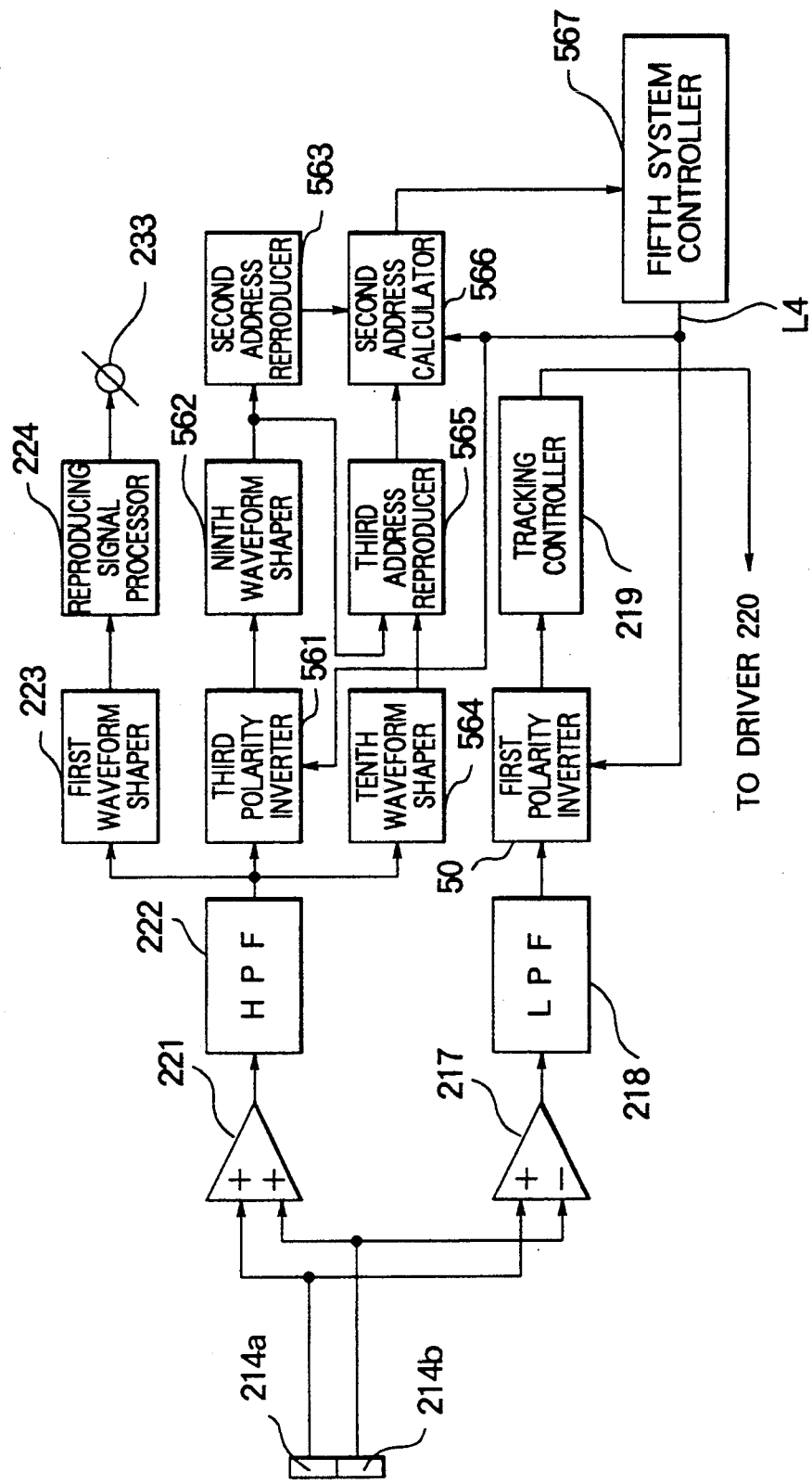
FIG. 36 is a block diagram showing the configuration of main parts of a fifth optical information recording/reproducing apparatus using the fifth optical disk according to the present invention.

FIG. 36 is a block diagram showing the configuration of main parts of the fifth optical information recording/reproducing apparatus. In the drawing, the reference numerals 214a and 214b designate light-receiving portions of a photo detector; 217, a differential amplifier; 218 a low pass filter (LPF); 221, an addition amplifier; 222, a high pass filter (HPF); 223, a first waveform shaping circuit; 224, a reproduction signal processing circuit; and 233, an output terminal. These parts are substantially similar to constituent parts of the conventional optical recording/reproducing apparatus shown in FIG. 40. Accordingly, reference numerals given to the constituent parts of the conventional apparatus are given to these parts for omission of detailed description.

The structure of portions different from portions in FIG. 40 will be described below. The reference numeral 50 designates a first polarity inverting circuit which receives a tracking error signal outputted from the LPF 218 and a control signal L4 from a fifth system controller 567 and transmits the tracking error signal to the tracking control circuit 219. With respect to the polarity for tracking control, it is assumed that tracking leading-in is performed on concave recording tracks in the case where a tracking error signal is inputted to the tracking control circuit 219 directly from the differential amplifier 217 without any change of the polarity. The reference numeral 561 designates a third polarity inverting circuit which receives high-frequency components of a summation signal from the HPF 222 and a control signal L4 from a fifth system controller and gives a high-frequency signal to a ninth waveform shaping circuit. The reference numeral 562 designates a ninth waveform shaping circuit which receives the high-frequency signal from the second polarity inverting circuit 561 and gives a digital reproducing signal to a second address reproducing circuit and a third address reproducing circuit. The reference numeral 563 designates a second address reproducing circuit which receives the digital reproducing signal from the second waveform shaping circuit 562 and gives first address data to a second address calculation circuit 566. The reference numeral 564 designates a tenth waveform shaping circuit which receives high-frequency components of a summation signal from the HPF 222 and gives a detection pulse signal to a third address reproducing circuit. The reference numeral 565 designates a third address reproducing circuit which receives the digital reproducing signal from the ninth and tenth waveform shaping circuits 562 and 564 and gives second address data to the second address calculation circuit 566. The reference numeral 566 designates an address calculation circuit which receives two address data from the second and third address reproducing circuits 563 and 565 and the control signal L4 from the fifth system controller and gives third address data to the fifth system controller. The reference numeral 567 designates a fifth system controller which gives the control signal L4 to the first polarity inverting circuit 50, the third polarity inverting circuit 561 and the second address calculation circuit 566 and receives the third address data from the second address calculation circuit 566. Further, the fifth system controller 567 carries out the same operation as that of the first system controller in the conventional optical information recording/reproducing apparatus shown in FIG. 40.

The operation of the optical information recording/reproducing apparatus in this embodiment configured as described above will be described below with reference to the drawings, while the description of the operation is narrowed to the identification signal reading operation as a characteristic of the present invention.

First, in the case where an identification signal in a concave recording track is to be read, the fifth system controller 567 controls the first and third polarity inverting circuits 50 and 561 to be in an inoperative state through the control signal L4. Upon reception of a tracking error signal through the light-receiving portions 214a and 214b, the differential amplifier 217 and the LPF 218, the first polarity inverting circuit 50 gives the tracking error signal to the tracking control circuit 219 directly. As a result, the beam spot radiated onto the optical disk traces the concave recording track. While the beam spot traces the identification signal area, high-frequency components of a reproduction summation signal given through the addition amplifier 221 and the HPF 222 is delivered directly to the second waveform shaping circuit 62 by the third polarity inverting circuit 561. The second waveform shaping circuit 62 performs two-valuing of the input high-frequency signal on the basis of a reference level which is set to make it possible to discriminate between reproducing signal amplitude values (which are replaced by $S_H$ and $S_L$ respectively) corresponding to the widths $W_H$ and $W_L$ of the aforementioned concave portions. Then, the second waveform shaping circuit 62 delivers the two-valued signal as a digital reproducing signal to the second address reproducing circuit 63. Upon reception of the digital reproducing signal, the second address reproducing circuit 63 detects a sector mark, a sync pattern and an address mark from the digital reproducing signal, confirms that the area currently traced by the beam spot is an identification signal area, then decodes the track number and the address number and delivers the decoded values as first address data together with the value of the concave-convex mark to the address calculation circuit 66. The address calculation circuit 66 reads the value of the control signal L4 and the value of the concave-convex mark obtained from the first address data. If the fact that both the values express a concave recording track is confirmed, the address calculation circuit 66 delivers the first address data directly as third address data to the second system controller 67. Upon reception of the third address data, the second system controller 67 performs control of recording, reproducing, retrieval and so on after that on the basis of the third address data. If the value of the concave-convex mark obtained from the first address data does not express the concave recording track, the address calculation circuit 66 aborts the input first address data as error and waits for arrival of the next address data.

On the other hand, in the case where an identification signaling a convex recording track is to be read, the system controller 67 controls the first and third polarity inverting circuit 50 and 561 to be in an operative state through the control signal L4. The first polarity inverting circuit 50 inverts the polarity of the input tracking error signal and delivers the polarity-inverted signal to the tracking control circuit 219. As a result, the beam spot radiated onto the optical disk traces the convex recording track. While the beam spot traces the identification signal area, the third polarity inverting circuit 561 inverts the polarity of high-frequency components of the input reproduction summation signal and delivers the polarity-inverted signal to the ninth waveform shaping circuit 562. The ninth waveform shaping circuit 562 performs two-valuing of the input high-frequency signal on the basis of the above-mentioned reference level and delivers the two-valued signal as a digital reproducing signal to the third address reproducing circuit 565. On the other hand, the tenth waveform shaping circuit 564 is a wind comparator in which a reference level is set to make it possible to identify the reproducing signal amplitude (which is replaced by $S_O$) corresponding to the width $W_O$ of the aforementioned convex portion. Only when the amplitude of the input high-frequency signal is $S_0$, the tenth waveform shaping circuit 564 delivers a detection pulse signal to the third address reproducing circuit 565. That is, only when the shift bit is detected, the detection pulse signal is delivered to the third address reproducing circuit 565. The third address reproducing circuit 565 detects a sector mark, a sync pattern and an address mark from the input digital reproducing signal and confirms that the area currently traced by the beam spot is an identification signal area. Then, from the time relation between the digital reproducing signal given from the ninth waveform shaping circuit 562 and the shift bit detection pulse signal given from the tenth waveform shaping circuit 564, the position of the shift bit in the Gray code of the track number is counted. Then, a Gray code with the shift bit of 1 and a Gray code with the shift bit of 0 are generated and decoded to obtain two track numbers respectively. Then, smaller one of the two track numbers is delivered as second address data together with the values of the sector number and the concave-convex mark to the second address calculation circuit 566. The second address calculation circuit 566 reads the value of the control signal L4 and the value of the concave-convex mark obtained from the second address data. If the fact that both the values express the convex recording track is confirmed, the second address data is delivered directly as third address data to the fifth system controller 567. Upon reception of the third address data, the fifth system controller 567 performs control of recording, reproducing, retrieval and so on after that on the basis of the third address data. If the value of the concave-convex mark obtained from the second address data does not express the convex recording track, the second address calculation circuit 566 aborts the input first address data as error and waits for arrival of the next address data.

As described above in detail, according to the optical information recording/reproducing apparatus in this embodiment, while the light beam performs scanning on an identification signal in a convex recording track, the third address reproducing circuit 565 calculates two Gray codes recorded in concave portions adjacent to the convex portion on the basis of the digital signal obtained from the ninth waveform shaping circuit 562 as a result of two-valuing the reproducing signal having the polarity inverted by the third polarity inverting circuit 561 and the Gray code shift bit detection pulse signal outputted from the tenth waveform shaping circuit 564. A correct track number is decoded on the basis of the two Gray codes, so that correct address data can be obtained even in the convex recording track.

Figure 37:
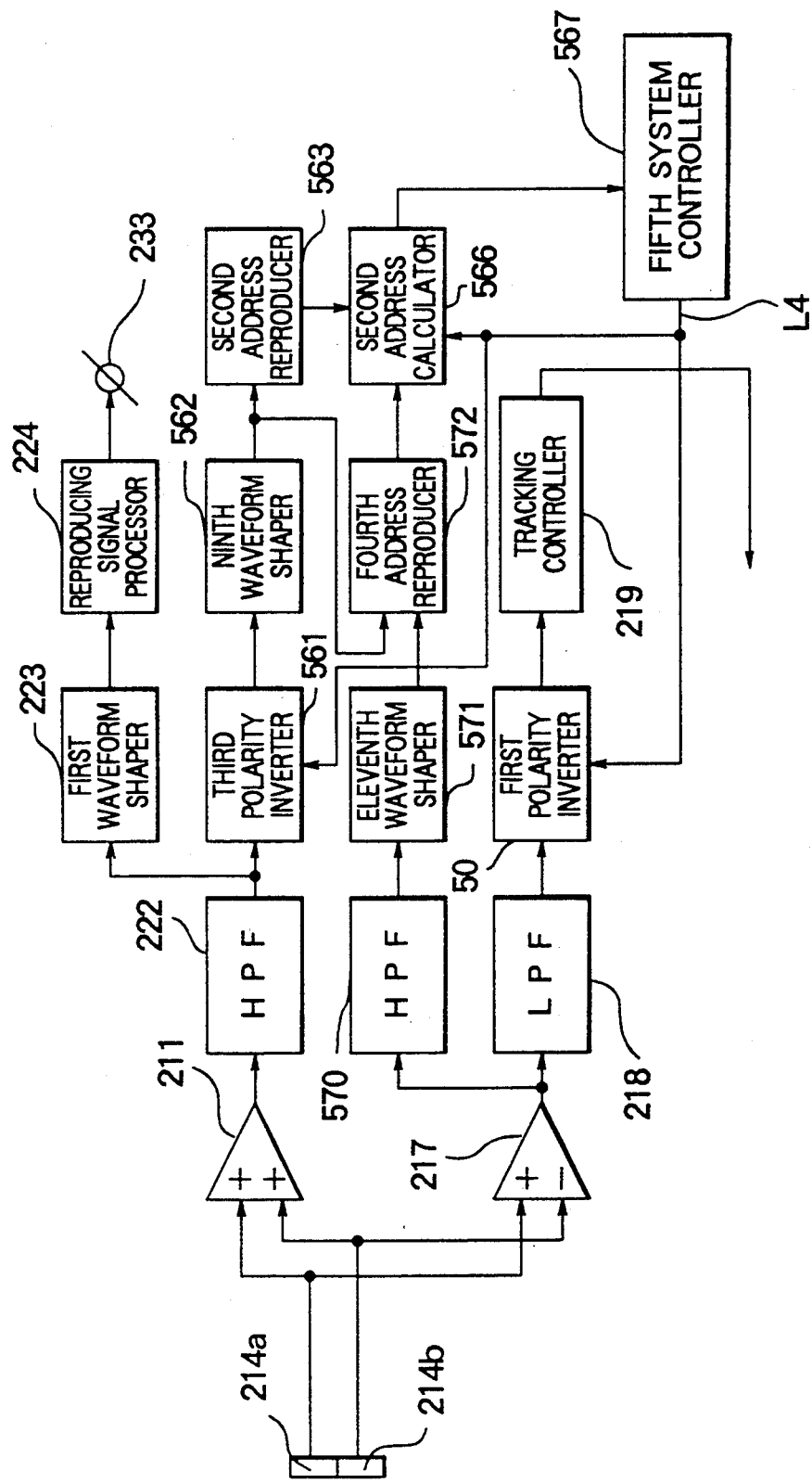
FIG. 37 is a block diagram showing the configuration of main parts of another embodiment of the fifth optical information recording/reproducing apparatus using the fifth optical disk according to the present invention.

FIG. 37 is a block diagram showing the configuration of main parts of an embodiment of the optical information recording/reproducing apparatus using the fifth optical disk. In the drawing, the reference numeral 50 designates a first polarity inverting circuit; 561, a third polarity inverting circuit; 562, a ninth waveform shaping circuit; 563, a second address reproducing circuit; 566, a second address calculation circuit; 567, a fifth system controller; 214a and 214b, light-receiving portions of a photo detector; 217, a differential amplifier; 218, a low pass filter (LPF); 221, an addition amplifier; 222, a high pass filter (HPF); 223, a first waveform shaping circuit; 224, a reproducing signal processing circuit; and 233, an output terminal. These pars are substantially similar to constituent parts of the optical recording/reproducing apparatus shown in FIG. 36. Accordingly, reference numerals given to the constituent parts of the apparatus shown in FIG. 36 are given to these parts for omission of detailed description.

The structure of portions different from portions in FIG. 36 will be described below. The reference numeral 570 designates an HPF which receives a differential signal outputted from the differential amplifier 217 and gives a high-frequency signal to an eleventh waveform shaping circuit. The reference numeral 571 designates an eleventh waveform shaping circuit which receives the high-frequency signal of the differential signal from the HPF 570 and gives a detection pulse signal to a fourth address reproducing circuit. The reference numeral 572designates a fourth address reproducing circuit which receives the digital reproducing signal from the ninth waveform shaping circuit 562 and the detection pulse signal from the eleventh waveform shaping circuit 571 and gives second address data to the second address calculation circuit 566. That is, this embodiment is characterized in that the eleventh waveform shaping circuit 571 and the fourth address reproducing circuit 572 are provided instead of the tenth waveform shaping circuit 564 and the third address reproducing circuit 565 in FIG. 36 so that the output of the differential amplifier 217 is used as the input of the eleventh waveform shaping circuit 571 through the HPF 570.

The operation of the optical information recording/reproducing apparatus configured as described above will be described below: with reference to the drawings, while the description is narrowed to the operation different from that in the first embodiment.

The operation of the apparatus in this embodiment in the case where an identification signal in a concave recording track is to be read, is the same as in the first embodiment.

On the other hand, in the case where an identification signal in a convex recording track is to be read, the HPF 570 extracts high-frequency components from a push-pull signal outputted from the differential amplifier 217 and delivers the high-frequency components to the eleventh waveform shaping circuit 571. The eleventh waveform shaping circuit 571 is a comparator having two positive and negative reference levels. When the amplitude of the input push-pull signal is larger than the positive reference level, the eleventh waveform shaping circuit 571 generates a first detection pulse signal to the fourth address reproducing circuit 572. When the amplitude of the push-pull signal is smaller than the negative reference level, the eleventh waveform shaping circuit 571 generates a second detection pulse signal to the fourth address reproducing circuit 572. Upon reception of the digital signal from the ninth waveform shaping circuit 562, the fourth address reproducing circuit 572 corrects the shift bit of the Gray code in the digital signal on the basis of the first and second detection pulse signals. The reason why a binary value correct in the shift bit can be obtained from the high-frequency components of the push-pull signal will be described below.

Figure 38:
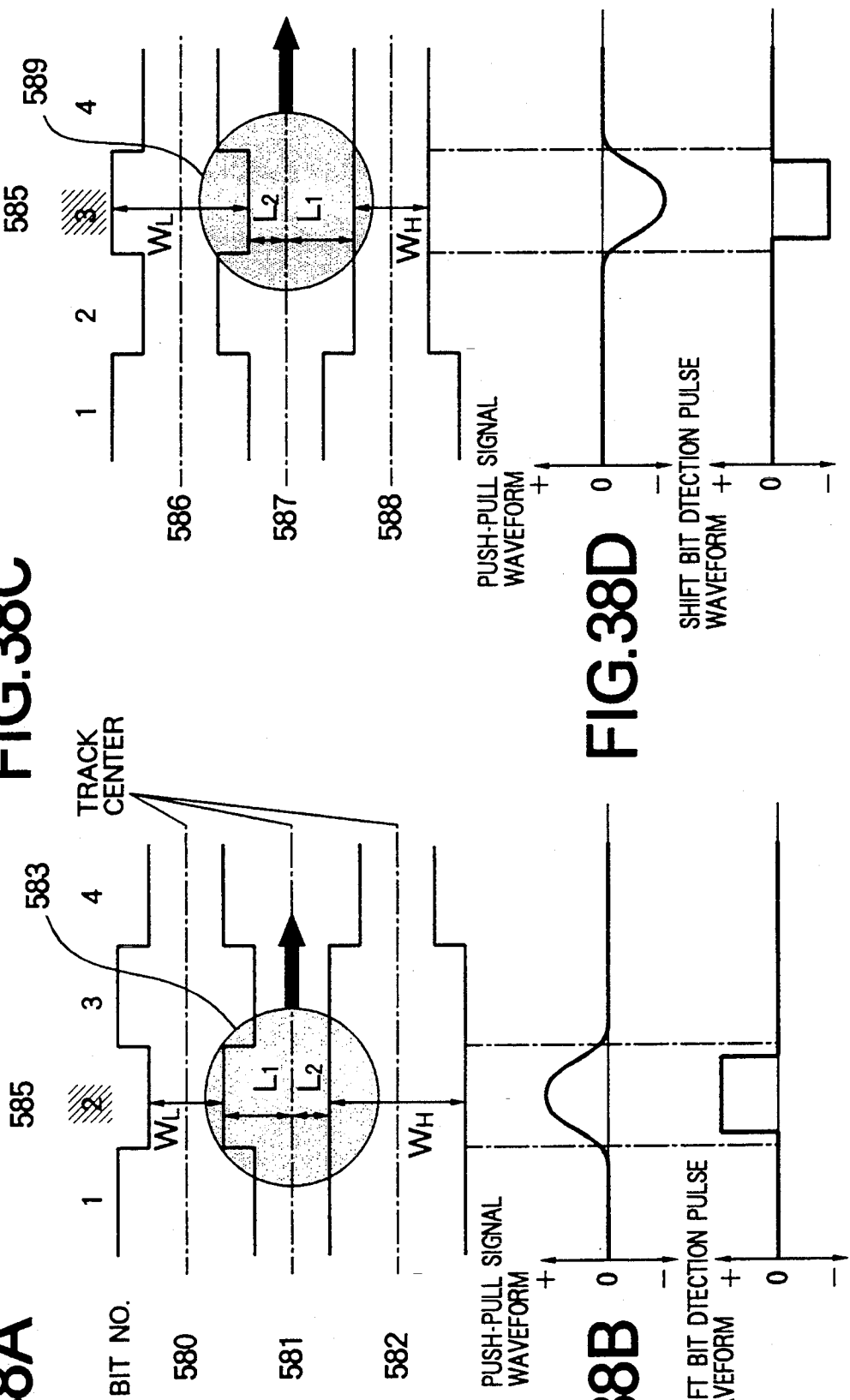
FIGS. 38A to 38D are timing charts for explaining the reason why a binary value correct in the shift bit can be obtained in the optical information recording/reproducing apparatus according to the present invention.
Figure 39:
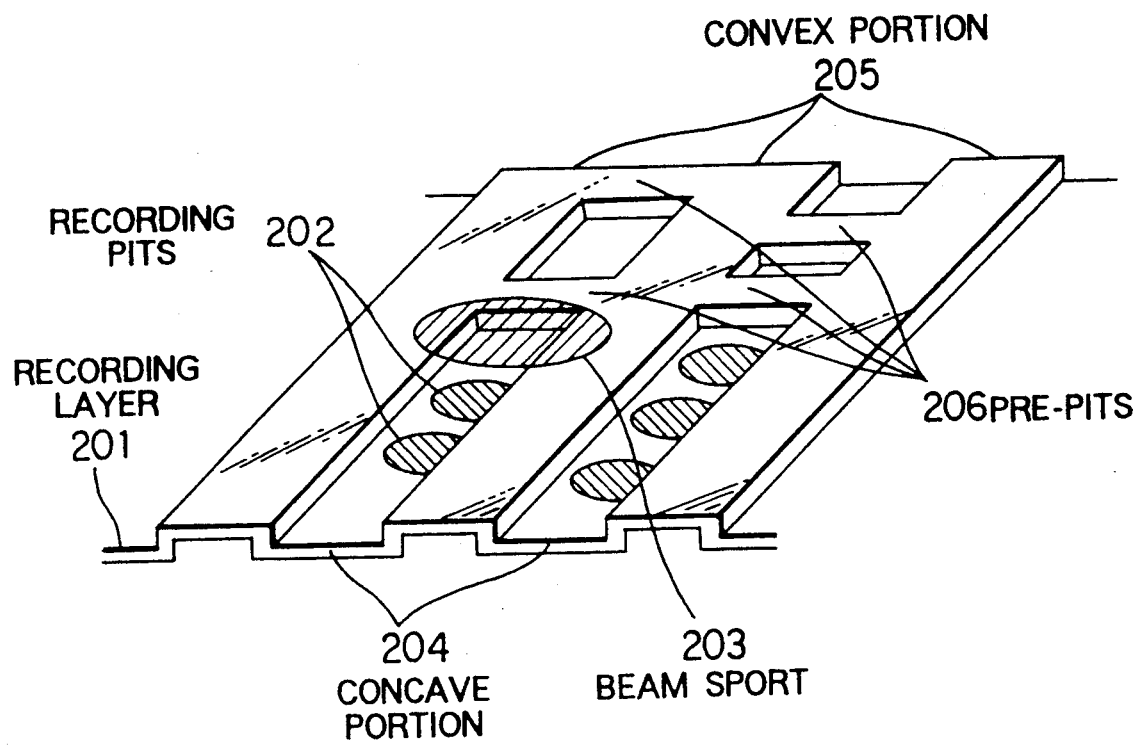
FIG. 39 is an enlarged perspective view for explaining the configuration of an optical disk used as a conventional optical disk.

FIGS. 38A to 38D are timing charts for explaining the reason. In FIG. 38A, the reference numerals 580 and 582 designate concave portions; and 581, a convex portion. The binary value of the Gray code recorded in the concave portion 580 is "1010", and the binary value in the concave portion 582 is "1110". In this case, the shift bit is the second bit. In this case, the width of a concave portion on the left side in the direction of movement of the beam spot 583 is $W_L$ in the shift bit whereas the width of a concave portion on the right side in the direction of movement of the beam spot 583 is $W_H$. Because the beam spot 583 performs tracing on the center line of the convex portion 581, the convex portion in the shift bit is shifted to the concave portion 580 side relative to the beam spot 583 ($L_1 > L_2$) so that a state equivalent to a state in which tracking error occurs is established. Accordingly, the waveform of the push-pull signal is formed as shown in FIG. 38B. The eleventh waveform shaping circuit 571 compares the waveforms to thereby generate a positive detection pulse signal to the fourth address reproducing circuit 572. On the other hand, FIG. 38C shows the case where the binary value of the Gray code recorded in the concave portion 586 is "1010", and the binary value in the concave portion 588 is "1000". In this case, the shift bit is the third bit. In this case, contrarily to the case of FIG. 38A, the width of a concave portion on the left side in the direction of movement of the beam spot 589 is $W_H$ in the shift bit whereas the width of a concave portion on the left side in the direction of movement of the beam spot 589 is $W_L$. Accordingly, the convex portion 587 in the shift bit is shifted to the concave portion 588 side relative to the beam spot. Accordingly, the waveform of the push-pull signal is formed as shown in FIG. 38D. The eleventh waveform shaping circuit 571 compares the waveforms to thereby generate a negative detection pulse signal to the fourth address reproducing circuit 572. In this manner, the fourth address reproducing circuit 572 can obtain a binary value correct in the shift bit in the input digital signal by referring to the polarity of the detection pulse signal.

As described above in detail, according to the optical information recording/reproducing apparatus in this embodiment, while the light beam performs scanning on an identification signal in a convex recording track, binary values of Gray codes of two concave portions adjacent to the convex portion in the position of the shift bit can be determined On the basis of the amplitude and polarity of a push-pull signal outputted from the differential amplifier 217 through the HPF 570. Accordingly, correct address data can be obtained even in the convex recording track.

Although the above description has been made upon the case where a phase change material is used as the recording medium for the optical disk, the present invention can be applied to the case where any recording medium such as a photomagnetic recording medium, a pigment recording medium, etc. is used. Although the above description has been made upon the case where a CAV method is used as the optical disk rotation control method, the invention can be applied to the case where any method is used as long as identification signals in adjacent tracks can be arranged in the track-crossing direction. For example, MCAV (modified constant angular velocity) or the like may be used.

We claim:

1. An optical information recording medium in which both grooves and lands spirally or coaxially formed on a disc substrate are used as recording tracks, said recording medium comprising identification signal areas having identification signals including position information on said optical information recording medium and pre-formed in concave and convex shapes, and information signal areas separate from said identification signal areas and having information signals recorded by irradiation with a light beam, said identification signal areas being disposed in said grooves and shifted back and forth in a track direction of the recording medium so that said identification signal areas are not adjacent to each other in a radial direction of the recording medium.

2. An optical information recording/reproducing apparatus, comprising:

an optical information recording medium according to claim 1;

an optical system for radiating a light beam generated from a light source onto a recording track of said optical information recording medium;

shift means for shifting said light beam relatively in the recording track direction;

light detecting means for detecting light of said light beam reflected from said optical information recording medium, and outputting a light detection signal; and identification signal reading means for extracting an identification signal from said light detection signal output from said light detecting means;

wherein said identification signal reading means reproduces said identification signal from said light detection signal amplitude-modulated With said identification signal when said light beam is scanning on said grooves, and said identification signal reading means reproduces said identification signal from said light detection signal amplitude-modulated with said identification signal of adjacent grooves when said light beam is scanning on said lands.

3. An optical information recording/reproducing apparatus according to claim 2, wherein said identification signal reading means includes at least one data slice means so that a slice level thereof is variable between a time when said light beam is scanning on said grooves and a time when said light beam is scanning on said lands.

4. An optical information recording/reproducing apparatus according to claim 2, wherein said identification signal reading means includes a variable-gain amplifier for amplifying or attenuating a light detection signal, an amplification factor of said variable-gain amplifier being variable between a time when said light beam is scanning on said grooves and a time when said light beam is scanning on said lands.

5. An optical information recording/reproducing apparatus according to claim 2, further comprising:

recording means for recording information signals onto the recording tracks; and recording control means for controlling said recording means so that said information signals are not recorded in any area on said lands and adjacent to said identification signal in a direction crossing the recording tracks.

6. An optical information recording medium in which both grooves and lands spirally or coaxially formed on a disc substrate are used as recording tracks, said recording medium comprising identification signal areas having identification signals including position information on said optical information recording medium and pre-formed in concave and convex shapes, and information signal areas separate from said identification signal areas and having information signals recorded by irradiation with a light beam;

wherein said identification signals include at least a first identification signal and a second identification signal which are spatially divided and disposed in said grooves;

wherein said first identification signal provided in the $(2n-1)$th groove (n being a positive integer) is identical with said first identification signal provided in the $(2n)$th groove and is arranged in parallel thereto; and wherein said second identification signal provided in the $(2n)$th groove is identical with said second identification signal provided in the $(2n+1)$th groove and is arranged in parallel thereto.

7. An optical information recording/reproducing apparatus, comprising:

an optical information recording medium according to claim 6;

an optical system for radiating a light beam generated from a light source onto a recording track of said optical information recording medium;

shift means for shifting said light beam relatively in the recording track direction;

light detecting means for detecting light of said light beam reflected from said optical information recording medium, and outputting a light detection signal; and identification signal reading means for extracting an identification signal from said light detection signal output from said light detecting means;

wherein said identification signal reading means reads said identification signal from said light detection signal amplitude-modulated with said first identification signal when said light beam is scanning on the $(2n-1)$th groove;

wherein said identification signal reading means reads said identification signal from said light detection signal amplitude-modulated with said second identification signal when said light beam is scanning on the $(2n)$th groove;

wherein said identification signal reading means reads said identification signal from said light detection signal amplitude-modulated with said first identification signals on adjacent grooves when said light beam is scanning on a land between the $(2n-1)$th groove and the $(2n)$th groove; and wherein said identification signal reading means reads said identification signal from said light detection signal amplitude-modulated with said second identification signals on adjacent grooves when said light beam is scanning on a land between the $(2n)$th groove and the $(2n+1)$th groove.

8. An optical information recording/reproducing apparatus according to claim 7, wherein said identification signal reading means includes at least one data slice means so that a slice level thereof is variable between a time when said light beam is scanning on the grooves and a time when said light beam is scanning on the lands.

9. An optical information recording/reproducing apparatus according to claim 7, wherein said identification signal reading means includes a variable-gain amplifier for amplifying or attenuating a light detection signal, an amplification factor of said variable-gain amplifier being variable between a time when said light beam is scanning on the grooves and a time when said light beam is scanning on the lands.

10. An optical information recording/reproducing apparatus according to claim 7, further comprising:
recording means for recording information signals onto the recording tracks; and
recording control means for controlling said recording means so that said information signals are not recorded in any area on the land and adjacent to said identification signal in a direction crossing the recording tracks.

11. An optical information recording medium in which both grooves and lands spirally or coaxially formed on a disc substrate are used as recording tracks, said recording medium comprising identification signal areas having identification signals including position information on said optical information recording medium and pre-formed in concave and convex shapes and information signal areas separate from said identification signal areas add having information signals recorded by irradiation with a light beam;
wherein said identification signals are provided in the grooves and are provided with a unit pattern different by one bit between adjacent recording tracks, at least a part of said identification signal including a gray code pattern in which the same patterns are repeated in every predetermined plurality of tracks; and
wherein head positions of said identification signal areas are made coincident with each other between adjacent ones of said recording tracks.

12. An optical information recording/reproducing apparatus, comprising:
an optical information recording medium according to claim 11;
an optical system for radiating a light beam generated from a light source onto a recording track of said optical information recording medium;
shift means for shifting said light beam relatively in the recording track direction;
light detecting means for detecting light of said light beam reflected from said optical information recording medium, and outputting a light detection signal; and
identification signal reading means for extracting an identification signal from said light detection signal output from said light detecting means;
wherein said identification signal reading means changes said light detection signal amplitude-modulated with said identification signal to a binary signal on the basis of a first reference value, and converts the binary signal into position information when said light beam is scanning on the grooves; and
wherein said identification signal reading means changes said light detection signal amplitude-modulated with said identification signals on adjacent grooves to a binary signal on the basis of a second reference value, and converts the binary signal into position information when said light beam is scanning on the land.

13. An optical information recording/reproducing apparatus according to claim 12, further comprising:
recording means for recording information signals onto the recording tracks; and
recording control means for controlling said recording means so that said information signals are not recorded in any area on a land and adjacent to said identification signal in a direction crossing the recording tracks.

14. An optical information recording/reproducing apparatus according to claim 12, further comprising:
first light beam positioning means for controlling a position of a light beam so that the light beam scans on a recording track in accordance with a fine control signal applied thereto;
polarity inverting means for inverting a polarity of a tracking control direction between a time when said light beam is on the groove and a time when said light beam is on the land;
second light beam positioning means for moving said light beam in the direction crossing the recording tracks in accordance with a coarse control signal applied thereto; and
seek control means for outputting said fine control signal to said first light beam positioning means so that said light beam is moved toward a destination recording track by half a pitch of the groove after moving said light beam to the groove adjacent to said destination recording track when said light beam is moved to a recording track of the land.

15. An optical information recording medium in which both grooves and lands spirally or coaxially formed on a disc substrate are used as recording tracks, said recording medium comprising identification signal areas having identification signals including position information on said optical information recording medium and pre-formed in concave and convex shapes, and information signal areas separate from said identification signal areas and having information signals recorded by irradiation of a light beam; wherein
one of said identification signals is provided relative to a set of said groove and said land adjacent to each other, a center line of a part or all of said identification signals is displaced relative to a center line of said groove or land in a direction crossing the recording tracks.

16. An optical information recording medium according to claim 15, wherein said identification signal is formed of a concave/convex pre-pit having an optical depth or height of about $\lambda/4$ ($\lambda$ is a wavelength of said light beam).

17. An optical information recording medium according to claim 15, wherein a first synchronizing signal indicating a start end of an area forming an identification signal is pre-formed immediately before said identification signal, and a center line of said first synchronizing signal is made coincident with the center line of the groove or land.

18. An optical information recording medium according to claim 15, wherein a second synchronizing signal indicating a termination end of an area forming an identification signal is pre-formed immediately after said identification signal, and a center line of said second synchronizing signal is made coincident with a center line of said identification signal.

19. An optical information recording/reproducing apparatus comprising:
- an optical information recording medium according to claim 15;
- an optical head for radiating a light beam onto said optical information recording medium, receiving reflected light from the recording medium, converting said reflected light to an electric signal, and outputting said electric signal as a reproducing signal;
- shift means for shifting said light beam relatively in the recording track direction;
- tracking error detecting means for outputting a tracking error signal representing a gap quantity between said light beam radiated onto said optical information recording medium and a recording track of the groove on said optical information recording medium or the center line of a recording track of the land;
- tracking control means for displacing said light beam in a direction crossing the recording tracks in accordance with said tracking error signal to thereby dissolve said gap quantity;
- decision means for deciding which one of recording tracks of said groove and land is being scanned by said light beam, and outputting the decision as a decision signal;
- identification signal reading means for generating an identification signal from said reproducing signal output from said optical head, when said light beam is scanning on an identification signal area on said optical information recording medium; and
- position detecting means for calculating a position where said light beam is scanning, from said identification signal and said decision signal;
- whereby information signals are recorded, reproduced or deleted on said optical information recording medium by means of said light beam.

20. An optical information recording/reproducing apparatus according to claim 19, further comprising gain control means for increasing a gain of a tracking control loop for a predetermined period immediately after a light beam finishes passing an area where an identification signal is formed.

21. An optical information recording/reproducing apparatus according to claim 19, further comprising:
- recording means for recording information signals on said optical information recording medium; and
- recording control means for controlling an operation of said recording means so that no information signal is recorded in predetermined sections on the grooves or lands immediately after identification signals.

22. An optical information recording/reproducing apparatus according to claim 19,
- wherein said optical head includes two light detectors which are symmetrically disposed on a surface to receive a reflected light beam in a direction crossing the recording tracks, to convert the quantity of received light into an electric signal; and
- wherein said identification signal reading means includes operation means for outputting a reproducing signal from a difference of the electric signals output from said two light detectors.

23. An optical information recording/reproducing apparatus according to claim 19, further comprising:
- identification signal area detecting means for detecting that a light beam is scanning on an area where an identification signal is formed, and outputting a detection signal; and
- tracking error signal holding means for holding a tracking error signal to a value immediately before said detection signal is output, while said detection signal is being output.

24. An optical information recording/reproducing apparatus according to claim 23,
- wherein said optical information recording medium is an optical information recording medium comprising:
- grooves and lands spirally or coaxially formed on a disc substrate and used as recording tracks, said recording medium further comprising identification signal areas having identification signals including position information on said optical information recording medium and pre-formed in concave and convex shapes, and information signal areas separate from said identification signal areas and having information signals recorded by irradiation of a light beam;
- wherein one of said identification signals is provided relative to a set of said groove and said land adjacent to each other, a center line of a part or all of said identification signals is displaced relative to a center line of said groove or land in a direction crossing the recording tracks;
- wherein a second synchronizing signal indicating a termination end of an area forming an identification signal is pre-formed immediately after said identification signal, and a center line of said second synchronizing signal is made coincident with a center line of said identification signal; and
- wherein said identification signal area detecting means includes a first synchronizing signal formed on said optical information recording medium and synchronizing signal detecting means for generating a detection signal when said first synchronizing signal is detected from a reproducing signal output from said optical head.

25. An optical information recording medium according to claim 15, wherein the center line of a part or all of said identification signals is displaced with the center line of said groove or land by about a quarter width of a pitch of said groove.

26. An optical information recording medium in which both grooves and lands spirally or coaxially formed on a disc substrate are used as recording tracks, said recording medium comprising identification signal areas having identification signals including position information on said optical information recording medium and pre-formed in concave and convex shapes, and information signal areas separate from said identification signal areas and having information signals recorded by radiating a light beam,
- wherein said identification signals are formed by modulating widths of said grooves; and
- wherein top positions of said identification signals are made coincident with each other between adjacent ones of said recording tracks in at least a part of an area of said optical information recording medium.

27. An optical information recording medium according to claim 26, wherein position information in an identification signal includes a gray code variable by one bit only at the time of count-up.

28. An optical information recording/reproducing apparatus comprising:
- an optical information recording medium according to claim 27;
- an optical head for radiating a light beam onto said optical information recording medium, receiving reflected light from the recording medium, converting said reflected light to an electric signal, and outputting said electric signal as a read signal;
- polarity inverting means for inverting a polarity of said read signal while said light beam is scanning on the lands of said optical information recording medium;
- information signal reading means for decoding an information signal from said read signal output from said optical head;
- information recording means for recording the information signal on said optical information recording medium;
- shift means for shifting said light beam relatively in the recording track direction;
- tracking control means for positioning said light beam onto the grooves or lands of said optical information recording medium.

29. An optical information recording/reproducing apparatus according to claim 28, further comprising:
- tracking error detecting means for detecting deviation of distribution of the quantity of light, in the direction crossing the recording tracks, from a light beam reflected on said optical information recording medium, and outputting a tracking error signal in accordance with said deviation; and
- error detecting means for outputting a first detection pulse when said tracking error signal is beyond a predetermined threshold positive value, and outputting a second detection pulse when said tracking error signal is below a predetermined threshold negative value, while the light beam is scanning on an identification signal in the land;
- wherein said identification signal reading means corrects said identification signal decoded from a read signal in accordance with said first and second detection pulses while the light beam is scanning on an identification signal area in the land.

30. An optical information recording/reproducing apparatus comprising:
- an optical information recording medium having both grooves and lands spirally or coaxially formed on a disc substrate and used as recording tracks, said recording medium comprising identification signal areas having identification signals including position information on said recording medium and pre-formed in accordance with a change of shapes of the disc substrate, and information signal areas separate from the identification signal areas and having information signals recorded by irradiation of a light beam, one of said identification signal areas being provided relative to a set of lands and grooves adjacent to each other;
- an optical system for irradiating said light beam produced from a light source on the recording tracks of said optical information recording medium;
- light detection means for detecting said light beam reflected from said optical information recording medium and producing a light detection signal;
- identification signal reading means for reading the identification signal from the light detection signal output from said light detection means;
- first light beam positioning means for controlling a position of said light beam so that said light beam scans on said recording tracks in accordance with a fine adjustment signal;
- second light beam positioning means for shifting said light beam so that said light beam crosses said recording tracks in accordance with a coarse adjustment signal; and
- seek control means for outputting said coarse adjustment signal to said second light beam positioning means so that said light beam is shifted to a target recording track when said light beam is shifted to one of said tracks of said lands and grooves, and for outputting said coarse adjustment signal to said second light beam positioning means so that said light beam is shifted to a recording track adjacent to the target recording track when said light beam is shifted to the other of said tracks and thereafter for outputting said fine adjustment signal to said first light beam positioning means so that said light beam is shifted toward said target recording track by one half of a pitch of said grooves.

31. An optical information recording/reproducing apparatus comprising:
- an optical information recording medium having both grooves and lands spirally or coaxially formed on a disc substrate and used as recording tracks, said recording medium comprising identification signal areas having identification signals including position information on said recording medium and pre-formed in accordance with a change of shapes of the disc substrate, and information signal areas separate from the identification signal areas and having information signals recorded by irradiation of a light beam, one of said identification signal areas being provided relative to a set of lands and grooves adjacent to each other;
- an optical system for irradiating said light beam produced from a light source on the recording tracks of said optical information recording medium;
- light detection means for detecting said light beam reflected from said optical information recording medium and producing a light detection signal; and
- identification signal reading means for reading the identification signal from said light detection signal.

32. An optical information recording/reproducing apparatus comprising:
- an optical information recording medium having both grooves and lands spirally or coaxially formed on a disc substrate and used as recording tracks, said recording medium comprising identification signal areas having identification signals including position information on said recording medium and pre-formed in accordance with a change of shapes of the disc substrate, and information signal areas separate from the identification signal areas and having information signals recorded by irradiation of a light beam, one of said identification signal areas being provided relative to a set of lands and grooves adjacent to each other;
- an optical system for irradiating said light beam produced from a light source on the recording tracks of said optical information recording medium;
- light detection means for detecting said light beam reflected from said optical information recording medium and producing a light detection signal;

a variable gain amplifier for amplifying or attenuating said light detection signal; and identification signal reading means for reading the identification signals from the light detection signal amplified or attenuated by said variable gain amplifier, whereby an amplification factor of said variable gain amplifier is variable between a time when said light beam scans on said grooves and a time when said light beam scans on said lands.

33. An optical information recording/reproducing apparatus comprising:

an optical information recording medium having both grooves and lands spirally or coaxially formed on a disc substrate and used as recording tracks, said recording medium comprising identification signal areas having identification signals including position information on said recording medium and pre-formed in accordance with a change of shapes of the disc substrate, and information signal areas separate from the identification signal areas and having information signals recorded by irradiation of a light beam, one of said identification signal areas being provided relative to a set of lands and grooves adjacent to each other;

an optical system for irradiating said light beam produced from a light source on the recording tracks of said optical information recording medium;

light detection means for detecting said light beam reflected from said optical information recording medium and producing a light detection signal; and identification signal reading means for reading the identification signal from the light detection signal output from said light detection means;

said identification signal reading means including at least one data slice means, a slice level of said data slice means being variable between a time when said light beam scans on said grooves and a time when said light beam scans on said lands.

* * * * *